United States Patent [19]
Aker et al.

[11] Patent Number: 5,525,996
[45] Date of Patent: Jun. 11, 1996

[54] POLICE TRAFFIC RADAR FOR CALCULATING AND SIMULTANEOUSLY DISPLAYING FASTEST TARGET SPEED

[75] Inventors: John L. Aker, Kansas City, Mo.; Robert S. Gammenthaler, Princeton; Alan B. Mead, Plano, both of Tex.

[73] Assignee: Applied Concepts, Inc., Plano, Tex.

[21] Appl. No.: 386,545

[22] Filed: Feb. 10, 1995

[51] Int. Cl.$^6$ .............................. G01S 13/58; G01S 13/62
[52] U.S. Cl. .................................... 342/104.000; 342/114
[58] Field of Search .......................... 342/104, 20, 106, 342/114, 115, 116, 175

[56] References Cited

U.S. PATENT DOCUMENTS

| | | | |
|---|---|---|---|
| 3,438,031 | 4/1969 | Fathauer | 342/92 |
| 3,689,921 | 9/1972 | Berry | 342/93 |
| 3,691,525 | 9/1972 | McClellan, Sr. et al. | 340/466 |
| 3,936,824 | 2/1976 | Aker et al. | 342/115 |
| 4,214,243 | 7/1980 | Patterson | 342/115 |
| 4,236,148 | 11/1980 | Aker et al. | 342/115 |
| 4,293,859 | 10/1981 | Sergent | 342/115 |
| 4,335,382 | 6/1982 | Brown et al. | 343/702 |
| 4,335,383 | 6/1982 | Berry | 342/115 |
| 4,527,894 | 7/1985 | Goede et al. | 356/28 |
| 4,740,045 | 4/1988 | Goodson et al. | 342/112 |
| 4,743,908 | 5/1988 | Brassfield et al. | 342/113 |
| 4,887,080 | 12/1989 | Gross | 340/937 |
| 5,041,828 | 8/1991 | Loeven | 340/937 |
| 5,159,345 | 10/1992 | Young | 342/104 |
| 5,189,425 | 2/1993 | Dabbs | 342/52 |
| 5,381,155 | 1/1995 | Gerber | 342/104 |

OTHER PUBLICATIONS

Westlaw Search, Nov. 14, 1994.
Craig Paterson, Speed Enforcement Technology, An explanation of the latest features and capabilities of speed detection equipment, Law and Order, vol. 41, No. 9, Sep. 1993, pp. 32–41.

*Primary Examiner*—John B. Sotomayor
*Attorney, Agent, or Firm*—Ronald C. Fish; Falk, Vestal & Fish

[57] ABSTRACT

A police radar utilizing digital data transmission from the antenna unit to a separately housed counting and display unit. The antenna has a double balanced mixer to suppress even order harmonics. The counting and display unit has a computer programmed to perform digital signal processing on the digital data received from the antenna to improve the quality and accuracy of calculated speeds for patrol speed, strongest target speed and fastest target speed. Fastest target speed can be displayed simultaneously with strongest target speed. Signal processing techniques are used to suppress false signals caused by double and triple bounce, harmonics, intermodulation products, video display terminal interference, etc.

18 Claims, 43 Drawing Sheets

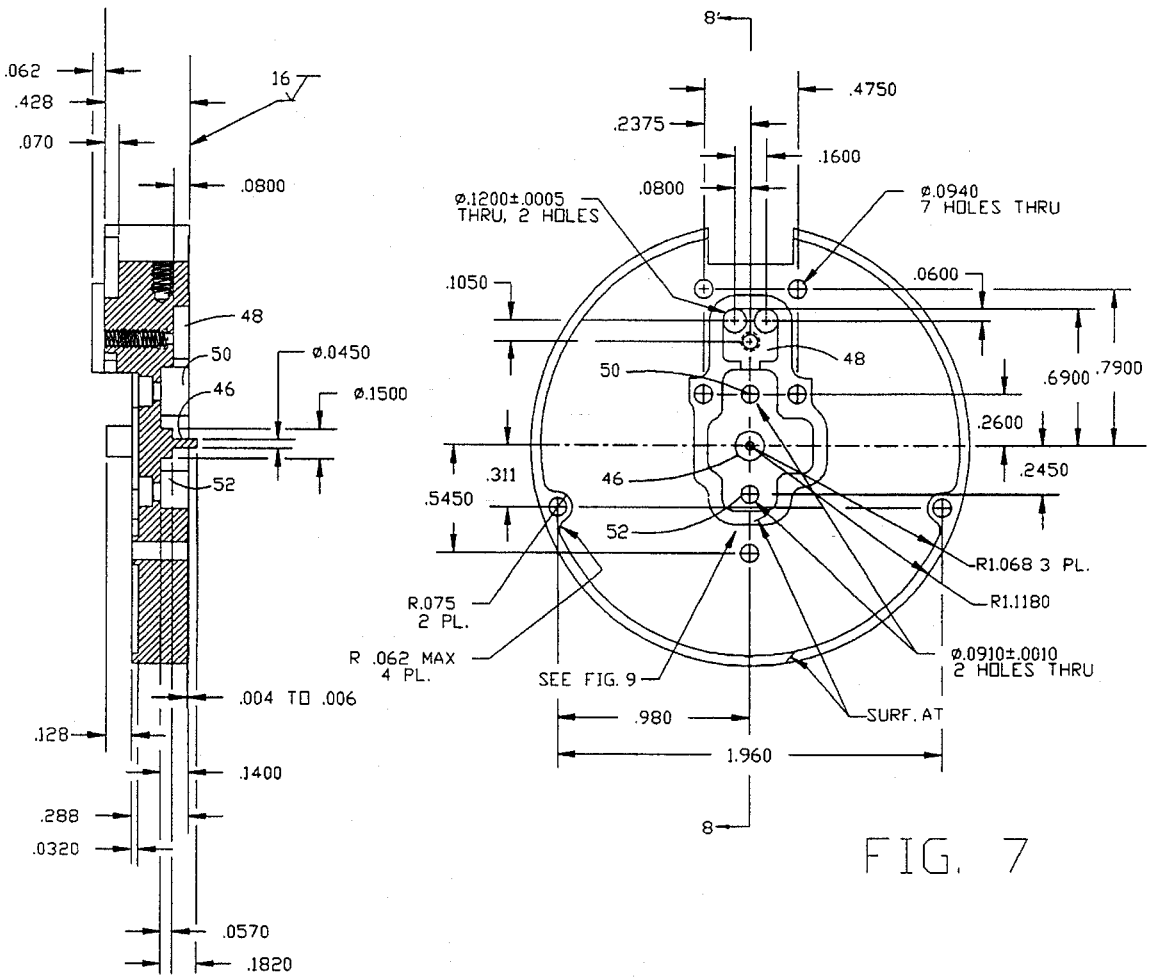
FIG. 8
FIG. 7
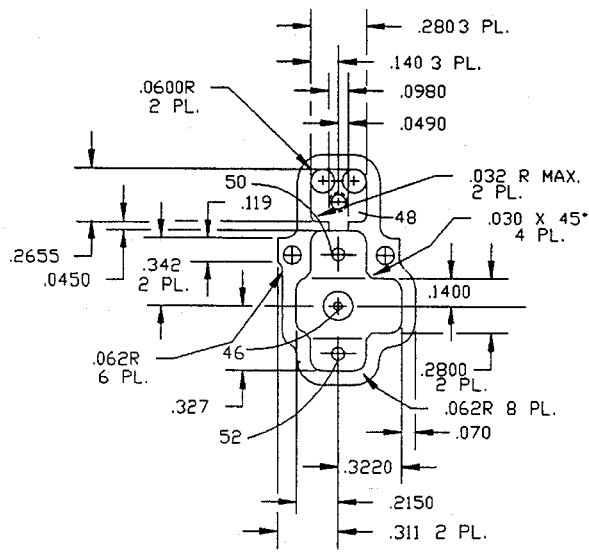
FIG. 9

Chip antga16 PAL16R4

| PIN # | 1 | 2 | 3 | 4 | 5 | 6 | 7 | 8 | 9 | 10 |
|---|---|---|---|---|---|---|---|---|---|---|
| SIGNAL | clk | cki | fso | adc | i4 | i5 | /res | rfi | ck | gnd |
| SIGNAL | /en | /dout | lc | /A | /B | /C | /D | /cko | xoff | vcc |
| PIN # | 11 | 12 | 13 | 14 | 15 | 16 | 17 | 18 | 19 | 20 | equations →

```
cko = /ck * /fso
    + /ck * A * /D
    + /ck * B
    + /ck * C
    + /ck * /A * D
cko.oe = vcc A := /fso + /A * B + /A * C + /A * D
B := fso * A * /B * /D + /A * B
C := A * B * /C + /A * C + /B * C
D := A * B * C * /D + /A * /B * /C * D
dout = adc * /D * /C
     + rfi * /ck * /A * B * C * /D
     + rfi * ck * A * B * C * /D
     + cki * /A * /B * /C * D
     + /cki * A * /B * /C * D
dout.oe = vcc
/lc = /cki * ck * A * /B * /C * D
lc.oe = vcc
/xoff = /res * i4 * /i5
xoff.oe = vcc
```

FIG. 15A

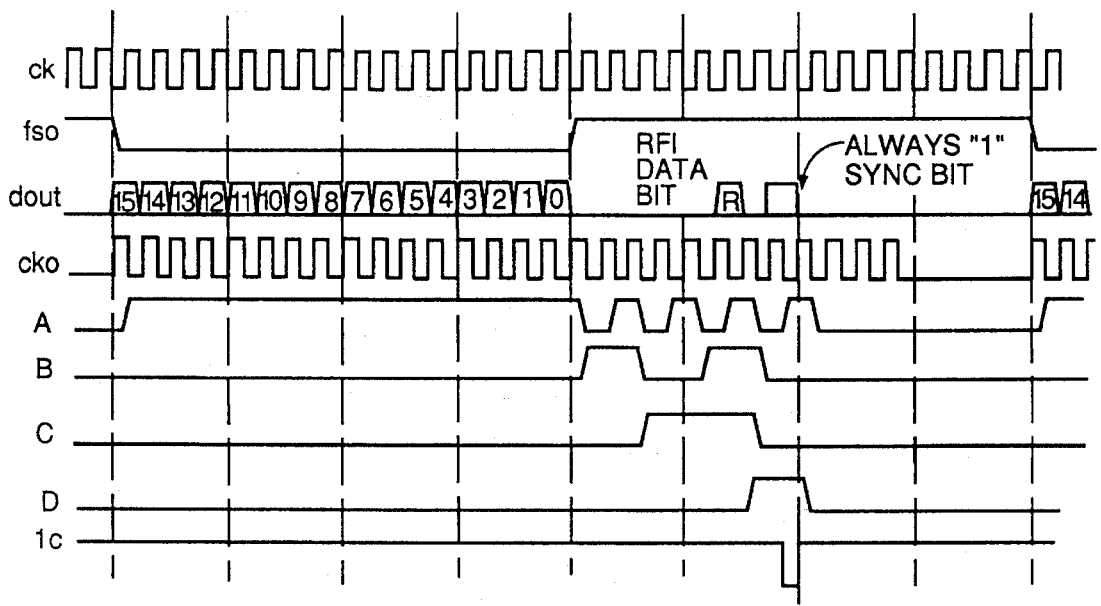

ANTENNA GAL TIMING DIAGRAM

FIG. 15B

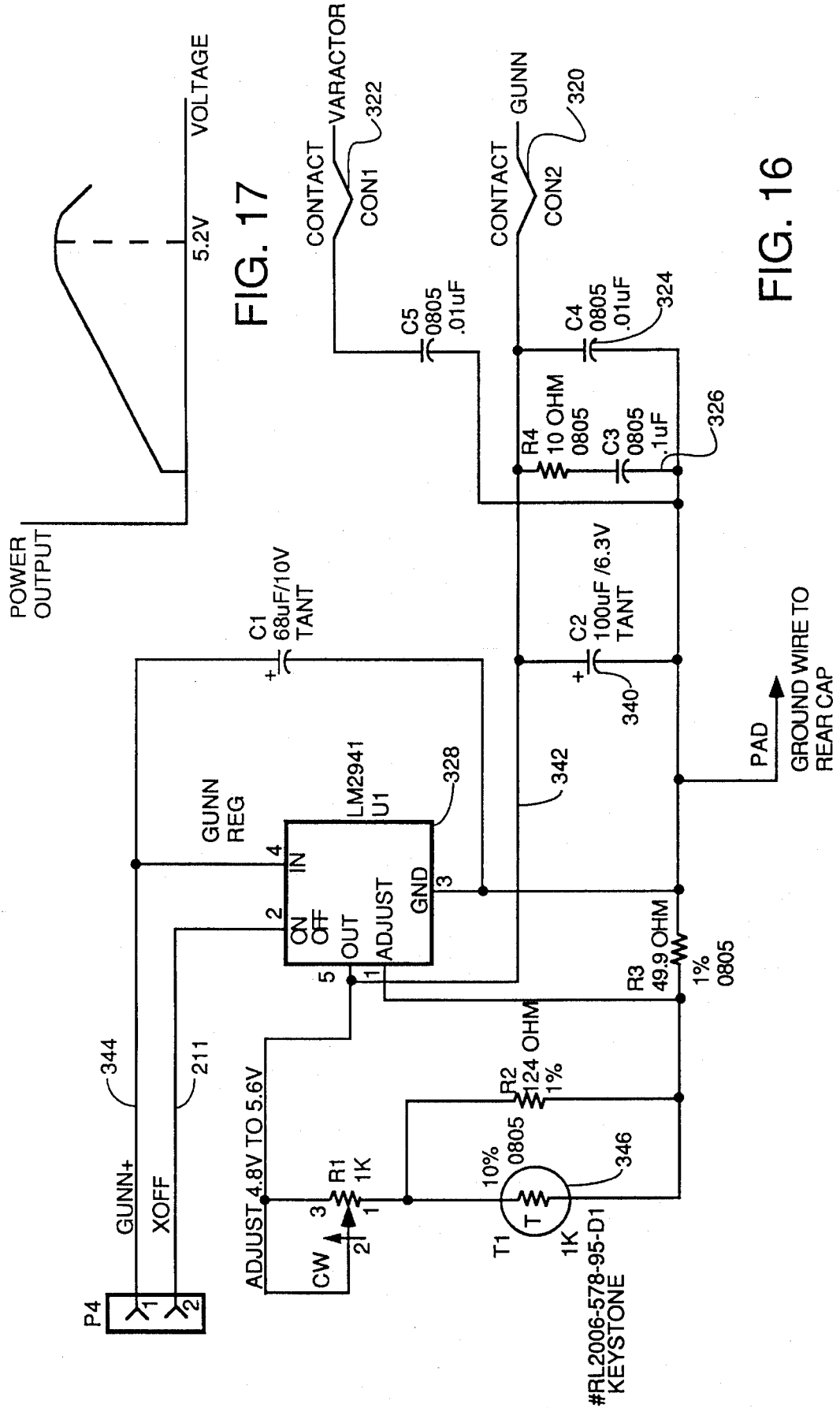

; Stalker II processor GAL #1 equations 10/21/93

```
chip prcgal1 PAL16R4
     1   2   3   4   5   6    7    8   9   10    ←——484
    clk sck ds  ps  xy  a15  a14  a13 i8  gnd   ←——480
    /en promcs ramad13 /A /B /C /D ramcs sc2 vcc ←——482
     11  12     13    14 15 16 17  18   19  20  ←——486
``` equations
;15 count resettable one-shot
A := sck + /A * B + /A * C + /A * D          ;sck presets to state 1
B := A * /B * /sck + /A * B * /sck
C := A * B * /C * /sck + /A * C * /sck + /B * C * /sck
D := A * B * C * /D * /sck + /C * D * /sck + /B * D * /sck + /A * D * /sck
/sc2 = /A * /B * /C * /D * /sck       ;output when state 0 reached
sc2.oe = vcc
; prom selected from P:$8000 to $FFFF
/promcs = /ps * ds * a15
promcs.oe = vcc
;P:ram 0 to $3FFF, X: & Y: to $1FFF
/ramcs = /ps * ds * /a14 * /a15 + ps * /ds * /a13 * /a14 * /a15
ramcs.oe = vcc
/ramad13 = /ps * ds * /a13 + ps * /ds * xy
;ramad13.oe = vcc

FIG. 19

FROM FIG. 24D

| TARGET INDEX | TARGET SIGNAL STRENGTH | BLOCK-NOISESUM | LOCAL SIGNAL MAXIMUM |
|---|---|---|---|
| | | | |

775

FOR TARGET INDEX VALUES < > 0, DIVIDE BLOCKNOISESUM BY TARGET SIGNAL STRENGTH. REPLACE BLOCKNOISESUM WITH (NOISE TO SIGNAL RATIO) FRACTION. DIVIDE LOCAL SIGNAL MAXIMUM BY TARGET SIGNAL STRENGTH & REPLACE LOCAL SIGNAL MAXIMUM WITH (LOCAL MAX/SIGNAL STRENGTH) FRACTION.

(RTS)

PATROL SPEED PROCESSING

USER INPUT PROCESSING

TO FIG. 30B

POLICE TRAFFIC RADAR FOR CALCULATING AND SIMULTANEOUSLY DISPLAYING FASTEST TARGET SPEED

BACKGROUND OF THE INVENTION

The invention pertains generally to the field of doppler radars, and, more particularly, to the field of police traffic surveillance radars using doppler shifted radar returns to calculate speed.

Police radars have been in use for many years. Police radars output beams of microwave energy from directional antennas and collect microwave energy reflected from stationary and moving objects. The reflected microwave energy has had its frequency changed by the relative motion between the transmitting antenna and the object from which the energy was reflected by the Doppler shift phenomenon. To determine the relative speeds between the transmitting antenna (which is moving at the same speed as the patrol car or policeman which is supporting the transmitting antenna) and the objects from which the microwave energy is reflected, a sample of the transmitted energy is mixed with the reflected microwave energy in a nonlinear mixing diode. The mix products include upper and lower sidebands which represent sum and difference, respectively, between the transmit frequency and the frequency of the reflected microwave energy. Each target which reflects energy, such as the ground and a moving car, will generate a return signal with a frequency which is established by the speed of the target. The frequencies of these returns are analyzed to determine the speed of the patrol car (from the ground return or other returns from stationary objects) and the speed of the moving target with the strongest return.

The evolution of the designs of police radars to the current state of the art is probably best represented by the Stalker™ police traffic radar which is commercially available from the assignee of the present invention, Applied Concepts, Inc. of Richardson, Texas. The Stalker was the first police radar unit to convert the mix products to digital samples and send the digital data to a processor unit for analysis.

The prior art has several areas in which improvements can be made. The police cruiser is a noisy environment with radio frequency interference from the patrol car ignition system and police radio unit prevalent as well as random interference from CB radios in other vehicles. Further, the distance from the processing unit to the antenna unit is often quite large. These large distances cause the cable to pick up more noise, and losses in the cable can degrade the operation of the unit. Therefore, small cable size, good noise immunity and the ability to transmit over large distances the signals from which the patrol speed and target speed is the be calculated are important properties for an improved police radar to have.

One of the biggest problems in police radars is in insuring accurate measurement of patrol car speed and target speed. The law requires that the only target speed that is admissible evidence is the target speed calculated from the strongest signal which is not the return from a stationary object. There are several sources of strong signals that can cause erroneous radios. One is CB radios. Many CB users use illegal linear amplifiers that boost their signal power beyond the legal limit of 5 watts. Further, CB radios that are close to the patrol car can also cause strong radio frequency interference. A way to detect this type of radio frequency interference and eliminate it is desirable in police radars. Another big problem is harmonics of the transmitted signal. The transmitted signal has even order harmonics and odd order harmonics. By far, the strongest harmonic is the 2d order harmonic, and when this harmonic is in the microwave energy that bounces off stationary or moving objects, its signal strength can be quite high and can be mistaken for a target signal. It is highly desirable to have a mechanism to eliminate the even order harmonics during processing of the returned microwave energy.

Another source of errors is intermodulation products generated in the receiving and amplifying circuits. It is highly desirable to have a way of eliminating these intermodulation products. Further, it is highly desirable to have a way of eliminating weak signals which are not valid candidates for patrol speed during processing of the return signals.

Most police radars these days do not provide any indication to the patrolman of the speed of the fastest target in the returned microwave energy if that target is not the strongest target in the radar return since the patrolman is not legally authorized to cite the driver of that target since it is not the strongest target return. It is useful to be able to satisfy the requirement of displaying the speed of the strongest target return while simultaneously displaying the speed of the fastest target in the return. This provides the patrolman with advance warning that a faster target is approaching so that when the strongest target return recedes, he or she can re-aim the radar gun at the fastest target and make it the strongest target return for purposes of citing the driver thereof.

Another problem in prior art police radars is accidental calculation of the wrong patrol car speed. This can happen when, for example, the processor locks onto a harmonic return or when the patrol car comes to a stop and another car stops beside the patrol car and then pulls away. In the latter situation, the relative speed between the patrol car and the car pulling away may be inadvertently selected by the processor as the patrol car speed. It is useful to be able to manually reject an obviously incorrect patrol car speed and force the system to lock onto a different return for calculation of the patrol car speed. Further, if it is not possible to find another candidate for patrol speed, it is useful to have a system which can override the manual input rejecting the currently displayed patrol speed and continue to display that patrol speed.

SUMMARY OF THE INVENTION

A traffic surveillance radar according to the teachings of the invention utilizes a counting/display unit which is connected to two antenna units by a serial data path implemented through a small flexible cable. The antenna units use microwave turnstiles and ring hybrids so that receiver and transmitter sections can share the same antenna horn, and use a double balanced mixer diode structure to suppress even order harmonic distortion. Received signals are amplified by an amplifier which has its gain controlled digitally through serial data received from the counting/display unit. The received signals are converted to digital serial format data words and transmitted serially to the counting display unit in a plurality of frames. Part of each frame is devoted to sample data, and part of each frame includes control data such as synchronization bits, radio frequency interference bits and antenna personality bits. Cable size is kept small by not sending the frame synchronization signals that define the boundaries of each frame. These signals are encoded in the serial data by deleting a plurality of clock pulses of a serial clock sent from the antenna to the counting/display unit in each frame. The counting/display unit reconstructs the frame synchronization signals by detecting the blackout period of the serial clock and generating a new frame sync pulse at the end of the blackout interval in each frame.

The counting/display unit converts the serial format data to parallel format data and stores it in a data block. The sample words are processed by fast Fourier transform to generate a spectrum of lines that define the received signals. The spectrum is analyzed for signal patterns and signal strength is analyzed of the received signals. If signal strength is too low, the counting/display unit sends a gain increase command to the antenna unit which is active, but if the signal strength is too high, a gain decrease command is sent. The gain control commands are sent as serial data over the serial data link in synchronization with the serial clock transmitted from the antenna units to the counting/display unit.

The counting/display unit determines the patrol car speed from returns from stationary and moving objects by analyzing the data buffer of samples using fast Fourier analysis (FFT) to generate a spectrum of spectral lines. The spectrum is analyzed to find the 5 strongest low frequency (low speed) signals and these signals are saved for later use. The strongest of these signals will be tracked as the patrol speed, and the frequency of its spectral line will be analyzed for Doppler shift to determine and display the patrol car speed. The 5 strongest signals are then filtered out of the data buffer by application of a digital high pass filter, having its parameters set to filter out the low frequency strong signals so that they do not interfere with processing to find the strongest moving target signal and the fastest moving target signal.

Application of the digital filter to the data buffer generates another data block or spectral buffer. This spectral buffer is again analyzed using overlapping 512 point FFT's and Hamming windows to minimize end effects. The resulting spectrum is then analyzed to find the strongest moving target return that passes certain quality assurance tests. These quality assurance tests suppresses strongest target signals which do not have acceptable signal-to-noise ratios or are close to an integer multiple of patrol speed by processing them at lower sensitivity or eliminating display thereof altogether. If all quality assurance criteria are met, the speed of the strongest target return is calculated by converting the Doppler shifted frequency of its spectral line into miles per hour.

The counting/display unit also has a mode in which the fastest target signal can be simultaneously displayed in a different window from the window in which the strongest target speed is displayed. This is done by doing a top down search for the 7 fastest targets in the FFT spectrum and calculating the target signals strength, local noise power and local signal maximum quantities for each of these signals. These calculated quantities are stored in a table in descending order of speed. The fastest target signal candidate is then determined by passing the signals stored in the table, starting from the fastest target signal, seriatim through a battery of quality assurance tests until one signal passes all tests. The quality assurance tests are designed to block display of any fastest target signal which is possibly a false signal because it fails any of the following criteria: it has a signal-to-noise ratio which is too low given the current sensitivity setting of the radar unit; it is too close to another strong signal in frequency which could lead to an ambiguity as to which vehicle actually was travelling at the speed indicated by a particular fastest speed candidate signal; it may possibly have been caused by interference with mobile data terminals carried in some police cars; it has an apparent speed which is an integer multiple of the speed of the strongest target signal currently being displayed; it has an apparent speed which is either 2 or 3 times the patrol car speed and the patrol speed "true power", i.e., the power at the output of the mixer diodes, is above a certain power and the signal-to-noise ratio of the fastest speed candidate signal does not meet certain criteria or does not persist long enough in time; the five strongest signals in the FFT spectrum have signal powers above a certain level and the fastest speed candidate is possibly a harmonic of one of the signals or an intermodulation product of some combination of these 5 strongest signals. Additional threshold criteria are also imposed before the fastest target signal can be displayed. For example, it will not be displayed if the window in which it is normally displayed is displaying a locked value for the strongest target signal, or if the same fastest speed candidate has not occurred on two consecutive passes through the fast target qualification subroutine, or if the transmitter has not been on long enough, or if radio frequency interference has occurred during collection of the samples from which the fastest target signal was found, or if the strongest target's return is rapidly decreasing in frequency indicating the possibility of a false fast target caused by chirp scalloping in the FFT spectrum, or if the patrol speed was too recently acquired or is not currently being tracked. In alternative embodiments, some of these qualification and disqualification criteria may be eliminated, and the same can be said for the qualification and disqualification criteria used to qualify the strongest moving target signal as valid for display or to qualify the patrol speed as valid for display.

In alternative embodiments other quality assurance criteria may be imposed on either the patrol speed, strongest target speed display or the fastest target speed display or some of the above criteria may not be imposed.

BRIEF DESCRIPTION OF THE DRAWINGS

FIG. 7 is a plan view of the overall midplate structure including the microwave turnstile waveguide structure.

FIG. 8 a sectional view of the microwave turnstile waveguide structure taken along the section line 8—8' in FIG. 7.

FIG. 9 is a plan view drawing of the microwave turnstile waveguide structure.

FIG. 15A is a collection of the input and output signals of the gate array logic in the antenna unit digital circuitry and the Boolean expressions that relate the input and output signals. FIG. 15B is a timing diagram showing the timing relationships between the input and output signals from the antenna gate array circuit.

FIG. 16 is a schematic diagram of the preferred embodiment of the voltage regulator circuit for the Gunn oscillator that generates the microwave energy to be transmitted.

FIG. 17 shows a graph of the power output of the Gunn oscillator versus power supply voltage.

FIG. 19 is a collection of the signals input and output from the gate array logic in the processing and display unit and the Boolean expressions that relate these input and output signals.

DETAILED DESCRIPTION OF THE PREFERRED EMBODIMENT

Figure 1:
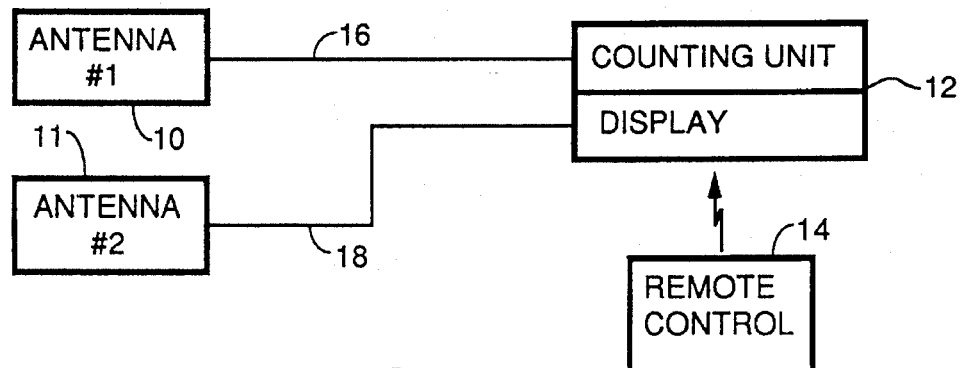
FIG. 1 is a block diagram of the overall system of the improved doppler traffic radar according to the teachings of the invention.

Referring to FIG. 1, there is shown a block diagram of the overall system of an improved doppler traffic radar according to the teachings of the invention. The improvements of the system taught herein are relative to the Stalker police radar that has been commercially available for several years from the assignee of the present invention, the technological details of which are hereby incorporated by reference. An antenna unit 10 radiates microwave energy in whatever direction it is pointed. In the preferred embodiment, two antenna units 10 and 11 are utilized. One unit is typically mounted in the front of the patrol car pointed forward and one unit is typically mounted in the back of the patrol car pointing backward. Each antenna is coupled to a counting/display unit 12 by a serial data cable capable of carrying packetized serial format data, represented by lines 16 and 18. In alternative embodiments, parallel digital data transmission may also be used. It is within the teachings of the invention to use any conventional design for said antenna units 10 and 11 and any conventional design for the counting/display unit 12 the improvement of the invention consisting of using either serial or parallel digital data communications between these units. It is further within the teachings of the invention to use hysteresis type line receivers on each digital data line passing between the antenna units and the counting/display unit 12 so as to improve the noise immunity for digital data communicated between these two units.

The counting/display unit houses a digital signal processor and associated peripheral circuitry to drive a display unit and to receive serial data from and transmit serial data to the two antenna units. The counting/display unit 12 (hereafter referred to as the "control unit") also includes software encoded in EPROM's, EEPROM's and gate arrays which control operations of the digital signal processor and parses management and control data out of the packets of serial data. The control unit 12 can be controlled by the trooper by pushing buttons on the front panel or it can be controlled by pushing buttons on a remote control 14. In the preferred embodiment, the remote-control 14 is a conventional infrared remote control similar in structure to the one used to control television sets and audio equipment but including buttons for the unique modes and functions implemented in the control unit. In alternative embodiments, the remote control unit 14 can be coupled to the control unit by a cable or by UHF signals. In the latter case, the remote control has a similar structure to UHF remotes used to control satellite dish controllers/decoders such as the Echosphere 710 manufactured by the Echosphere Corporation of Inverness, Colo.

Figure 2:
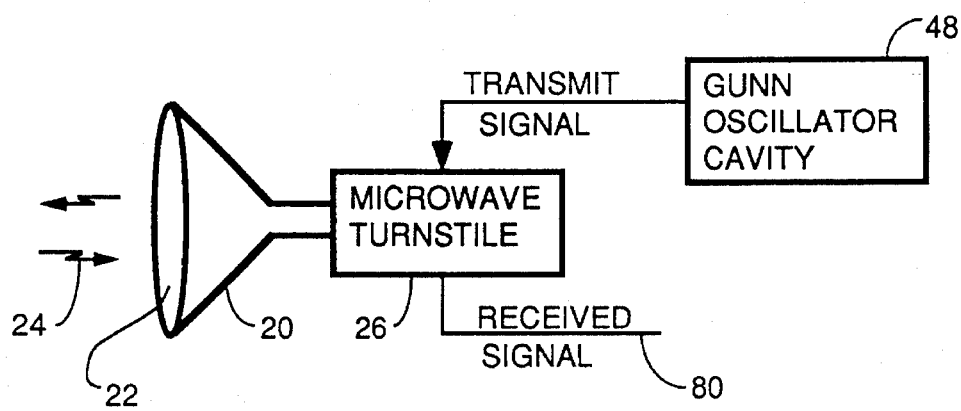
FIG. 2 is a block diagram of each of the antenna units.
Figure 3:
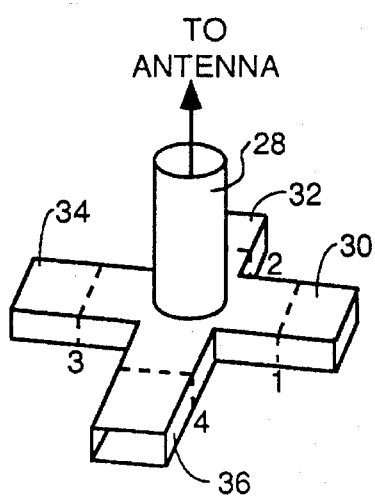
FIG. 3 is a symbolic view of a microwave turnstile that allows transmitting and receiving of microwave energy from the same antenna without switching circuitry.

Referring to FIG. 2, there is shown a block diagram of the antenna unit such as antenna unit 10. A conventional microwave horn 20 having a conventional corrective lens 22 emits coherent microwave energy toward moving and non-moving objects in the scene in front of the antenna. Some of the microwave energy bounces off the moving and non-moving objects in the scene and returns as microwave energy 24. This energy is collected and concentrated in horn 20 and fed to a turnstile duplexer 26 (hereafter turnstile). The function of the turnstile 26 is to provide isolation between the transmitted and received microwave energy. Turnstiles are known and are described in Montgomery et al., *PRINCIPLES OF MICROWAVE CIRCUITS* TK6553.M637 which is hereby incorporated by reference. Basically, the turnstile is designed to allow the transmitter and receiver circuitry to share the same antenna. The physical configuration of a turnstile is shown in FIG. 3. A circular antenna port 28 coupled to four rectangular waveguides 30, 32, 34 and 36. Two of the waveguides are terminated in short circuits. The length of the circular waveguide port 28 is carefully selected such that, if waveguides 34 and 36 are short circuited, transmit energy fed into waveguide 30 is coupled out circular antenna port 28 to the antenna but not into waveguide 32. Likewise, received energy entering circular antenna port 28 from the antenna is coupled into received energy waveguide 32 but not into waveguide 30 coupled to the transmitter. The turnstile functions to couple right hand polarized signals in one direction, I.e., down one waveguide, couples left hand polarized signals in a different direction, I.e., down another waveguide, thereby providing isolation. When a radar signal bounces off an object, its polarization changes from one polarization to the other.

Figure 4:
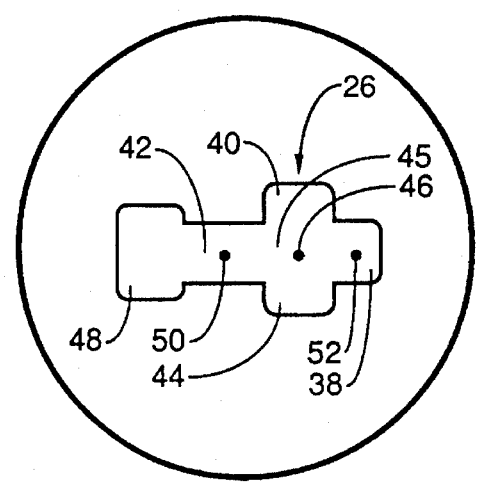
FIG. 4 is a symbolic plan view of the midplate and microwave turnstile structure showing the relative placements of the sniffer probe, the impedance balancing probe and the receiver probe.

More detail about the actual structure of the turnstile used in the improved traffic radar described herein is seen in FIG. 4. FIG. 4 is a plan view of a metal piece called a midplate which fits into the antenna structure just behind the horn 20. The actual antenna structure is cylindrical with an outside diameter substantially matching the outside diameter of the circular horn at its maximum diameter. This maximum diameter substantially matches the diameter of the midplate. Machined into the midplate are four rectangular, orthogonal waveguides designated 38, 40, 42 and 44 designed for use with microwave signals at a frequency of 34.7 gHz and are useable over a bandwidth of ±500 MHz. These waveguides take the form of rectangular shaped pits machined into the surface of the midplate joined to a central plenum 45 in which an impedance matching stub 46 is formed. The impedance matching stub points up out of the page from the floor of the central plenum where the waveguides join. The outline of the perimeters of the waveguides is visible in FIG. 4 as the crucifix shaped continuous line. A metal plate (not shown) is affixed to the top of the midplate to form a ceiling of the waveguides. An opening in this metal plate into the mouth of the horn allows microwave energy to leave the plenum and enter the horn and allows energy from the horn to enter the plenum.

Waveguides 40 and 44 are terminated in short circuits and have a difference in length of ¼ wavelength to provide a phase difference which converts rectangular polarization generated by the transmitter to the circular polarization that is transmitted. The circularly polarized energy is transmitted upward out of the page by impedance matching stub 46 and into the horn (not shown). Waveguide 42 joins the central plenum 45 to a Gunn oscillator cavity 48. Waveguide 38 guides received microwave energy to the detector diodes (not shown) in the receiver circuitry. A sniffer probe 50 couples some of the transmitted energy from Gunn oscillator cavity 48 to a mixer (not shown) for beating down the received energy to determine the amount of Doppler shift that has occurred. Another sniffer probe 52 in waveguide 38 couples received energy in waveguide 38 to detector diodes (not shown). The receive probe 52 is ¼ wavelength long, but the sniffer probe 50 need not be ¼ wavelength because it is only used to sample the transmitted energy. The mixer circuitry and detector diodes are mounted on the reverse side of the midplate to be described next.

The construction details for the waveguide structure and the impedance matching stub are shown in FIGS. 7–9. FIG. 7 is a plan view of the midplate side showing the waveguides drawn to 135% of scale. FIG. 8 is a sectional view of the midplate taken along section line 8—8' through the turnstile area and Gunn oscillator cavity. FIG. 9 is a detailed plan view of the turnstile area and Gunn oscillator cavity.

DOUBLE BALANCED ANTENNA STRUCTURE FOR NOISE AND HARMONIC SUPPRESSION

Figure 5:
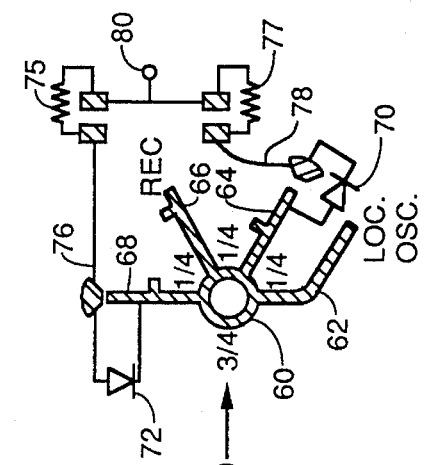
FIG. 5 is a plan view of the ring hybrid and double balanced mixer diode structure on the backside of the midplate opposite the microwave turnstile waveguide structure.

Referring to FIG. 5, there is shown a plan view of the layout of the double balanced ring hybrid mixer structure 59 which improves the common mode noise rejection characteristics of the traffic radar according to the teachings of the invention. The double balanced mixer structure of the preferred embodiment uses push-pull mixer diodes to suppress even order harmonic distortion. The ring hybrid structure of FIG. 5 is formed on the backside of the midplate structure shown in FIG. 4. A ring hybrid structure 60 in the form of a circle of metal or other conductor which is electrically coupled to four electrically conductive strips 62, 64, 66 and 68. Conductor 62 is coupled between the ring hybrid 60 and a feed-through conductor coupled to the sniffer probe 50 shown in FIG. 4. Conductor 66 is coupled between the ring hybrid 60 and a feed-through conductor coupled to the received energy probe 52 shown in FIG. 4. Conductor 64 is coupled between ring hybrid 60 and a mixer diode 70. Conductor 68 is coupled between ring hybrid 60 and diode 72.

The purpose of the ring hybrid 60 is to prevent coupling of any energy from the local oscillator on conductor 62 into the receive conductor 66. Likewise, the ring hybrid 60 serves to prevent coupling of any energy received by the receiver probe 52 from conductor 66 into conductor 62. It is also a function of the ring hybrid to insure that when there is no received signal, no local oscillator signal gets to the mixer diodes. Also, the ring hybrid serves to prevent any received signal from reaching the mixer diodes when the local oscillator is not functioning.

The manner in which the ring hybrid 60 performs its isolation function is based upon the differences in physical dimensions between the four conductive arms connected to the ring hybrid and the phase differences which result therefrom during propagation of signals from the local oscillator and receiver probes around the ring. For example, the signal from the local oscillator enters the ring hybrid at the junction thereof with conductor 62 and travels around both halves of the ring to reach the conductor 68 coupled to one of the mixer diodes 72. Since the distance around the left half of the ring is 0.75 wavelength and the distance around the right half of the ring is 0.75 wavelength (the distances between conductive arms in fractions of a wavelength is written in the spaces between the conductors just outside the ring), the two local oscillator signals arrive in phase and are coupled into conductor 68 to the mixing diode. Likewise, the local oscillator signal reaches the other mixer diode 70 by travelling 0.25 wavelength around the right half of the ring and 1.25 wavelengths around the left half. Therefore, these two signal components reach conductor 64 in phase and couple into conductor 64 to reach mixer diode 70. Conversely, the local oscillator signals reach conductor 66 coupled to the receiver probe 52 out of phase, because the two signals components travel 1 wavelength around the left half and 0.5 wavelengths around the right half. Because the two signals components are out of phase when they reach conductor 66, they cancel and no local oscillator signal reaches the receiver probe 52 through conductor 66. Likewise, signal from the receiver probe 52 enters the ring hybrid at the intersection thereof with conductor 66. From there it travels 0.25 wavelengths around the right side of the ring to reach arm 68 and 1.25 wavelengths around the left side of the ring. Therefore, the two signal components reach arm 68 in phase and are coupled to the mixer diode 72. Likewise, the signal from the receiver probe travels 0.25 wavelengths to conductor 64 around the right side of the ring and 1.25 wavelengths around the left side of the ring. Therefore, the two signal components reach conductor 64 in phase and couple to the mixer diode 70. No signal from the receiver probe couples into the local oscillator conductor 62 because the two signal components travel 0.5 and 1 wavelengths, respectively, around the ring hybrid to reach conductor 62. Therefore, the two receive probe signal components are out of phase at conductor 62 and cancel each other out and no receive probe energy is coupled to the local oscillator.

The mixer output is shown at 80. No local oscillator energy appears at the mixer output 80, because the local oscillator signal on conductor 64 is 180 degrees out of phase with the local oscillator signal on conductor 68 because of the differences in path length traversed by the signals from the local oscillator around the ring hybrid before reaching the mixer diodes 72 and 70. Conversely, the signal components on conductors 64 and 68 from the receiver probe conductor 66 are in phase (0.25 and 0.25 path lengths, respectively, from conductor 66 to conductors 64 and 68) and therefore the receiver signal components from the mixer diodes 70 and 72 are in phase and add at the mixer output 80. However, these signals are such low levels and at such high frequencies as to be invisible to the audio and digital circuitry coupled to the mixer output 80. The beat frequency mix product signals propagating along conductors 76 and 78 and through 10 ohm resistors 75 and 77 are at audio frequencies and are in phase and therefore they add at the mixer output 80. The frequency of the beat frequency components depends upon the Doppler shifts caused by the relative speeds between the patrol car and the various objects painted by the radar which cause radar returns. These Doppler shifts generally result in the beat frequency components in the audible range.

The ring hybrid structure is a push-push, double-balanced structure because of the structure of the ring hybrid 60 and the fact that the mixer diode 72 has its cathode coupled to conductor 68 while mixer diode 70 has its anode coupled to conductor 64. The push-pull structure arrangement of the diodes is a function of the fact that the local oscillator signals reach the mixer diodes coupled to conductors 64 and 68 180 degrees out of phase so that when one diode is turned off by the local oscillator signal, the other is turned on by it and vice versa 180 degrees later.

Best performance is obtained when the diodes are matched, but the variation between production diodes is so small that, in practice, the diodes are not matched.

The advantage of using a double balanced structure is in better signal-to-noise ratio by virtue of rejection of common mode noise. Also, lower noise results from the fact that the local oscillator signal components on conductors 78 and 76 are out of phase with each other and cancel at mixer output. This is very important because the local oscillator signal always has common mode noise on it since it is impossible to generate a noise free local oscillator signal. In the single ended mixers used in prior art police traffic radars, the mixer output contains significant amounts of noise caused by rectification of the amplitude noise components in the local oscillator signal alone.

Another significant advantage of using the double balanced mixer design is that no even harmonics are generated in the nonlinear mixer diodes. This is because the local oscillator signals arrive at the two mixer diodes 180 degrees out of phase in one mixer diode relative to the other. The elimination of the even harmonics greatly increases the sensitivity of the radar in the following way. The law requires that traffic radar display the speed of only the strongest signal. Police radars, when used while the patrol car is moving, receive returns from stationary objects from which the patrol car speed is derived, and they receive returns from moving objects from which a closing speed is derived. The speed of the target is derived from subtracting the patrol speed from the target's closing speed. The presence of harmonics in the mixer output confuses the radar, because the system cannot tell whether the harmonic signals are real targets or harmonics. The harmonics are of lesser amplitude as the harmonic number goes up. Therefore, the third and fourth harmonics are of less amplitude than the second harmonic. Unfortunately, the second harmonic can be quite strong, especially, the second harmonic of the patrol car speed. If this second harmonic is present in the mixer output and it is stronger than the other signals from actual target(s), by law the radar cannot display any target speed, even if the radar is smart enough to know that the strongest signal is a harmonic. Therefore, none of the weaker signals from targets can be displayed and the police radar is essentially blinded to these weaker signals as their returns must either be ignored or suppressed. Thus, in police radars not using the double balanced mixer design, sensitivity to weak returns is not optimal. By using the double balanced mixer design to eliminate the even numbered harmonics, the sensitivity of the receiver to weak target returns is improved because only the third and fifth harmonics remain to be dealt with. Since these harmonics are weaker in amplitude than the second order harmonic, the sensitivity of the radar is improved. The third order harmonic is suppressed by the software of the improved radar system.

In general, the received data at the antenna is sampled at typically 44 kHz and each sample results in a 16-bit serial data word produced by the Analog to Digital Converter. The ADC also generates a framing signal at the sample rate and synchronous clock signal running at 32 times the sample rate (approx. 1.8 mHz). The first 24 of each 32 clock pulses are used by a logic array (GAL-see discussion of GAL 252 below) to form a 24 bit serial word with the first 16 bits being allocated to the received data and the last 8 bits representing various status conditions (RFI, Antenna type). The microprocessor in the counter/display unit 12 includes a hardware Synchronous Serial Interface (SSI) facility for conversion between serial and parallel data formats. The SSI contains both a receive and transmit data section which is set up by software initialization to an externally clocked, 24-bit word configuration. As each serial data word from the antenna is received, a control word is shifted out from the SSI transmit section and serially transmitted to the antenna unit. The control word has 2 bits assigned to transmitter on/off control, 3 bits assigned to gain control of the analog signal amplifier in the antenna and a bit which is used to inject the self-test signal into the amplifier section. The control word is converted into parallel form in the antenna by shift register which is latched by a pulse from the GAL at the completion of each transmission.

Digital gain control of an amplifier section in the antenna is performed by the microprocessor in the counting/display unit 12. The software structure involved in gain control consists of a Receive Interrupt routine and subroutines in the main program loop. The Receive Interrupt routine has highest priority in the interrupt structure and has a modulo 4096 address pointer which loads each received word into a circular buffer in RAM. The circular buffer is broken into two 2048 word data blocks. The most recently completed block of received data is processed by the main program loop as the next block to be processed is built by the Received Interrupt. In order to minimize the effect of transient signals introduced by step changes in the gain of the signal amplifier, the gain is only changed at the time that the received data block is completed and ready for processing and a new data block is beginning. To achieve this, when the main program loop completes processing the oldest data block, it waits for the values of the interrupt address pointer to indicate that the newest block is nearly complete. Computation for gain change is made at that time and any gain changes made take effect at the start of the next data block. The Gain Analysis subroutine does a comparison within the newest data block for the absolute peak signal value within the block. The comparison does not include 64 points at the beginning and end of the data block to avoid contamination by gain change transients as mentioned above. If the peak value is less than a predefined low value, a gain increase is called for by the subroutine. If the peak is greater than a high value (typically 50% of the analog-to-digital converter or ADC dynamic range) a gain decrease is called for. In addition, if the peak value is greater than 90% of the ADC dynamic range, an overload may have occurred and an overload flag is set which notifies following routines in the main program loop that the data block is invalid. The 2048 24-bit words in the data block are also logically "ORED" into a test word at this time. If an RFI (Radio Frequency Interference) condition existed during any of the received words in the block, it will appear at the corresponding bit position in the test word and an RFI flag will be set. The received data word also has certain bit positions that are always zero. If these positions are not zero in the test word, a loss of receive synchronization is indicated and the main program will act to re-initialize the SSI.

Figure 6:
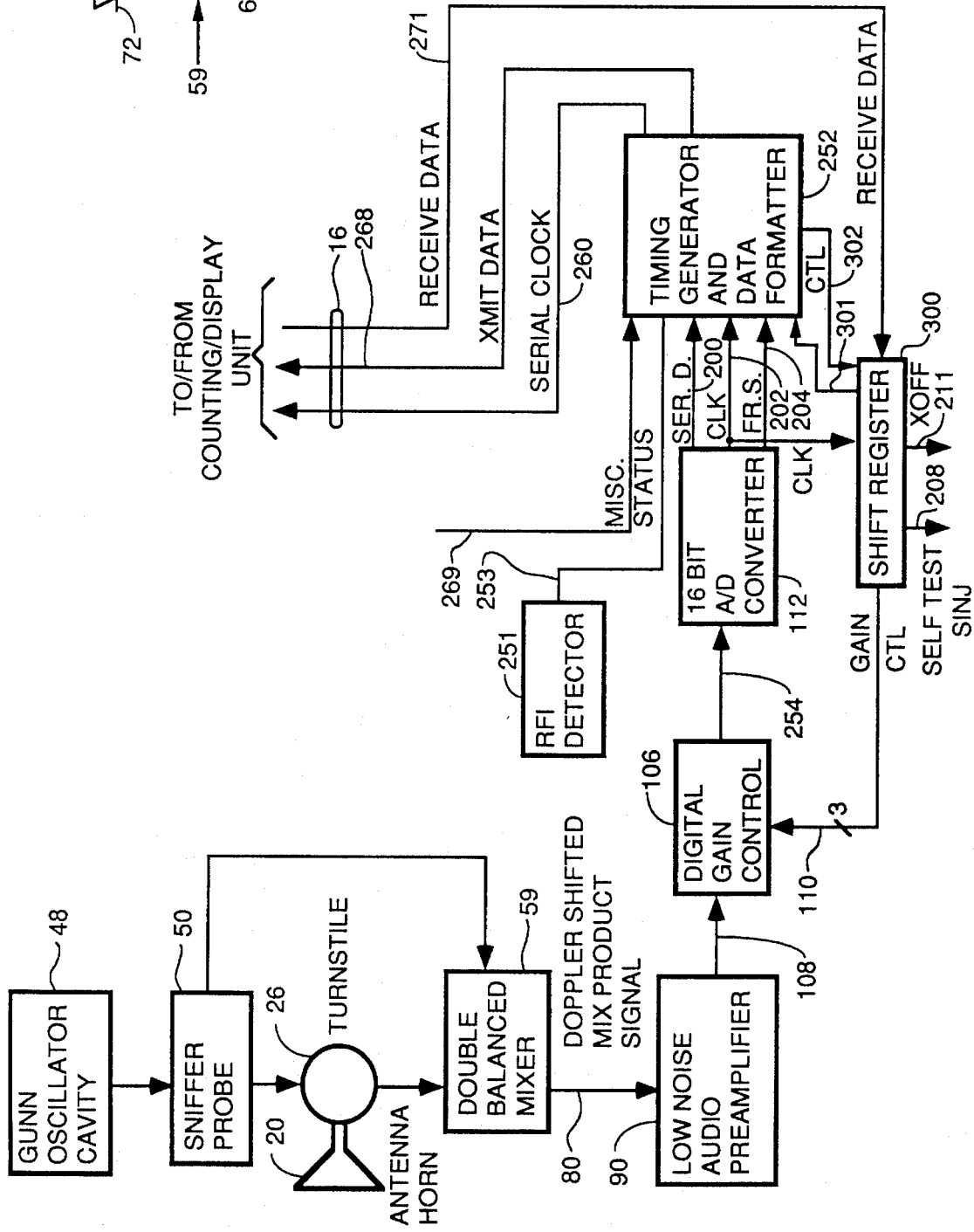
FIG. 6 is a block diagram of each of the antenna structures.

Referring to FIG. 6, there is shown a block diagram of the analog and digital circuitry within each of antennas 10 and 11 in FIG. 1. Some of the microwave circuitry and waveguides have already been discussed and are represented in block form such as the Gunn oscillator 48, the sniffer probe 50, the turnstile 26, the antenna 20 and the double balanced mixer 59.

Figure 10:
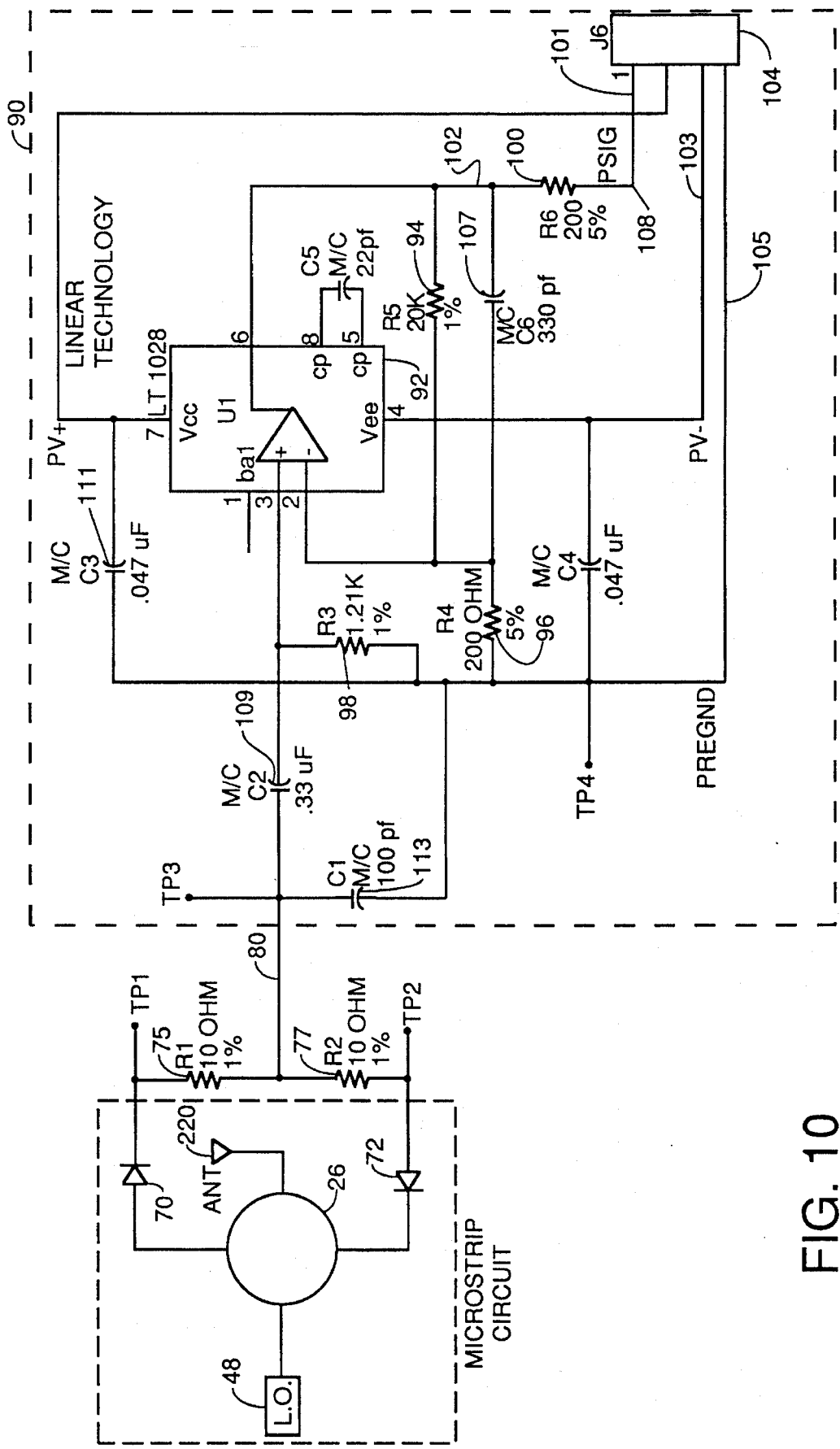
FIG. 10 is a schematic diagram of the low noise preamplifier circuit that amplifies the mix product signal from the mixer diodes before gain adjustment and analog-to-digital conversion.

The output of the double balanced mixer 59 at node 80 is coupled to a conventional low noise audio preamplifier 90 which is integrated on the same surface as the ring hybrid using a surface mount integrated circuit. In the preferred embodiment, the low noise preamplifier utilizes a model LT1028 integrated circuit amplifier available commercially from Linear Technology with a one nanovolt per root Hertz noise specification. The remaining components of the preamplifier 90 are shown in schematic diagram form in FIG. 10. The LT1028 integrated circuit amplifier 92 has a gain of 100 established by the resistors 94 and 96. Resistor 98 establishes the video load impedance on the double balanced mixer. The rest of the components are optimized for best signal-to-noise to-noise performance. The amplified audio signal is output to isolation resistor 100 on line 102 to a "connector" 104 comprised of a plurality of feedthrough capacitors which serve to prevent external RF energy from getting into the preamplifier circuit. Resistor 100 isolates the amplifier from the bypass capacitance in the feedthrough connector (which shunt any RF energy on the feedthrough lines to signal ground) so as to prevent destabilization of the amplifier. Connector 104 feeds the audio signal to a digitally controlled gain control circuit 106 on FIG. 6 (also shown in schematic form on FIGS. 11A and 11B). Lines 101 and 103 supply power to the integrated circuit and line 105 is a common ground line which is tied to the ground of the counter/display unit 12 in FIG. 1 and to the patrol car ground. Capacitor 107 provides a 20 KHz rolloff in frequency response to prevent aliasing in the downstream analog-to-digital conversion circuitry. Capacitor 109 provides DC blocking of any DC component coming out of the mixer, and capacitor 111 provides power supply bypass to couple any RF energy on the power lines to ground. Capacitor 113 shunts any RF on the mixer output line 80 to signal ground.

Referring again to FIG. 6, the digital gain control circuit 106 alters the amplitude level of the audio signal on line 108 from the preamplifier under control of a three bit digital signal on bus 110. The amplitude can therefore be altered to any of 8 discrete gain levels of 9 db each depending upon the states of the three bits on bus 110. The digital GAIN CTL signal on line 110 is plucked from the stream of data packets sent by the counter/display unit 12 to the antenna unit on bus 16. Bus 16 is bi-directional and carries multiple streams of data packets back and forth between the counter/display unit 12 and the antenna units 10 and 11 in FIG. 1.

Figure 11A:
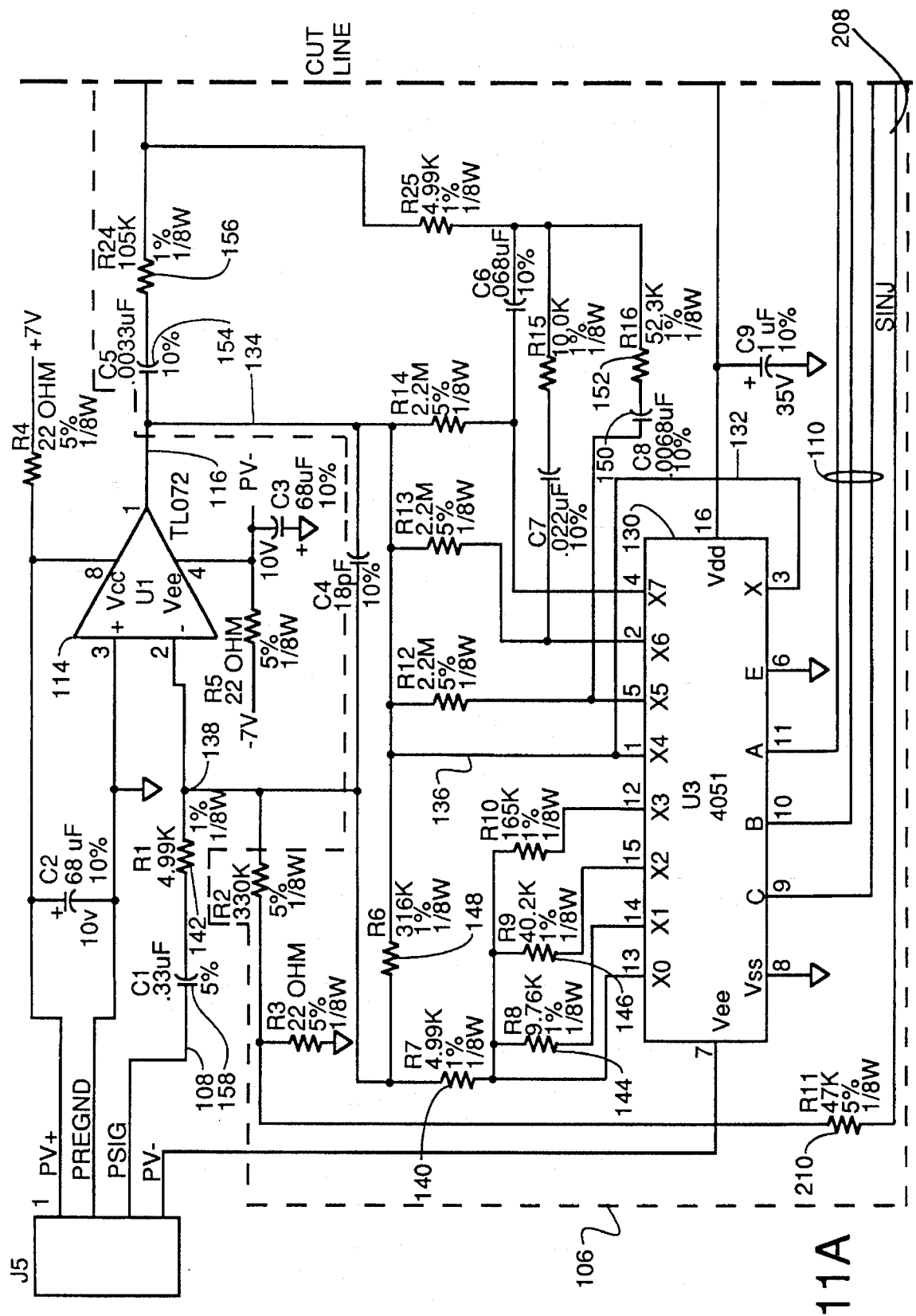
FIGS. 11A and 11B are a schematic diagram of the analog-to-digital converter and digital gain control circuitry of the preferred embodiment of the antenna unit.
Figure 11B:
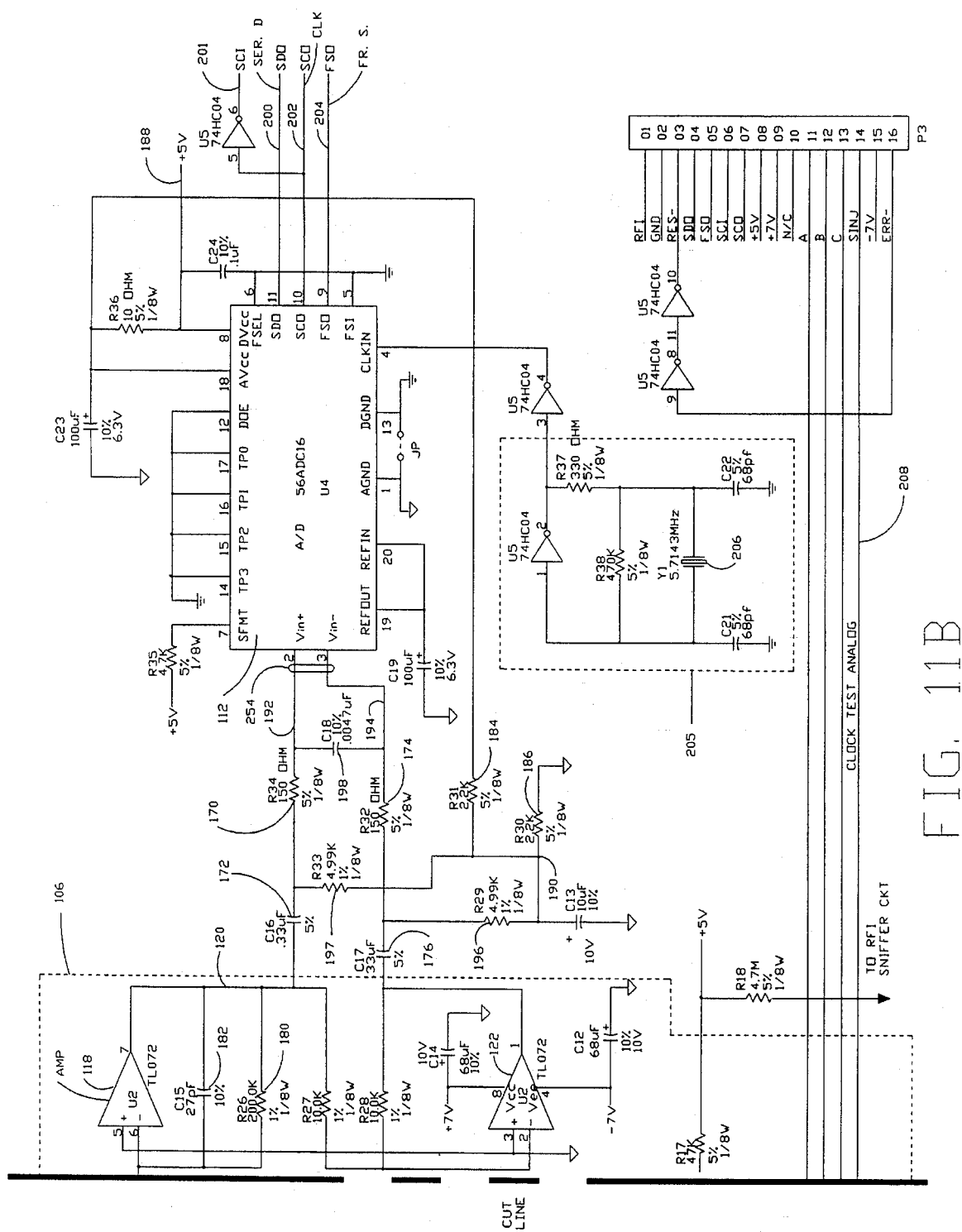

Referring to FIGS. 11A and 11B, there is shown a schematic diagram of the portion of the antenna circuitry shown in FIG. 6 which includes digital gain control circuit 106 and analog-to-digital converter 112 (hereafter A/D converter 112). The audio output signal PSIG of the preamplifier 90 is applied via line 108 to the inverting input of a Texas Instruments TL072 differential amplifier 114. The output of this amplifier on line 116 is applied to the inverting input of another Texas Instruments TL072 differential amplifier 118 on FIG. 11B. The output of amplifier 118 is applied via line 120 to the input of another Texas Instruments TL072 differential amplifier 122 connected as a unity gain phase invertor. Amplifiers 120 and 122 serve to provide push-pull inputs to the A/D converter 112 for better noise immunity and wide dynamic range. The use of the push-pull inputs to the A/D converter gives better common mode noise immunity to noise on the power supply and ground lines etc. The A/D converter 112, in the preferred embodiment, is a Motorola 56ADC16.

The digital gain control circuit is implemented with a CMOS multiplexer 130 which has three switching control inputs labelled A, B and C and 8 output pins labelled X0–X7. The states of the three bits on bus 110 coupled to the A, B and C inputs controls which of the 8 output pins is coupled to the X pin. The X pin is coupled by line 132 to the X4 pin. The X0 through X7 pins are coupled to various sizes of gain setting input and feedback resistors for amplifiers 114 and 118 to change the gain. The output of the amplifier 114 is connected to the X pin via lines 134, 136 and 132. The lowest gain setting will result when the bits on bus 110 cause the X pin to be coupled to the X0 pin. In such a case, the output 116 of amplifier 114 is coupled back to the summing junction/input node 138 of amplifier 114 through 4.99 Kohm resistor 140. Since the input resistance of amplifier 114 is set by resistor 142 at 4.99K, the amplifier is running at unity gain in this configuration. Likewise, when the bits A-C are set so as to connect the X pin to the X1 pin, 9.76K resistor 144 is added in series with resistor 140, so the gain becomes the ratio (9.76K+4.99K)/4.99K. Similarly, when the X pin is connected to the X2 pin, 40.2K resistor 146 is coupled in series with resistor 140 so the gain of amplifier 114 becomes (40.2 K+4.99K)/4.99K. Therefore, the gain of the amplifier 114 becomes successively higher as the bit pattern on bus 110 changes so as to connect the X pin to higher order pins until X is connected to X4. At that point, the only feedback resistance for amplifier 114 is the 316K resistor which causes amplifier 114 to run at its highest possible gain. When the input bits A-C are set to couple the X pin to the X5 pin, capacitor 150 and resistor 152 are switched into parallel with the RC input network for amplifier 118 comprised of capacitor 154 and resistor 156. Since capacitor 154 and resistor 156 are fairly high impedance values in the frequency range of interest, amplifier 118 runs at fairly low gain until capacitor 150 and resistor 152 are switched into parallel.

When that happens, the impedance of the input circuit between the output of amplifier 114 and the input of amplifier 118 drops, and the gain of amplifier 118 rises. The combination of capacitor 150 and resistor 152 have the same time constant as the combination of capacitor 154 and resistor 156 so as to not alter the low frequency rolloff of the passband from the 500 Hertz established by the filter of capacitor 154 and resistor 156 and the combination of capacitor 158 and resistor 142 for amplifier 114. This low frequency corner of the passband is also implemented by the filters in FIG. 11B comprised of resistors 170 and 174 and their series capacitors 172 and 176.

As the bits on bus 110 couple the X pin to the X5, X6 and X7 pins in different states of the A, B and C bits, lower and lower impedance RC combinations are connected in parallel with the RC combination comprised of capacitor 154 and resistor 156. This lowers the input impedance from the output of the amplifier 114 to the input of the amplifier 118. Since the gain of amplifier 118 is equal to the feedback impedance divided by the input impedance, the gain of amplifier 118 rises in 3 distinct steps since the feedback impedance established by the resistor 180 and the capacitor 182 is fixed. Thus, the gain is controlled by first raising the gain of the amplifier 114 to the maximum extent possible to maintain best signal-to-noise ratio, and then, when the maximum gain is reached, the gain of stage 118 is raised.

The overall gain of the circuit shown in FIGS. 11A and 11B is about 10,000 when operating at full gain.

Bias for the input lines of the A/D converter 112 is established by resistors 184 and 186 which act as a voltage divider to divide the 5 volt power supply voltage on line 188 in half. The resulting voltage of approximately 2.5 volts is applied to the A/D converter inputs at 192 and 194 by resistors 196 and 197. Resistors 170 and 174 combine with capacitor 198 to further remove any high frequency noise on the input lines 192 and 194.

The A/D converter 112 produces three output signals: SER D. on line 200 which is the digitized form of the analog signals on lines 192 and 194 in serial format; CLK on line 202 which is a clock pulse for every bit of serial data; and FR. S. on line 204 which is a signal which occurs every 32 bits of serial data on line 200. The FRAME SYNC signal is used by the counter/display unit as a reference point to assemble packets of 32 bits into a parallel data word. The A/D converter only generates 16 bits of serial data, and either resends the same 16 bits out on line 200 during the second 16 bit interval or sends all zeroes. These same signals (in abbreviated form) are shown in FIG. 6 on signal lines with the same reference numbers.

A crystal oscillator 205 having a 5.7143 MHz crystal 206 generates the clock signal for the A/D converter which establishes the sample rate. The sample rate is 44.643 KHz and is set by dividing the clock rate by 128.

In order to correctly interpret the serial data, the counter/display unit must know the sample rate and that the clock signal supplied to the A/D converter 112 is correct. To insure that the serial data was generated at a 44.643 KHz clock rate and that the A/D converter and gain control system is working correctly, the system has a self-test feature. This feature is implemented by the counter/display unit 12 in FIG. 1 injecting an analog signal of known frequency and amplitude into the analog signal input of the circuitry shown on FIGS. 11A and 11B. This test signal is the signal SINJ on line 208. This signal gets coupled to the summing junction input 138 of amplifier 114 through resistor 210. By examining the resulting serial data on line 200 when SINJ is injected, the counter/display unit can determine whether the gain control circuitry, clock and A/D converter are working correctly.

Figure 12:
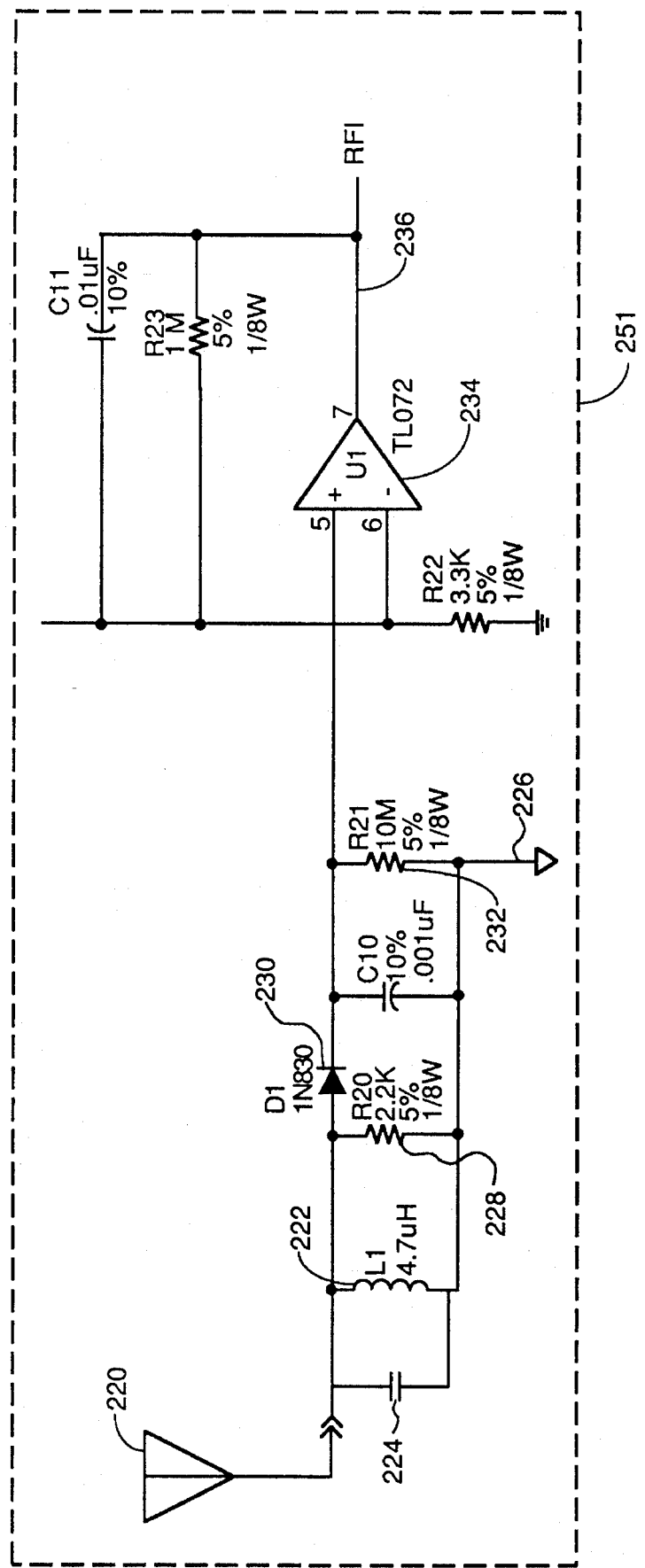
FIG. 12 is a schematic of the RFI Detector circuit.

Referring to FIG. 12, there is shown a schematic diagram of an RFI detector or RF sniffer that serves to detect the presence of interfering RF signals and signal the counting/display unit that its readings of target speeds may be invalid because of RF interference. One of the principal frequencies where RF interference is likely to occur is at about 27 MHz which is the citizen's band frequency. In order to detect radio frequency interference or RFI, the antenna unit of the traffic radar includes a tiny wife stub antenna which is coupled to an RF choke inductor 222 which has a value selected to resonant with the apparent capacitance of the antenna 220 at 27 MHz. The apparent capacitance of the antenna is represented by the capacitor 224. This parallel tuned circuit therefore is at maximum impedance at 27 MHz and generates the maximum voltage drop across it to signal ground 226 at that frequency. The RFI detector is a broadband, low Q circuit designed to sense the presence of RFI anywhere in the band from about 27 MHz up to about 500 MHz. Resistor 228 lowers the Q of the circuit to provide the broadband response. Diode 230 is a low level Schottky Barrier detector diode that can detect signals with as low an amplitude as one millionth of a watt. The diode works best when loaded with a very high output impedance. Therefore, a 10 megohm resistor and a high input impedance FET amplifier 234 couple the cathode of the amplifier to ground. The FET amplifier 234 has a gain of 300. The output of the FET amplifier is an analog RFI signal on line 236.

Figure 13A:
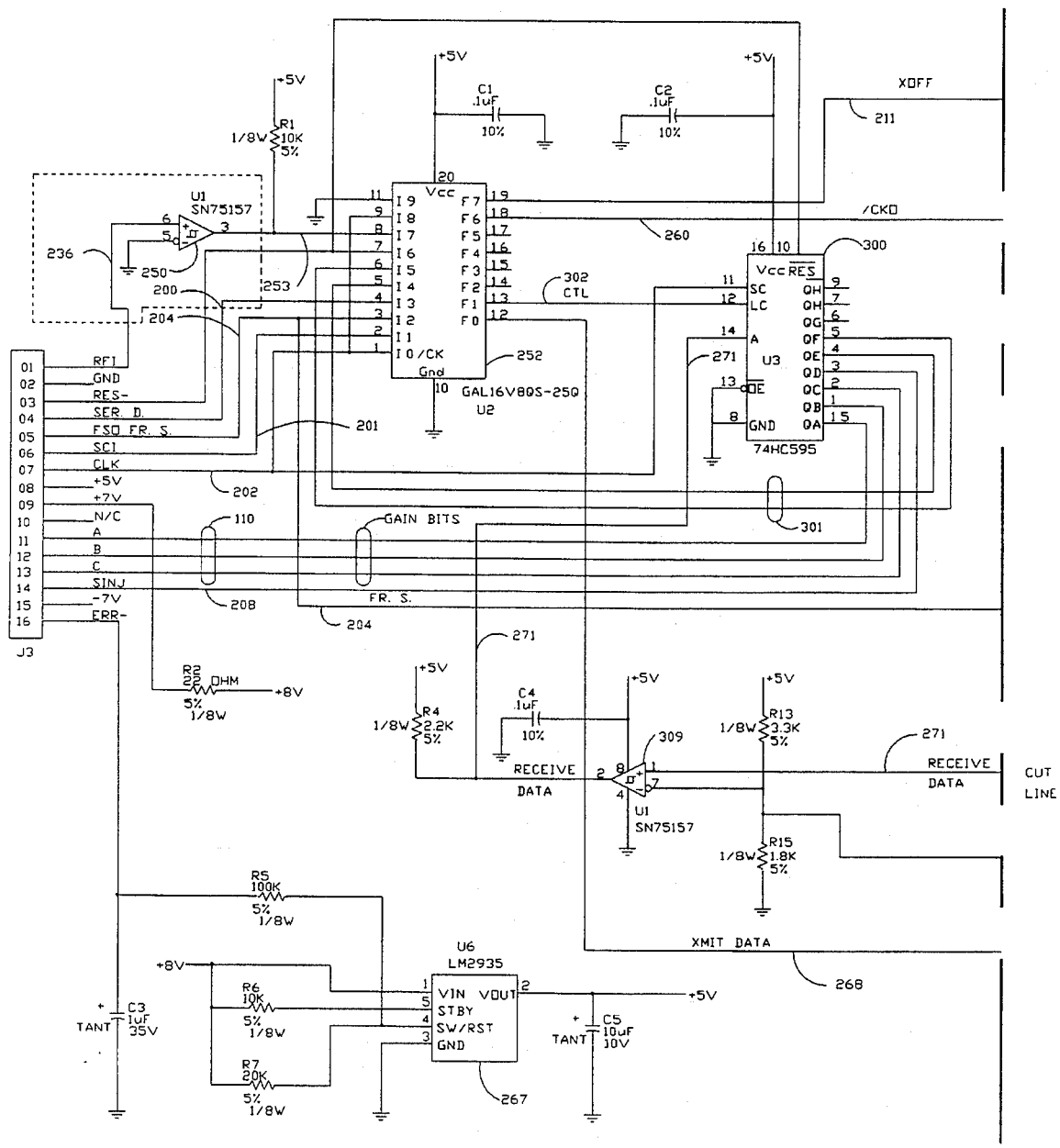
FIGS. 13A is a 13B are a schematic diagram of the gate array logic and the transmit an receive line drivers of the preferred embodiment of each of the antenna units.
Figure 13B:
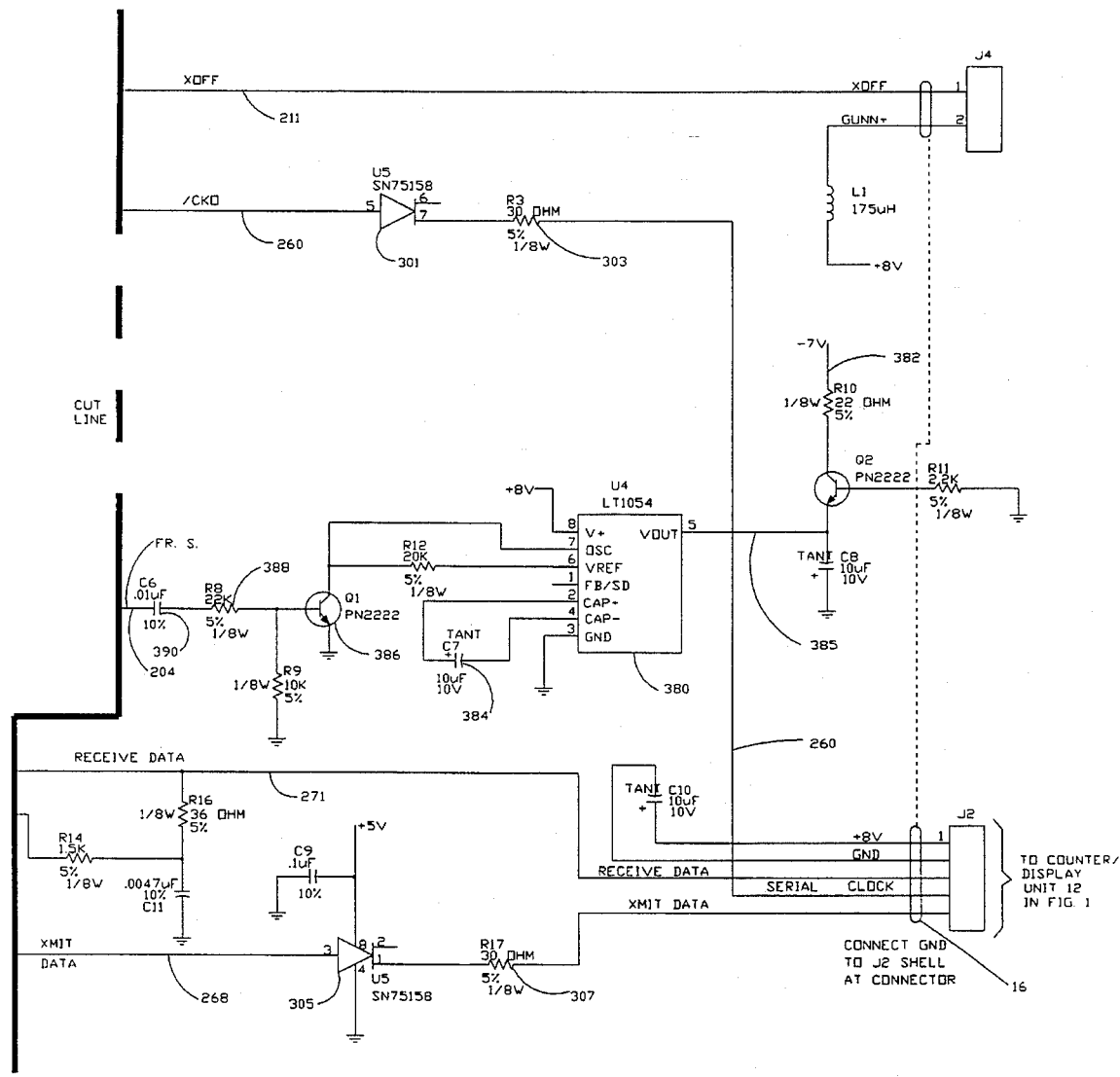

Referring to FIGS. 13A and 13B, there is shown a schematic diagram of the digital circuitry within each of antennas 10 and 11 in FIG. 1. The analog RFI signal on line 236 is coupled to an RS422 receiver 250 which is basically a comparator with hysteresis. The comparator 250 serves as an RFI threshold detector by comparing the analog voltage on line 236 to an internal reference signal which is about ½ the power supply Vcc level. When the amplitude of the RFI signal rises above the reference level sufficiently to overcome the hysteresis, the comparator 250 Changes states thereby altering the logic level applied to pin 8 of a gate array logic integrated circuit 252. This signals that RFI interference is present and the speed readings may be unreliable.

The gate array logic 252 functions as the timing generator and formatter in FIG. 6. The purpose of this circuit is to format the data in the 32 bit frames of serial data arriving on line 200 from the A/D converter 112 into a special frame. This special frame of data includes both target speed data and management and control data. Specifically, gate array logic converts the 32 bits in every frame on line 200 into a frame with the first 24 bits representing the doppler shifted analog signal on line 254 from the digital gain control circuit 106 and the last 8 bits reserved for management and control data with an interrupt generated just before the frame sync pulse. No target speed data is lost in this process because all the target speed data in included in the first 16 bits in every frame, and the last 16 bits of every frame are either a repeat of the first 16 bits or all zeroes. The gate array logic converts the serial clock signal on line 202 of FIG. 6 to an altered serial clock signal on line 260 so that the receiving circuitry at the counter/display unit can recover the frame sync signal from the altered serial clock signal on line 260. The manner in which this is done can best be understood by reference to FIG. 14. Recovery of the frame sync signal by the counter/display unit 12 in FIG. 1 is used by the counter/display unit to frame its own transmissions of data back to the antennas.

In this way, only one clock can be used to synchronize transmissions of serial digital data in both directions.

Figure 14:
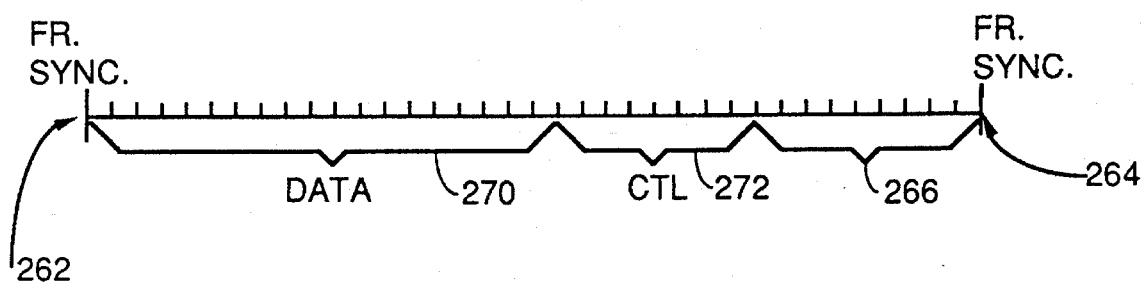
FIG. 14 is diagram of the timing relationship of the clock pulses and silent interval in every frame of serial digital data transmitted from the antenna to the processing and display unit relative to the frame sync signals that define the boundaries of each frame.

FIG. 14 shows a single frame of clock signals of the modified clock signal on line 260 in FIG. 6. The relative times of the frame sync signals which are generated on line 204 by the A/D converter 112 in FIG. 6 are shown at 262 and 264 in FIG. 14. Between these two times, 32 clock pulses occur on line 200 in FIG. 6. The gate array logic 252 in FIGS. 6 and 13A serves to pass the clock pulses on line 200 along to line 260 but to delete the last 8 clock pulses of each frame. This interval of no clock pulses in every frame is represented by bracket 266 in FIG. 14. Thus, line 260 contains, for each frame 24 clock pulses followed by an interval equal to 8 clock pulses during which no clock pulses occur. In some embodiments, the number of deleted clock pulses can be more or less than 8 so long as the interval marked by an absence of clock pulses is long enough to be detectable in the counter/display unit 12 so that the frame sync pulses can be reconstructed. No frame sync pulses are transmitted on line 260 in FIG. 6. Instead, this "silent" interval 266 in FIG. 14 is detected in the counter display unit, and used to regenerate a frame sync pulse within the counter display unit. This is done by using a retriggerable flip-flop to detect the silent interval, and arm a frame sync generation circuit. Then, when the next clock signal occurs, a frame sync pulse is immediately generated.

The gate array logic 252 in FIG. 6 also passes the SERIAL DATA signal from line 200 onto line 268 as the XMIT DATA signal for transmission to the counter/display unit 12 in FIG. 1 in synchronization with the SERIAL CLOCK signal on line 260. The target speed data is contained in the bits transmitted during the first 16 clock intervals represented by interval 270 in FIG. 14. Interval 272 is reserved for management and control data.

There are 8 control bits which are transmitted during interval 272 in FIG. 14. Some of these are a known pattern which used as a frame reliability check by a digital signal processor (hereafter DSP) in the counter/display unit to be discussed below. In other words, the DSP looks for this known pattern of bits (several consecutive zeroes) during interval 272 as a reliability indicator to verify that the bits transmitted during that frame are probably correct and synchronization has been maintained in the transmission. Therefore, an additional function of the gate array logic is to insert the known bit pattern into the serial data stream on line 268 in FIG. 6 being transmitted to the counter/display unit during interval 272.

In addition, one of the 8 control bits transmitted during interval 272 is reserved for the output of the RFI comparator 250. When radio frequency interference is present, the RFI detector 251, comprised of the circuitry of FIG. 12 plus comparator 250 on FIG. 13A, outputs a logic 1 on line 253 to the gate array logic 252. The gate array logic then inserts this bit into one of the control bits transmitted as XMIT DATA on line 268 in FIG. 6 during interval 272 to signal the DSP that the target speed data may be unreliable. In alternative embodiments, where the digital data path between the antenna unit and the counting unit is a parallel format data path, control and status information can be sent between these two units as parallel format bytes, or by modifications of a transmitted clock duty cycle, clock phase, clock pulse amplitude, I.e., some clock attribute with the variation of the clock attributed mapped by any form of coding to the control and status data to be sent. Separate unidirectional parallel data paths for transmitting from antenna to counting unit and from counting unit to antenna may be used in some alternative embodiments, or a single parallel data path which is bidirectional and time or frequency division multiplexed may also be used.

The other control bits can be used for such things as "personality" bits to indicate, for example, that the particular antenna connected to the counter/display unit 12 is 24 GHz as opposed to 34 GHz etc. or other items of information that the DSP must know to properly process signals received from the antennas. These bits are labelled as the MISC STATUS bits on bus 269 in FIG. 6. Typically, these personality bits will be supplied from a hard wired source, or a register that is written at power-up time from an EPROM, EEPROM or a ROM (not shown).

A timing diagram for the relationships between the signals tha that are input and output from the gate array logic 252 in FIG. 13A is shown in FIG. 15B.

The counter/display unit also sends data to the antenna units to control various things. That data comes into the antenna-unit on the RECEIVE DATA bus 271. The RECEIVE DATA bits are a serial data stream which includes gain control bits, a transmit on/off control bit which control when the traffic radar emits radar energy to paint a target, and the self test signal previously discussed. This serial data stream is applied to the serial data input of a serial-in-parallel-out shift register 300. This shift register receives its clock signal from the clock signal generated by the A/D converter 112 on line 202 in FIG. 6. The gate array logic 252 generates a control signal on line 302 coupled to the shift register to cause it to output the various bits in parallel format such that the gain bits are put out in parallel on bus 110 and the self-test signal SINJ is output on line 208 and the XOFF transmit control signal providing on/off control for the Gunn oscillator is output on line 211. Some of the output signals from the shift register are coupled as inputs to the gate array logic 252 via bus 3012 The shift register therefor converts the serial format RECEIVE DATA into parallel format while simultaneously parsing out the various bits of the control word and applying the appropriate bits to the appropriate inputs.

The Boolean logic for the antenna gate array 252 is given in FIG. 15A. The Boolean relationships between the various signals that are input and output from the gate array logic are given in the section entitled "equations". The Boolean relationships of FIG. 15A, as with equations for all the gate array logic chips disclosed herein, were compiled using the Opal Jr. Compiler commercially available from National Semiconductor. The various logic signals that are combined using these Boolean relationships are defined by pin number in the four lines immediately above the equations sections. The first and fourth lines having numbers represent the pin numbers in FIG. 13A upon which appears the signal having the acronym given just below the pin-number or just above the pin number. The Boolean operators are represented by /=not, *=and, +=or.

Referring again to FIG. 13A, the shift register 300 is a 74HC595 with the CTL signal on line 302 coupled to its LC input. Other signal lines corresponding to signal lines disclosed in FIGS. 6 and 11B are given identical reference numbers. The SCI signal on line 201 is an inverted clock from the CLK signal on line 202. The XMIT DATA signal on line 268 emanates from pin 12 of the gate array logic. The RECEIVE DATA on line 271 is coupled to pin A of the shift register 300 and shifts serial data therein to load the shift register in synchronization with the same clock signal CLK that the gate array logic 252 uses. The frame sync signal FR. S. on line 204 is coupled to the base of transistor Q1 in FIG. 13A. The RECEIVE DATA signal on line 271 comes from connector J2 on FIG. 13B, and the XMIT DATA signal on line 268 goes to connector J2. J2 is connected by a serial interface cable 16 or 18 to the counter/display unit 12 in FIG. 1. The SERIAL CLOCK signal on line 260 in FIG. 6 corresponds to the /CKO signal emanating from pin 18 of the gate array logic 252 in FIG. 13A. This signal is buffered by an RS422 differential clock buffer 301 on FIG. 13B. A 30 ohm resistor 303 matches the impedance of line 260 to the impedance of the serial data cable 16 or 18 from the antenna to the counter/display unit 12 in FIG. 1. This impedance matching allows successful transmission of data without excessive reflection over a cable 16 which is about 25 feet long. Likewise, the XMIT DATA signal on line 268 is buffered by a RS422 differential clock buffer 305 on FIG. 13B with a 30 ohm impedance matching resistor 307. Likewise, the RECEIVE DATA signal on line 271 is buffered by a RS422 differential clock buffer 309 on FIG. 13A. The three digital gain bits on bus 110 are output at pins 1, 2 and 15 by the shift register 300 on FIG. 13A. The self test signal SINJ on line 208 is output by pin 3 of the shift register 300 and is a 5 KHz square wave generated by the counter/display unit. Integrated circuit 267 is a voltage regulator which supplies regulated 5 volt supply for the integrated circuits on the antenna digital circuit board.

In FIG. 13B, integrated circuit 380 is a negative voltage generator which serves to generate a negative voltage of −7 volts at terminal 382. This is done by alternately charging capacitor 384 to +8 volts and reversing the connections so that the terminal of the capacitor that is positive with respect to ground is connected to ground and the terminal that was formerly connected to ground is connected to the output line 385 of the integrated circuit. Switching by the integrated circuit is controlled by transistor 386 which has its base connected to the Fr. S. Frame sync signal. The resistor 388 and capacitor 390 convert the Fr.S. Signal into a pulse, and transistor 386 sharpens this pulse and applies it to the negative voltage converter 380. This arrangement causes the switching rate of the negative voltage converter 380 to be the same as the frame rate thereby eliminating a source of noise. The negative voltage source is needed for various ones of the analog and digital circuits on the antenna analog and digital boards.

The XOFF signal on line 211 in FIGS. 13A and 13B emanates from pin 19 of the gate array logic 252 and causes the Gunn oscillator to oscillate when it is a logic 1 and stops oscillation thereof when it is a logic 0. The Gunn oscillator circuit is shown on FIG. 16. The Gunn oscillator diode is coupled to terminal 320. In some embodiments, a varactor diode is coupled to terminal 322 to provide a tunable Gunn oscillator. Two bypass capacitors 324 and 326 isolate the RF from the voltage regulator chip 328. A large capacitor 340 provides stability for the voltage regulator 328 and filters any residual noise off the regulated power supply line 342 which supplies power to the Gunn oscillator diode. The voltage regulator chip 328 supplies a regulated 5.2 volts from a 7 volt supply on line 344. Thermistor 346 adjusts the power output of the voltage regulator chip 328 so as to stabilize the power output of the Gunn oscillator under changing temperature conditions. If the thermistor were not used, the power output of the Gunn oscillator would decrease with increasing temperature. The maximum power output of the transmitter is needed for maximum range and signal-to-noise ratio. FIG. 17 shows a graph of the power output of the Gunn oscillator versus power supply voltage. At approximately 5.2 volts, the power output of the Gunn oscillator is relatively insensitive to variations in the power supply voltage. Thus, the oscillator power output will not be amplitude modulated by variations in the power supply voltage if the operating point is selected to be approximately 5.2 volts, and therefore this voltage has been selected for the operating point and the thermistor keeps the operating point stable in the flat, horizontal area of the curve.

Use of the hysteresis RS422 receivers 305, 301 and 309 prevents the degradation in the sharpness of transition times of the digital transitions propagating on lines 16 and 18 from causing multiple "uncertainty transitions" in circuitry receiving the degraded transitions. That is, a normal transition has a very short transition time when it enters the line, but because of the resistance and capacitance of the transmission lines 16 and 18, the short transition time gets stretched. This can cause multiple "uncertainty" transitions by comparators as the relatively long transition time of the degraded logic transition is compared to the comparator's reference voltage. The use of hysteresis type receivers prevents these multiple "uncertainty" transitions by making a transition when the threshold is crossed in one direction, and not making a transition again when a transition in the other direction is encountered until the threshold is crossed by an amount equal to the hysteresis amount.

Figure 18:
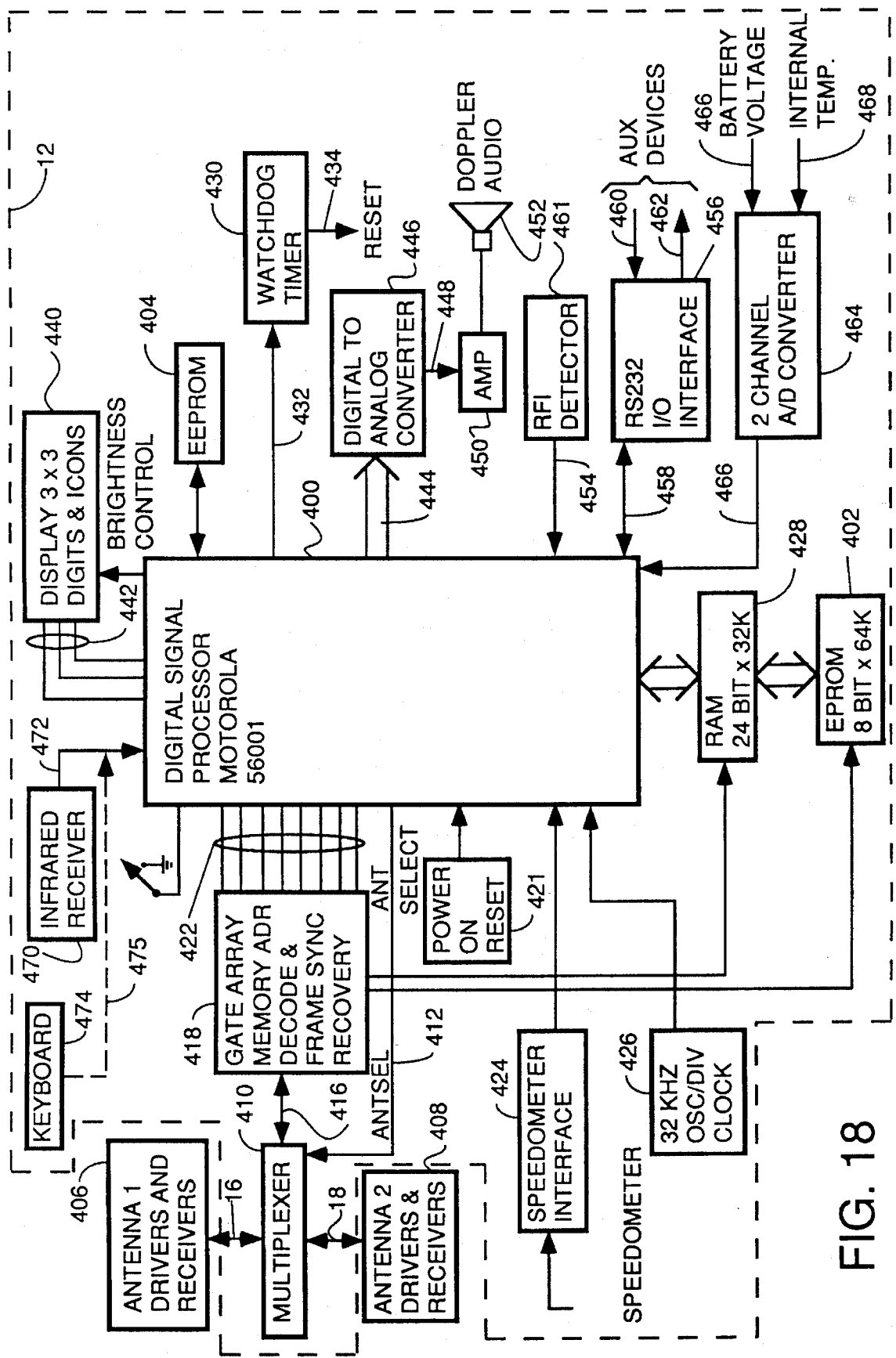
FIG. 18 is a block diagram of one embodiment of the processing and display unit.

Referring to FIG. 18, there is shown a block diagram of the digital circuitry inside the counter/display unit 12 in FIG. 1. A digital signal processor 400 is essentially a special purpose microprocessor that runs control software stored in EPROM 402 and/or EEPROM 404. In most embodiments, the control program is stored in EPROM 402 and various user controllable and other parameters that may be changed from time to time are stored in EEPROM 404. The control program is detailed in the flow charts described later herein and the actual executable binary code in included herewith as Appendix A. The code of Appendix A is ported for a Motorola 56001 digital signal processor (hereafter DSP). The control program is read into RAM 428 at power up time for faster access by the DSP. RAM 428 is also used as scratchpad memory if necessary by the DSP.

Serial data passes between the DSP and the antenna drivers and receivers, represented by blocks 406 and 408, via a multiplexer 410. The serial data from the DSP to be transmitted to one or the other of the antennas selected by multiplexer 410 is carried on the STD signal line in FIG. 21A. The antenna control word (in parallel form) for transmission to the antenna in serial format is generated and modified by use of the bit-set and bit-clear instructions in various subroutines executed by the DSP. This word is transmitted by the SSI (a hardware circuit within the DSP) upon each receive interrupt generated by the SSI. A receive interrupt is generated every 24 clock bits received from the antenna. Switching of the multiplexer 410 is controlled by an antenna select signal on line 412. In one state of this signal, the stream of digital data from antenna 1 enters the multiplexer 410 on bus 16 and leaves the multiplexer on shared output line 416 which is coupled to gate array logic 418. In the other digital state of the antenna select signal on line 412, serial data from antenna 2 enters the multiplexer 410 via bus 18 and is relayed to gate array logic 418 via bus 416. Likewise, serial data to be sent to the antennas by the counting/display unit 12 is sent to the gate array 418 by the DSP 400 over data bus 422 and is transferred from there to the appropriate antenna via bus 416, multiplexer 410 and buses 414 and 420.

The DSP includes an SSI serial communications circuit which normally requires 4 signals for synchronous bi-directional communications (clock, receive data, transmit data and frame sync). In order to reduce cable and connector costs and to be able to operate with a smaller, more flexible shielded cable, the frame sync signal is not communicated but is implied by gating the continuous clock into bursts of 24 clock pulses. The SSI has no mechanism for detecting external clock interval and must be initialized for synchronization during the eight-clock interval between the 24 clock pulses. To detect the interval between clock bursts the logic array (GAL) 418 on the processor board is programmed to form a re-triggerable one-shot whose delay interval is greater than that between the clock pulses within the clock bursts. The logic output of the one-shot is connected to a processor port line. A one-shot is implemented within the GAL by using 4 registers to form a 16-state counter. The 27 mHz processor clock is fed to the GAL and advances the counter state when the communications clock is in the low logic state. When the communications clock is a logic high state, the counter is reset to logic state 1 (0001). The interval between communication clocks within the clock burst is shorter than the interval required to advance the counter 15 states to state 0 (0000). However, during the 8-pulse interval, the counter in the GAL will advance and hold at state 0, indicating the end of the clock burst event to a processor port line. To establish synchronization, the SSI must be reset by software during the interval between clock bursts. Once initialized, the port state is no longer monitored by the main software loop as this is resource-intensive task for the processor. Rather, a loss of synchronization is detected by the received data pattern which has certain reserved bit positions for this purpose As noted above, the gate array 418 serves to recover the frame sync signal from the serial data stream from the antennas and does other tasks according to its Boolean truth table which is included herewith as FIG. 19. Basically, the gate array 418 examines the serial clock signal received from whatever antenna is currently coupled to the gate array to determine when the "blackout" period or "silent interval" 266 in FIG. 14 occurs. When the silent interval period occurs, the gate array arms itself to generate a frame sync pulse upon the next occurrence of a clock pulse. As soon as the next clock pulse occurs, the gate array 418 sends a frame sync pulse to the DSP thereby recovering the frame sync signal without requiring the actual transmission thereof by the antenna circuitry.

In alternative embodiments, other means other than clock pulse dropouts may be used to convey information such as when the frame sync intervals start and end, when radio frequency interference has been detected, antenna personality data and other miscellaneous status or control data. Such other embodiments can use any type of clock modification to encode such data including, but not limited to: variation of the clock duty cycle, variation of the clock phase, variation of the clock frequency or general variation of the clock pulse amplitudes to other amplitudes other than the zero amplitude used during the silent interval in the preferred embodiment, or any combination of the above. These variations can be assigned a code such that the data to be conveyed can be mapped to a corresponding variation of some attribute of the clock signal.

The gate array 418 also recreates a serial clock signal by using the received clock signals from the antennas and generating additional clock signals timed so as to continue the periodicity of the clock signals received from the antennas and sufficient in number to fill in the silent interval. This reconstructed clock signal is provided to the DSP for purposes of synchronizing outgoing serial data transmissions to the antennas to the same clock signal to which the incoming serial data was synchronized. This allows the DSP to send serial data to the antennas like gain control bits, transmitter oscillator on/off control bits, and self test signals using the same clock signal the antennas use. This minimizes the number of wires that need to be in the cables 16 and 18 in FIG. 1 and simplifies the circuitry in both the antennas and the counter/display unit 12.

In alternative embodiments, gate array 418 also serves to convert the serial format data on buses 16 and 18 containing the digital data samples of the audio output of the mixer diodes into parallel format on parallel bus 422 in FIG. 18. In the preferred embodiment, the serial-to-parallel data conversion is performed by a UART type circuit called the SSI integrated within the DSP. In the preferred embodiment, shown in FIGS. 20A, 20B, 21A and 21B and unlike the embodiment shown in FIG. 18, the serial data from the selected antenna is output by the multiplexer 410 (see FIG. 21A) as the SRD signal on line 417. This serial data signal on line 417 is coupled directly to an input of the DSP 400 (see pin 42 on FIG. 20A) and contains the 32 bit frames received from the antenna. Of these 32 bits, 16 bits are digital sample data from the A/D converter representing the analog signal output by the mixer diodes in the selected antenna and 8 bits are control data such as the RFI bit. The DSP hardware converts this serial data stream to a 24 bit parallel format digital word and stores it in an array of 24 bit words in RAM. The DSP then parses out the control data from each word using an SSI command, and uses the 16 bits of digital sample data for performing the Fast Fourier Transform. The spectral components from the FFT analysis are then used to calculate patrol speed, target speed of the strongest target return and target speed of the fastest target in a multiple target environment.

The DSP also has an optional speedometer interface 424 in some embodiments through which the DSP can read the actual patrol car speed for purposes of comparing this speed to the "patrol speed" derived from the radar returns of stationary objects. The software of Appendix 1 does not use the actual speedometer speed as the patrol speed because this is not accurate enough. Instead, the patrol speed is derived from the Doppler shifted radar returns from the ground. This is done by using the strongest radar return over time and assuming this is the return from the ground. Basically, the ground return is usually the strongest radar return although when targets get close, their returns become stronger for a short time than the ground return but then the target return goes away altogether. The software therefore assumes that the strongest return over an interval which is longest enough to distinguish over transitory target returns, is the return from which the patrol speed is derived. The software also includes the ability to compare the calculated patrol speed from the return selected in the above described manner to the speed read from the speedometer, and, if the difference is greater than 3 MPH, to discard the calculated patrol speed and re-calculate it from a different radar return.

Moving radar Doppler systems with no independent input of patrol speed information sometimes suffer from a condition called "shadowing". Shadowing usually occurs after patrol speed tracking has been lost, for example, when the patrol vehicle momentarily halted, and the patrol speed tracking system attempts to track a moving vehicle, resulting in a erroneous display of patrol speed. The Doppler signal related to patrol speed is normally a fairly strong signal, as disclosed in U.S. Pat. No. 3,936,824 which shows a method for filtering out the patrol speed signal in order to measure a weaker target signal, said patent being hereby incorporated by reference. If patrol speed tracking has been lost, the likelihood of shadowing is reduced by a requirement that the signal strength of a patrol speed candidate be greater than a certain minimum value in order to be acquired and tracked. Once in tracking mode, patrol speed performance is improved by a requirement that the patrol speed signal value be greater than a certain second minimum signal value in order to maintain tracking mode. For example, it sometimes happens that the system will lock onto the wrong radar return in calculating the patrol speed. This often happens at stop signs where the ground return is lost when the patrol car stops. If another car pulls away from the patrol car, the radar may lock onto the return from the other car and assume it is the patrol speed. One of the novel features of the system is the ability to manually reject a displayed patrol speed which is probably incorrect. When the trooper sees the improper patrol speed displayed, he or she can push a button on the infrared remote or the front panel keyboard that sends a signal to the DSP telling it to reject the calculated patrol speed and to lock onto another return and calculate the patrol speed from that return. A more detailed discussion of how this is done is included below in the discussions of the flow charts.

A 10 KHz clock signal is provided to the DSP by oscillator/divider 426. Each time this clock signal occurs, an interrupt service routine is performed to examine the state of the HEN input at pin 8 of the DSP chip on FIG. 20A. This HEN signal is an OR function of three possible signal sources and is generated by the OR circuit 475 on FIG. 20B. This OR circuit has three inputs. The HANDC input is from the infrared receiver which is triggered by the infrared hand controller. The SWDATA input is from an infrared switch encoder (not shown) which is hardwired to a plurality of front panel switches. The HCDATA input is an input from a hardwired hand controller connected to a rear connector on the unit. All three of these inputs will carry RC-5 bi-phase serial bitstreams.

The DSP has a watchdog timer 430 which is continually reset by a periodic pulse on line 432. If there is a software crash, and the DSP becomes non-operational, the watchdog timer 430 does not receive its pulse on line 432 and the timer therefore issues a RESET signal on line 434 which causes the DSP to reset and start over from the top of the control program.

The DSP drives a conventional LED display unit 440 which has at least two LED display windows to display the target speed and a "fastest" speed. The displayed target speed is the calculated speed of the strongest signal in the collection of radar returns. The "fastest" speed displayed on the counter/display unit 12 is the speed of the fastest target return in the collection of returns even if this is not the fastest speed. The display unit 440 also has various icon displays that are lighted to indicate what mode of operation the machine is in or machine status. Data controlling what is displayed is sent by the DSP to the display unit via bus 442. Display 440 in FIG. 18 includes two multisegment LED drivers, one for each of two LED windows on the front panel. Each multisegment driver receives serial data on one of the lines of bus 442 and a clock signal on one of the other lines of the bus. The multisegment driver latches the data, decodes it and generates appropriate segment drive signals for the LED segments to display the data.

The function of the DSP 400 and its control software in FIG. 18 is, among other things, to perform a Fast Fourier Transform on the serial data stream arriving from the antenna to derive the patrol speed and the closing velocity of the strongest target signal as well as the closing velocity of the fastest target speed. The incoming digital data from the antenna is a digital representation of a very complex waveform which includes returns from stationary objects and returns from objects that are moving relative to the patrol car as well as harmonics. The patrol speed is derived by finding the strongest Fourier component and correcting for the effect of the gain control adjustment to derive the true signal power of the return represented by the strongest Fourier component. Target identification is performed using an algorithm that compares the amplitude level of a Fourier component which is thought to represent a target return to the amplitude levels of the Fourier components in the neighborhood of the selected Fourier component to determine if a minimum difference exists. In the preferred embodiment, the amplitudes of the neighboring Fourier components are averaged and the average is compared to the amplitude of the Fourier component under investigation as a possible target return. If a minimum difference of 10 db exists between the average and the return under investigation, it is deemed a valid target return. As such, this target analysis algorithm processes signal-to-noise ratio as opposed to absolute amplitude. Selection of the Fourier component thought to represent a target return is based upon relative amplitude since only the speed of the strongest return that is not patrol speed is legally admissible.

In the preferred embodiment, the DSP sets the gain level of the system at some value and accumulates 2048 samples in a data buffer in RAM 428 in FIG. 18. These samples are a digital representation of a segment of the analog signal from the mixing diodes which contains all the information regarding the patrol speed, any target returns and any harmonics that are present. The 2048 samples are then analyzed using a Fast Fourier Transform and the Fourier components are analyzed to determine if they fall within an acceptable range of amplitudes, i.e., not too weak nor too strong. If all the Fourier components do not lie within the acceptable range of amplitudes, all the samples are discarded and 2048 new samples are collected after the DS P sets the gain level of the system to a new value and the process is repeated. The Fast Fourier Transform (hereafter FFT) is performed on the 2048 samples by doing seven consecutive FFT's, each being performed on 512 samples with a 50% overlap. In other words, the first FFT is performed on the first 512 samples, and the second FFT is performed on another 512 samples starting with the 257th sample in the buffer. The third FFT is performed on 512 samples starting with the sample 256 samples further into the buffer.

Figure 22:
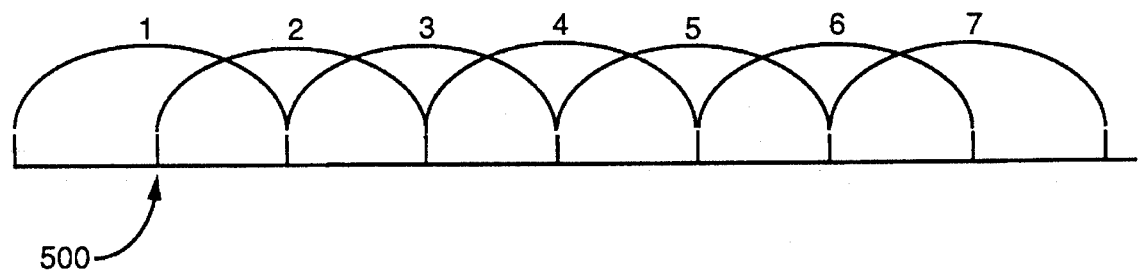
FIG. 22 is diagram of how the FFT's performed on the data block overlap.

In the preferred embodiment, Hamming Windows are used to improve the quality of the Fourier analysis by minimizing edge effects. Referring to FIG. 22, there is shown a conceptual diagram of how the Hamming Windows overlap. Each of the curved components labelled 1 through 7 is a Hamming window which supplies weighing coefficients to each of the 512 samples in the FFT. Thus, the first sample has a Hamming coefficient that is less than the second sample and so on. Likewise, the Hamming weighing coefficient for the 256th sample (designated at 500 in FIG. 22) is at a maximum in the first FFT and a minimum in the second FFT. Since noise components randomly go up and down, and since the results are averaged over the 2048 samples, the noise components tend to cancel out and a slight improvement in signal/noise ratio results. The seven Hamming Windows shown in FIG. 22 represent the seven overlapping FFT's that are performed.

After performing these seven FFT's, the results of the seven FFT's are then averaged. This reduces the contamination of the spectrum in the form of smearing, i.e., false energy in "bins" on either side of a legitimate spectral line or "bin", caused by the false model of 2048 samples with signal power falling to zero on either side of the 2048 sample group. This "end effect" is reduced by use of the Hamming Windows described above.

When 512 samples are used for an FFT, the result is 256 frequency points in the spectrum, each point represented by a real and imaginary component. The magnitude of each frequency component so represented is equal to the square root of the sum of the squares of the real and imaginary components. However, since the police radar system is interested in determining the signal power of the strongest signal, and since signal power is the sum of the squares of the real and imaginary components, the DSP calculates only the sum of the squares of each frequency component so as to determine the signal power of each of the 256 components.

Each spectral line output by the FFT is output as with a real and imaginary component. The sum of the squares of these components yields the apparent power of that spectral line. The apparent power of each spectral line is computed. After the power of all FFT spectral points resulting from the 2048 sample buffer has been calculated, the spectral point with the highest apparent power is determined for purposes of searching for a patrol speed candidate. The power of that spectral line or frequency component is then recalculated to take into effect the gain level applied to the entire 2048 data block or sample buffer (the gain set by the signals on bus 110 on FIG. 11A). This power adjustment is made based upon the relationship of equation (1) below.

(1) $T = A \times 10^{(G/10)}$ where

T=true power at the output of the mixer diodes

A=apparent power

G=the gain adjustment in decibels applied on bus 110 to the entire 2048 sample buffer.

Using equation (1), the true power of a signal can be determined from the apparent power calculated by the FFT and the gain value that was in effect when the 2048 samples from which the apparent power was calculated were collected. The reason that this is done is that it has been observed that at a certain level of true power of any particular frequency strong signal at the output of the mixer diodes, double bounce false signals, harmonically generated false signals and intermodulation false signals usually are generated from the strong signal.

The foregoing algorithm is not used in calculating target speeds. For target processing, the power of each spectral component, I.e., bin, is compared to the power of some of its neighboring spectral components to determine if it is a legitimate target return or just noise. This is done by selecting a particular bin out of the 256 bins returned by each FFT or out of the power averaged bins after the results of the 7 overlapping FFT's have been averaged and comparing the power thereof to the average power of 8 of its neighboring bins. In doing this comparison, the power in the 2 immediately adjacent bins of the selected bin is ignored. This done because of the possibility of power smearing as described above resulting from deviation between the assumed signal model and the actual signal. Also, sometimes signals have frequencies that sit between bins of the FFT, and this results in some of the energy from the signal spilling into neighboring bins. The power in the next 4 higher bins is then calculated as is the power in the next 4 lower bins, excluding the 2 immediately adjacent bins. In Some embodiments, the power from these 8 bins is averaged and in some embodiments, the sum of the 8 bins is used knowing that this sum is 8 times higher than the average. The power in the selected bin must be 10 db higher than the average power of the 8 neighboring bins to be selected as a target return. In the case where the average power of the 8 bins is not calculated, the power in the selected bin is multiplied by 8, and the result is Compared to the sum of the power of the 8 bins to determine if it is 10 db higher.

In some embodiments, after all the targets are located in this manner, the absolute or true power of each target is calculated using equation (1) above and the gain adjustment that was in effect when that target return bin power was calculated, and the strongest target return is analyzed for Doppler shift and the resulting speed is displayed as the target speed in the target speed display window on the front panel of the counter/display unit. The other target returns are also examined to determine which is the fastest target, and that fastest target speed is displayed in another display window on the front panel of the counter/display unit.

Signal power has an effect on distortion with stronger signals causing more distortion if linear ranges of the various mixer diodes, amplifiers etcetera are exceeded. Distortion causes harmonics. Since the strongest signal return is usually the patrol speed, harmonics of the patrol speed are quite prevalent and can appear to the system as targets. The system therefor guards against this possibility by using more stringent qualification criteria for "signals" that have apparent speeds that are two times and three times the patrol speed. Such potential targets are scrutinized to determine if the signal power is greater than the signal power of the neighboring bins by a factor which is even greater than 10 db. Typically 15 or 20 db will be used, but in other embodiments other factors may be used. In the preferred embodiment, more stringent scrutiny is applied at harmonics of the patrol speed spectral component if the gain adjustment used for the buffer of samples from which the patrol speed was calculated was a large downward gain adjustment. Such a large downward gain adjustment means that the signals received at that time were very strong which leads to a higher possibility that harmonics of the patrol speed were generated. Harmonics of the target are not usually a problem. However, when the patrol car is moving, the patrol speed is a strong return, and, although it is removed from the spectrum after the patrol speed is calculated, the harmonics of the patrol speed are not removed and can be misidentified as target returns unless they are suppressed by applying more stringent target qualification criteria thereto.

Figure 25:
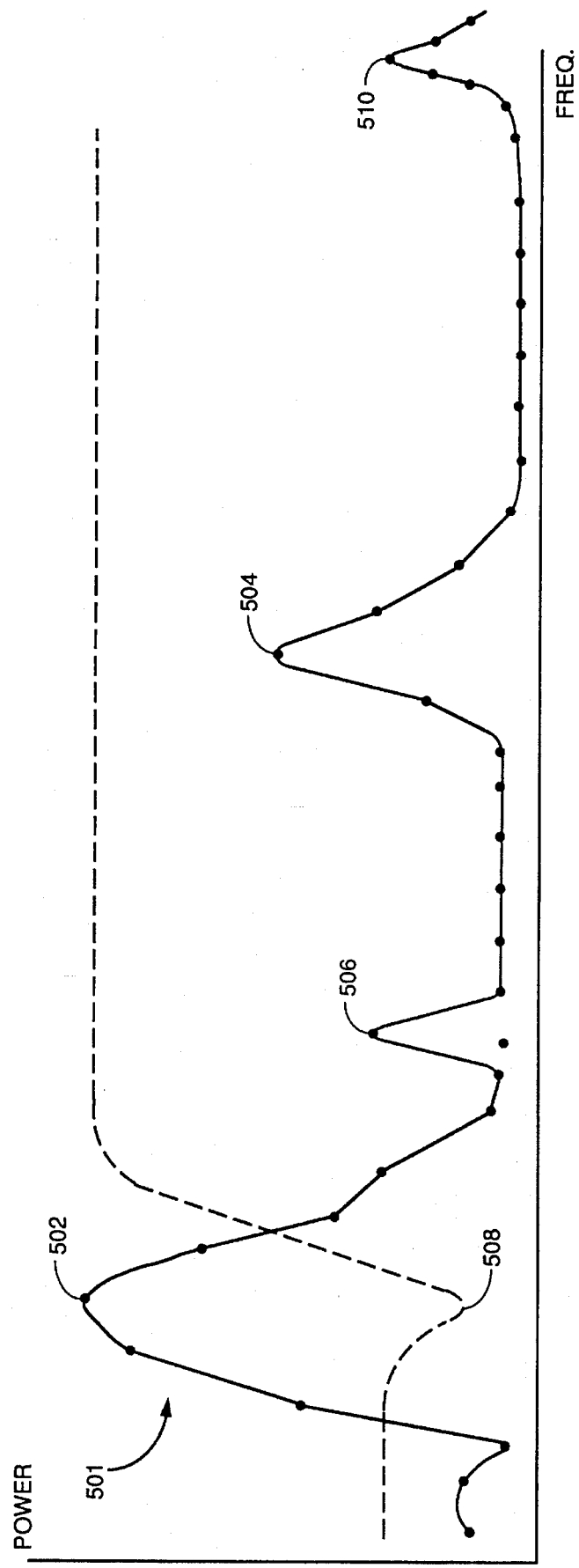
FIG. 25 illustrates a typical FFT output spectrum.

The foregoing concepts are better understood by reference to FIG. 25 which shows a typical Fourier component spectrum resulting from FFT analysis of a buffer of digital samples of the output of the mixer diodes. The solid curve indicated generally at 501 is a plot of the Fourier component spectrum where each dot is one bin or one frequency component result from the FFT. Each dot has a power level, represented by its position on the vertical axis and a frequency, represented by its position along the horizontal axis. The large power point at 502 represents the patrol speed, and the smaller power point at 504 represents the speed of the target (the radar is shown as operating in "opposite lane" mode where the patrol speed is less than that of the target relative closing speed shown at 504. A harmonic of the patrol speed is shown at 506. Even though the sin x/x filter response of an FFT is not a particularly good filter, it is adequate and computationally efficient. Therefore, an FFT is used to calculate the points on solid curve 501 in FIG. 25 because it takes much less computer time to calculate the points than it would to calculate them using a computer model of 256 elliptical filters. However, in other embodiments, other filter models can be used. Once the patrol speed is determined, the DSP and its control software effectively filter out the patrol speed return at 502 by superimposing a high pass, high quality elliptical filter response with a zero placed at the center frequency of the patrol speed (the zero is shown graphically at 508) over the FFT calculated spectrum. The DSP then removes the patrol speed spectral components by applying the elliptical filter response shown by the dashed curve 503 to the various frequency components. When the patrol car is in the same lane as the target, the radar is informed of this fact by the patrolman and applies a low pass elliptical filter to filter out the patrol speed because in that case, the patrol speed will be higher in frequency than the relative closing speed of the target even if the absolute speed of the target is moving faster than the patrol car.

The strength of the harmonic at 506 depends upon the signal power of the patrol speed point at 502. If the target return at 504 were lower in power, the harmonic at 506 could easily be mistaken for a real target. Therefore, to minimize this possibility, the DSP and its control software calculate the absolute power of the patrol speed point at 502, and determine if it is high enough to indicate that harmonics will be present in the FFT spectrum. If it is high enough, then the DSP lowers the sensitivity of the radar to returns in the frequency ranges around the frequency of the second and third harmonics by applying more stringent signal to noise ratio criteria to peaks at these harmonic frequencies than are applied to normal target peaks at other frequencies.

The DSP calculates the target speed and outputs a stream of digital numbers on bus 444 which define amplitude points on a periodic waveform which has a frequency that is related to the doppler shift between the outgoing radar energy and the returned, doppler shifted energy from a target. This stream of digital numbers is converted to an analog waveform by digital-to-analog converter 446 which outputs an analog signal on line 448. The analog signal is amplified by amplifier 450 and applied to a speaker 452 for audio feedback to the police officer operating the radar.

To insure that radio frequency interference does not render the measured target speed inaccurate, another RFI detector 452 is employed in the counter/display unit 12. This RFI detector is the same structure as the RFI detector in the antennas and serves the same purpose. When radio frequency interference is detected which is of a sufficiently high level to interfere with the accuracy of speed calculation by the DSP, the RFI detector outputs a signal on line 454 which causes the DSP to take appropriate action to avoid displaying any possible invalid target speed. In some embodiments, that action may be to blank the target display and in other embodiments, the display may be lit with a code in the target speed windows indicating the target speed will not be displayed or an icon may be lit which indicates any displayed target speed may be invalid.

In some embodiments, the radar system may be connected to auxiliary devices such as a computer etc. To implement such coupling, an RS232 interface 456 couples a DSP serial data port coupled to line to auxiliary devices via serial data lines 460 and 462. Such auxiliary devices may include a large roadside electronic sign that displays vehicle speed to passing drivers, computers or video systems that take pictures of the passing targets with radar data as to their speed.

To insure the integrity of the target speed calculation, the vehicle battery voltage is monitored and the internal temperature of the counting/display unit 12 is also monitored. Sometimes police officers sit in their patrol cars for long periods of time with the engine off clocking speeders. This can run the vehicle battery down to a voltage level where reliable operation cannot be assured. The DSP monitors the vehicle battery voltage using a 2 channel A/D converter having an analog input coupled to the vehicle battery via line 466. The battery voltage is converted to a digital number which can be read by the A/D converter 464 via bus 466. When the battery voltage gets too low for reliable operation, the DSP detects this fact in one of the periodic reads of the data from the A/D converter 464 and shuts its operation down. Also, the cabin area of patrol cars and the contents thereof can become very hot when left sitting in the sun for long periods of time. These high temperatures can cause thermal runaway of solid state devices or sufficiently alter the operation of solid state devices as to render the results suspect. Therefore, the internal temperature of the counter/display unit 12 is monitored by a temperature transducer coupled to the DSP via analog signal line 468. The A/D converter 464 converts this temperature to a digital number which is periodically read by the DSP via bus 466. When the internal temperature in the patrol car gets too high, the DSP shuts its operations down. With the unit operating in the summertime on the black dashboard of a patrol car, temperatures can reach 100 degrees centigrade. The components in the system are rated for 85 degrees centigrade, so when temperatures climb above 90 degrees centigrade, operations cease in the DSP and it enters a low power sleep mode and the antenna circuitry is turned off. Once the DSP enters the sleep mode, it wakes up periodically and reads the temperature data from the A/D converter 464. As soon as the temperature drops below the safe limit, operations resume.

The DSP is controlled by way of an infrared remote control much like the remote control used by many modern television sets. Infrared signals from this remote control (not shown) are received by infrared receiver 470 and converted to digital commands on bus 472. These digital commands control the mode of operation of the overall system etc. In alternative embodiments, a keyboard 474 on the front panel of the counter/display unit 12 may be used to enter commands to control operation of the system.

Figure 20A:
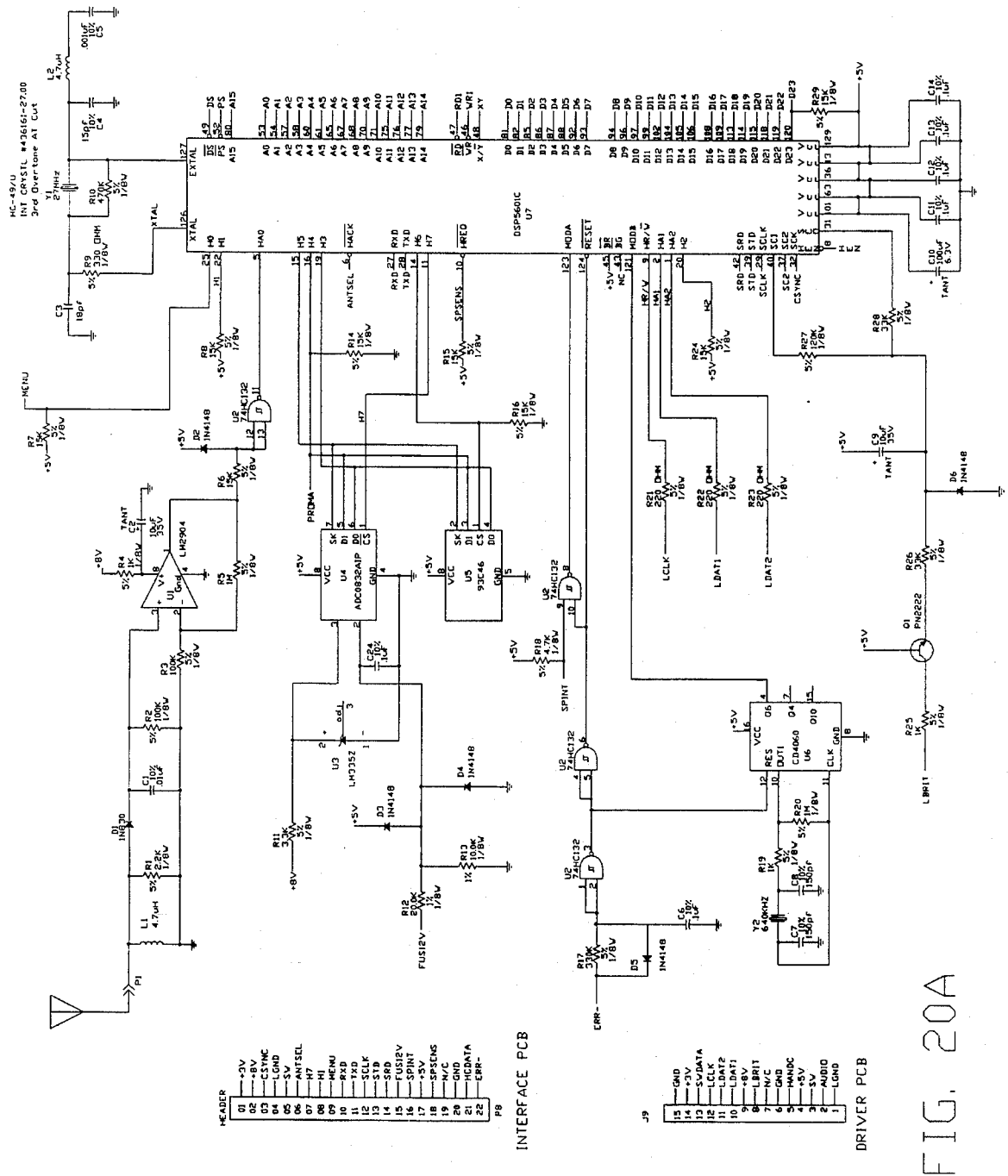
FIGS. 20A and 20B are a schematic diagram of the preferred embodiment of pertinent portions of the digital circuitry of the processing and display unit.
Figure 20B:
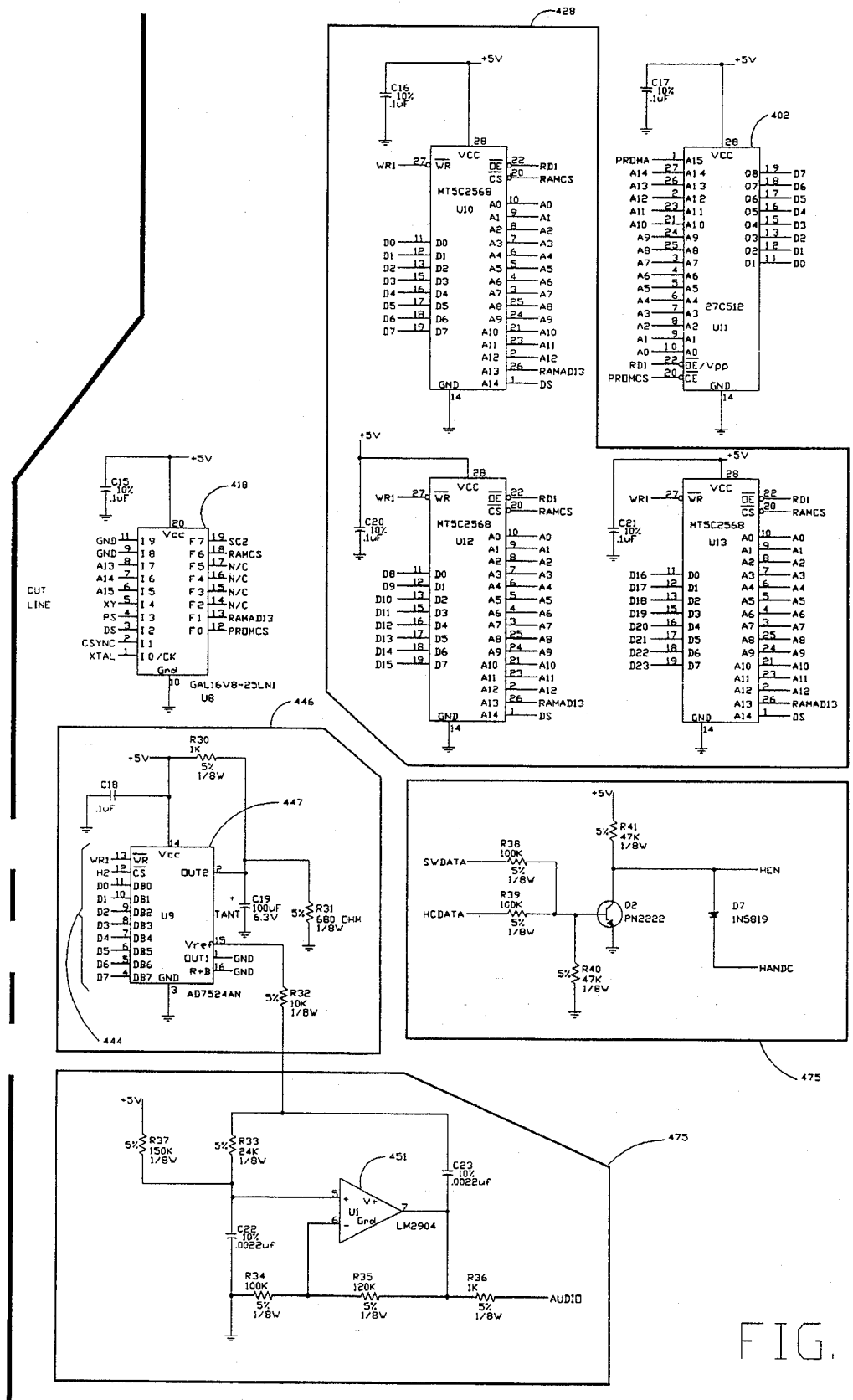
Figure 21A:
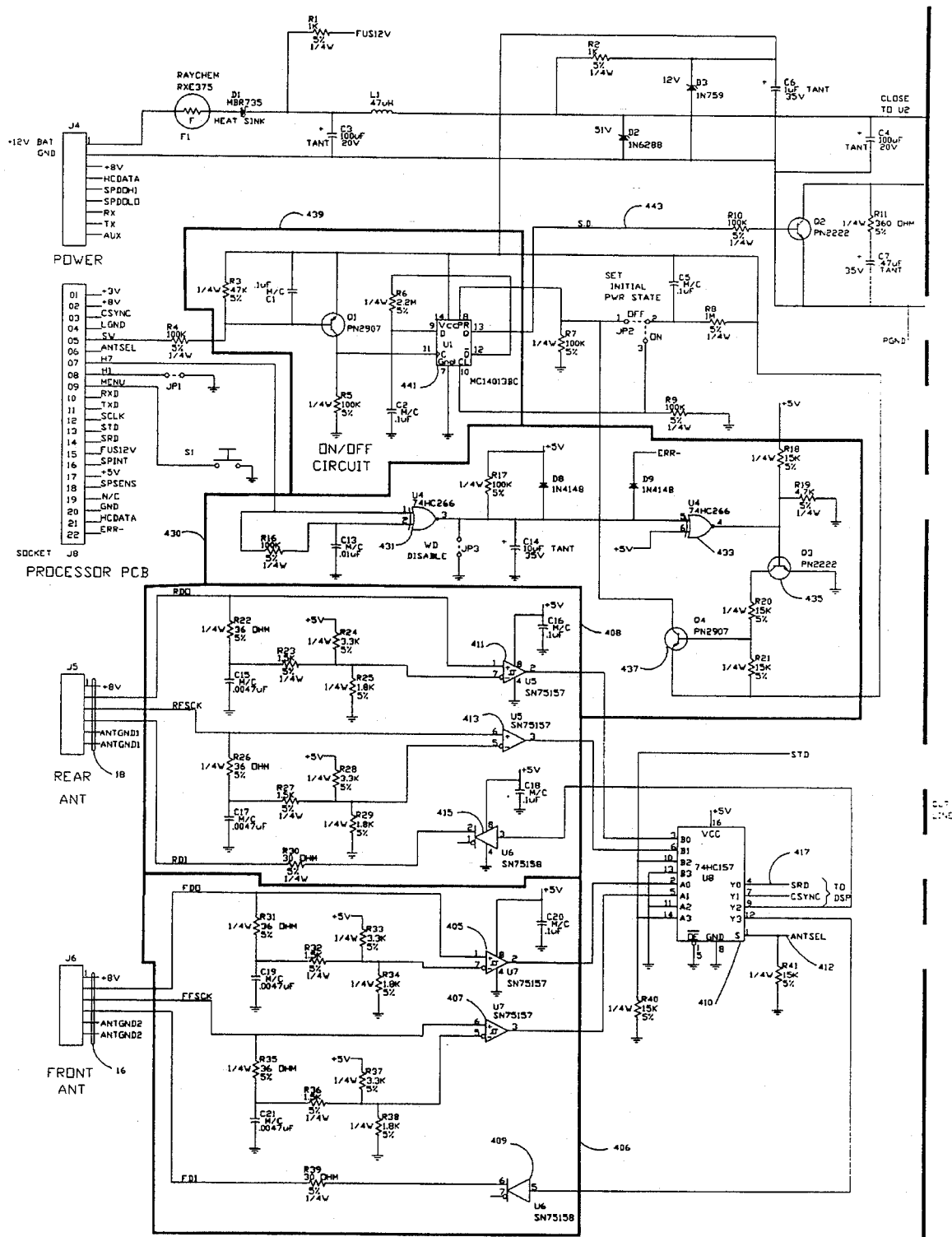
FIGS. 21 A and 21B are a schematic diagram of the preferred embodiment of pertinent portions of the analog circuitry of the processing and display unit.
Figure 21B:
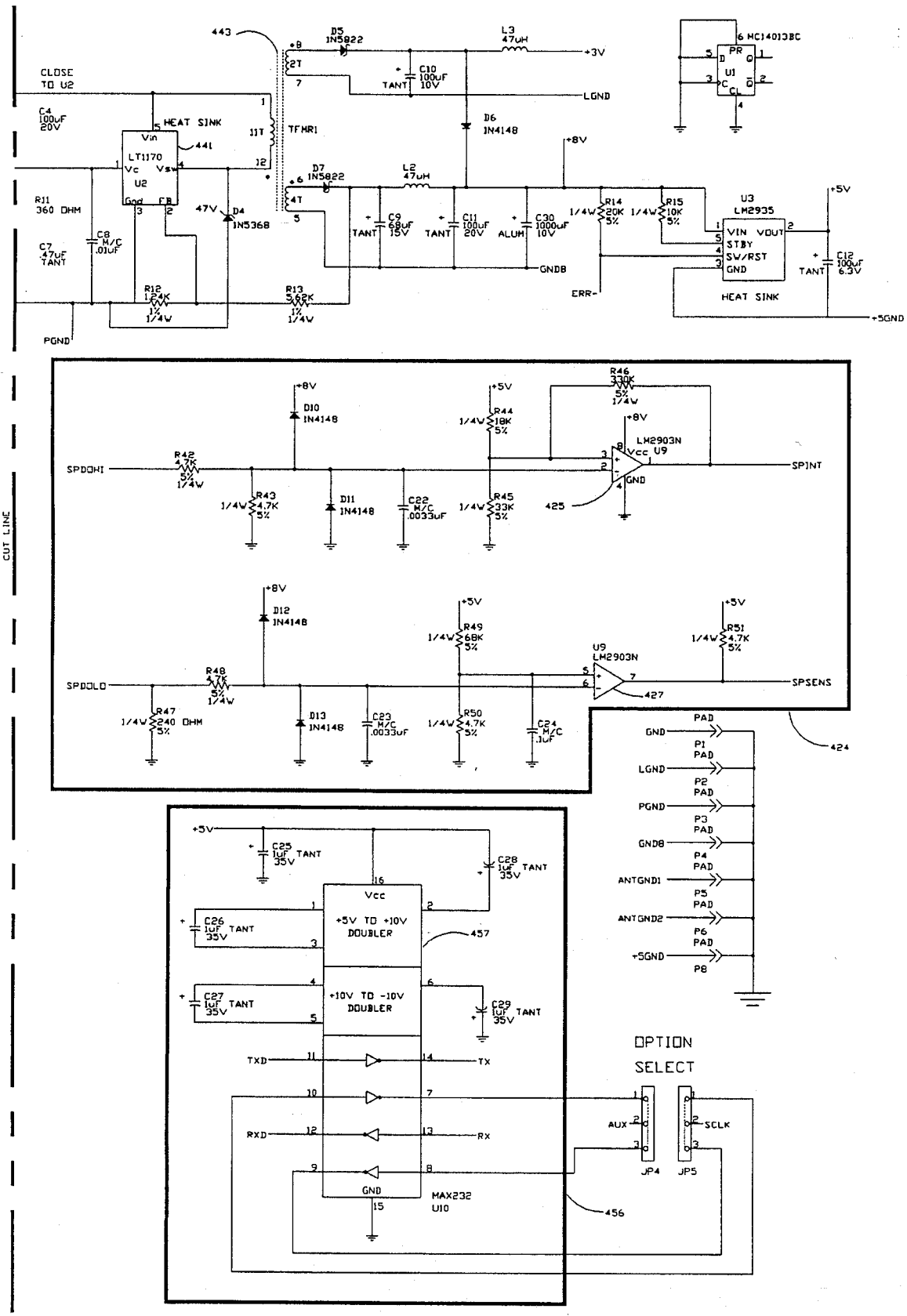

Referring to FIG. 19, the Boolean equations for gate array logic 418 are shown. The various signals that are combined by the Boolean equations are listed at 480 and 482. These signals are input and output signals from the DSP chip on FIG. 20A. FIGS. 20A and 20B are the schematic diagram of the digital logic of the counter/display unit 12 shown in FIG. 18. These signals at 480 and 482 of FIG. 19 appear on the pin numbers listed at 484 and 486. These pin numbers correspond to the pin numbers of the integrated circuit 418 on FIG. 20B. Reference numbers of various logic elements on FIGS. 20A and 20B that are identical to reference numbers on FIG. 18 indicate the integrated circuits that correspond to identically numbered functional blocks on FIG. 18. FIGS. 21A and 21B are a schematic diagram of the analog circuitry in the counter/display unit. Circuits elements with reference numbers identical to functional blocks in FIG. 18 are the circuit elements that perform the functions of the identically numbered blocks in FIG. 18.

Referring to FIGS. 20A and 20B, the two 74HC132 integrated circuits enclosed within dashed box 421 serve as a power-on reset circuit. Manual control data to control the mode of operation of the counter display unit and other aspects of the operation can be entered through the infrared receiver 470 or keyboard 474 in FIG. 18. An "OR tie" circuit 475 in FIG. 20B allows the user input commands to be entered either through the keyboard 474, a wire remote plug on the rear panel of the unit or the built-in infrared receiver 470. The digital-to-analog converter 446 of FIG. 18 is implemented with integrated circuit 447. Buffer amplifier 450 in FIG. 18 is implemented in FIG. 20B using differential amplifier 451. The 32 KHz clock 426 in FIG. 18 is implemented using 640 KHz crystal 427 and an integrated circuit divider 429 in FIG. 20A. The temperature and battery voltage monitoring function of block 464 in FIG. 18 is carried out by 2 channel A/D converter chip 465 and its associated interface circuitry connecting battery voltage line 466 and temperature transducer line 468 thereto. Radio interference detector 452 in FIG. 18 is implemented by differential amplifier 453 in FIG. 20A and its associated RF tuned circuit 455 coupling antenna 457 to the amplifier. The structure and operation of the RFI detector are substantially identical with the RFI detector in the antenna circuitry previously described. Line 459 couples the DSP 400 to a manually operated switch, not shown, which is used to control a setup mode. RAM 428 and EPROM 402 are found in the upper right hand corner of FIG. 20B.

Referring to FIGS. 21A and 21B, two line receivers with hysteresis 405 and 407 receive the XMIT DATA and SERIAL CLOCK serial data streams from the front antenna. These two integrated circuits combine with line driver 409 to make up the antenna 1 driver and receiver block 406 in FIG. 18. Line driver 409 transmits the serial data of the RECEIVE DATA signal in FIG. 13B to the antenna 1 circuitry via bus 16 in FIG. 1. The line drivers 411 and 413 receives the serial data streams of XMIT DATA and SERIAL CLOCK from antenna 2. Line driver 415 transmits the serial data stream of the RECEIVE DATA signal to antenna 2 via bus 18 in FIG. 1.

Line drivers 405, 407, 409, 411,413 and 415 all serve to buffer and condition the serial data transmitted bi-directionally between the antennas and the counter/display unit so that the data can be transmitted approximately 25 feet or more. The line drivers 405, 407, 409, 411,413 and 415 all use hysteresis to maximize the noise immunity of the system and to prevent "uncertainty" noise generated by the system caused by slow logic transition across the logic level comparison threshold.

The watchdog timer 430 in FIG. 18 is implemented in FIG. 21A and FIG. 21B with integrated circuits 431,433 and transistors 435 and 437. The circuitry inside box 439 in FIG. 21A is a manual power on/off circuit. A switch on the front panel (not shown) is coupled to the base of transistor Q1 such that when the switch is actuated, the transistor collector clocks the clock input of the flip-flop 441 thereby causing the flip-flop to toggle. The Q output of this flip-flop generates a shut down signal S.D. that is coupled by line 443 to the base of transistor Q2. This transistor controls the operation of a power supply integrated circuit 441 on FIG. 21B.

Integrated circuit 441 in FIG. 21B is a switch mode power supply that allows transformer 443 to create several different DC power supply voltages from the 12 volt DC car battery.

The speedometer interface 424 in FIG. 18 is implemented in FIG. 20B with differential amplifiers 425 and 427.

The RS232 interface 456 in FIG. 18 is implemented with an integrated circuit 457 in FIG. 21B.

The gain adjustment number in the control software is used for several beneficial effects. First, as mentioned above, the gain adjustment number can be used to calculated the true power of the patrol speed. The true power of the return thought to be the patrol speed can be used to make a more informed choice as to which of the returns in a multiple return or apparent return spectrum is the correct patrol speed. Further, more accurate selection of the patrol speed return using the gain correction number aids greatly in better harmonic suppression as described above and also aids in configuring an elliptical filter response curve with a zero located over the patrol speed to filter out this return before doing target processing.

In the preferred embodiment, the system also looks for the fastest target speed and use of the gain adjustment number to more accurately identify the patrol speed helps suppress the intermodulation product which might otherwise be mistaken as the fastest target speed but which is really an anomaly. Specifically, the intermodulation product that results from the upper sideband, i.e., the sum of the transmit frequency and the doppler shifted signal at the frequency dictated by the relative closing speed can be mistaken as a real target return (shown in FIG. 25 at peak 510) and displayed as the fastest speed unless steps are taken to suppress it. An example will help to clarify this concept. Suppose the patrol speed has been processed by selection of the strongest signal and use of the gain adjustment number to calculate the true power results in a determination that the patrol speed is 55. Suppose also that there is a target moving at 65 mph in the opposite lane so that the doppler shifted return shows a closing velocity of 120 mph. The intermodulation product will be the sum of 120 and 55 or 175 mph. Thus, the intermodulation product results in false return showing an apparent speed of 175 mph closing velocity minus patrol speed of 55 mph or 120 mph. This intermodulation product, unless suppressed or filtered out, will then cause the system to display 120 mph as the fastest target erroneously.

The DSP and its control software drives the displays so as to simultaneously display both the strongest target signal and the fastest target signal. In the prior art, some units will display the fastest target speed but only when a switch is held down. The problem with this arrangement is that while the switch is being held down, no tracking history of the strongest target return is being accumulated. The courts generally like to have tracking history evidence for conviction, so the prior art arrangement is disadvantageous in that respect. The traffic surveillance radar according to the teachings of the invention eliminates this disadvantage by simultaneously displaying the strongest target return (the one with the best signal-to-noise ratio) in the left display window and the fastest target return in the right display window. When the fastest target return becomes the strongest return, it is automatically displayed in the left display window, and the patrolman can push a switch to lock onto the target return displayed in the left window for purposes of citation. The system does all this by doing the following things in the following order in one embodiment: performing the overlapping FFT's and eliminating the immediate neighbors of each return before averaging the apparent power of eight neighboring bins of a return, four on either side thereof so as to determine the signal-to-noise ratio of each return; using the gain adjustment number to determine the true power for purposes of determining the patrol speed and then filtering out the patrol speed return using a digitally simulated elliptical filter with a zero on the patrol speed; suppressing harmonics of the patrol speed; suppressing intermodulation products to eliminate the apparent fastest target caused by the upper sideband in the product signal from the mixer diodes; selecting the target return with the best signal-to-noise ratio as the strongest target return and calculating and displaying the speed of that strongest target return in the left window; calculating the speed of each remaining target return and selecting the target return with the highest speed for simultaneous display in the right window. In the preferred embodiment, the fastest target speed is not displayed in the right window if it is the same as the strongest target speed. In other embodiments, the fastest target speed is simultaneously displayed in the right window even if it is the same target return as the strongest signal displayed in the left window. In some embodiments, only a single display window is used and the fastest target speed is always displayed in that window. In the preferred embodiment, three display windows are used, and the patrol speed is displayed in the rightmost window, the strongest target speed is displayed in the leftmost window and the fastest target speed is selectively displayed in the middle window.

Referring to FIGS. 23A–23E, there is shown a flow chart for the fast target processing in either moving mode or stationary mode. In the preferred embodiment, the patrolman indicates to the radar unit when the radar is being operated with the patrol car not moving to avoid the difficulty of searching for patrol car speed when the Doppler shift of reflected signals from stationary objects is zero. Zero Doppler shift causes problems in processing by the DSP. Fastest target processing allows the operator to "look past" the strongest target (usually the closest vehicle) and measure and display speeds of more distant vehicles which are approaching at a faster speed than the strongest target. Intermodulation effects can produce spectral signals which can be falsely interpreted as weak "faster" targets. In order to determine if a target is a true faster target, the received data is operated on by a 512 point FFT, which results in a 256 point spectral analysis. The spectral strength and spectral bin number of the five strongest spectral lines are used to determine if the potential target bin number is a multiple of one of these lines or if its spectral bin number is nearly the same as the sum of any two of the five lines or nearly the same as the absolute difference of any two of the five lines (see FASTQUAL subroutine flow chart below).

The strength of a target multiple is related to the strength of its fundamental, while the strength of a sum or difference intermodulation product is related to a product function of the strength of its two components. Target multiples are evaluated for second and third harmonic possibilities each, with a potential for 10 harmonic frequencies to be considered. The sum and difference permutation generates 20 frequencies. A target multiple must have a fundamental absolute signal strength above a certain threshold to be considered as a possible false fast target. Similarly a potential intermodulation false target must have both components with an absolute signal strength above a certain second threshold to be ruled as a false target. These thresholds were determined experimentally as radar receivers vary from unit to unit in intermodulation characteristics.

Figure 28:
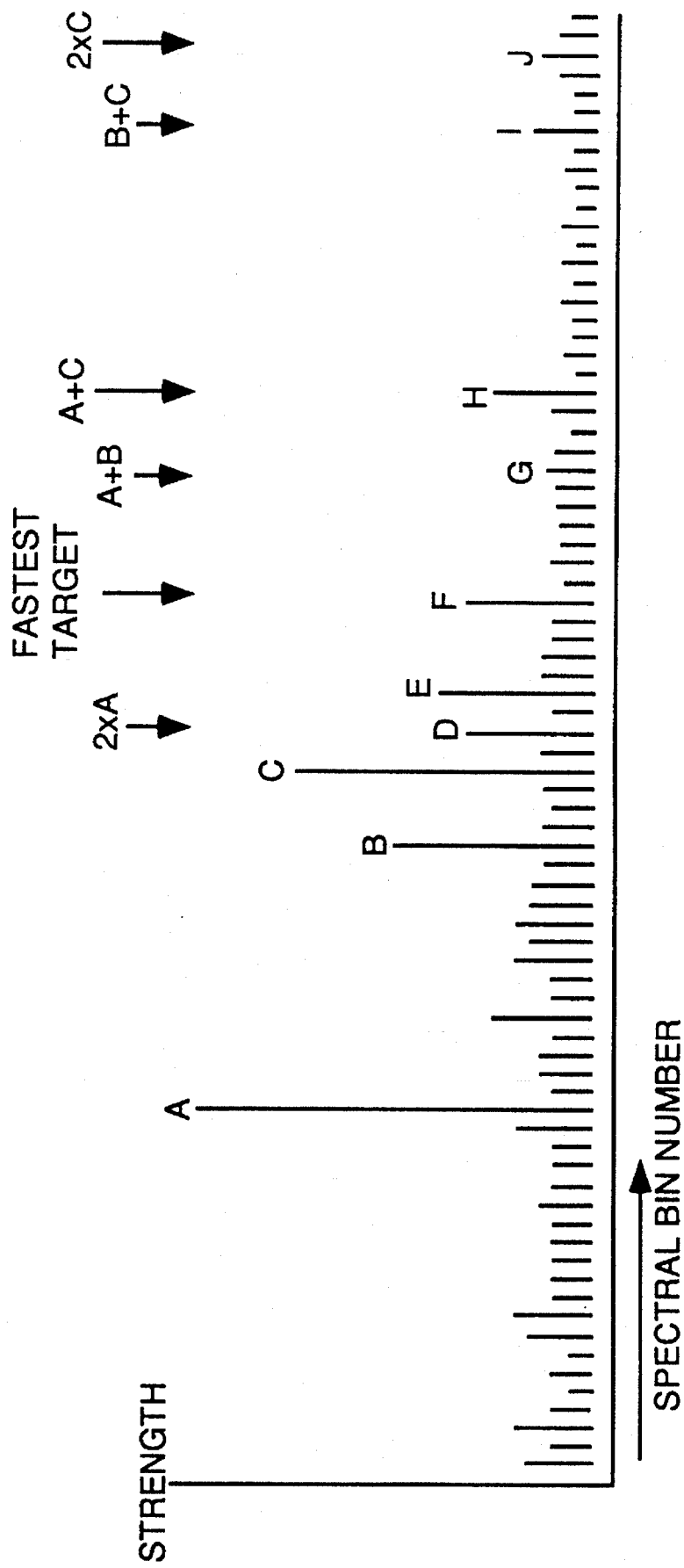
FIG. 28 is another diagram of an FFT spectrum illustrating the presence of false signals caused by harmonic distortion and intermodulation products.

As an example, in the moving radar spectral diagram of FIG. 28, signals A,B,C, E &F represent real targets of interest. Signal A is a Patrol Speed signal from a nearby stationary target. Signal C is the strongest moving target while B is a slower, weaker target and would not generate a displayed speed. In the example of FIG. 28, only signals A, B & C have enough signal strength to generate false spectral lines by harmonic distortion and intermodulation products and multiple bounce returns. Line D is a 2*A harmonic (2 times multiple bounce signal generated by signal A) possibility and would not be processed. E and F represent faster targets with F being fastest. Line G can be generated by intermodulation between A & B. Lines H & I are similarly potentially due to intermodulation and line J could be a 2° C. harmonic and would not be processed.

Figure 23A:
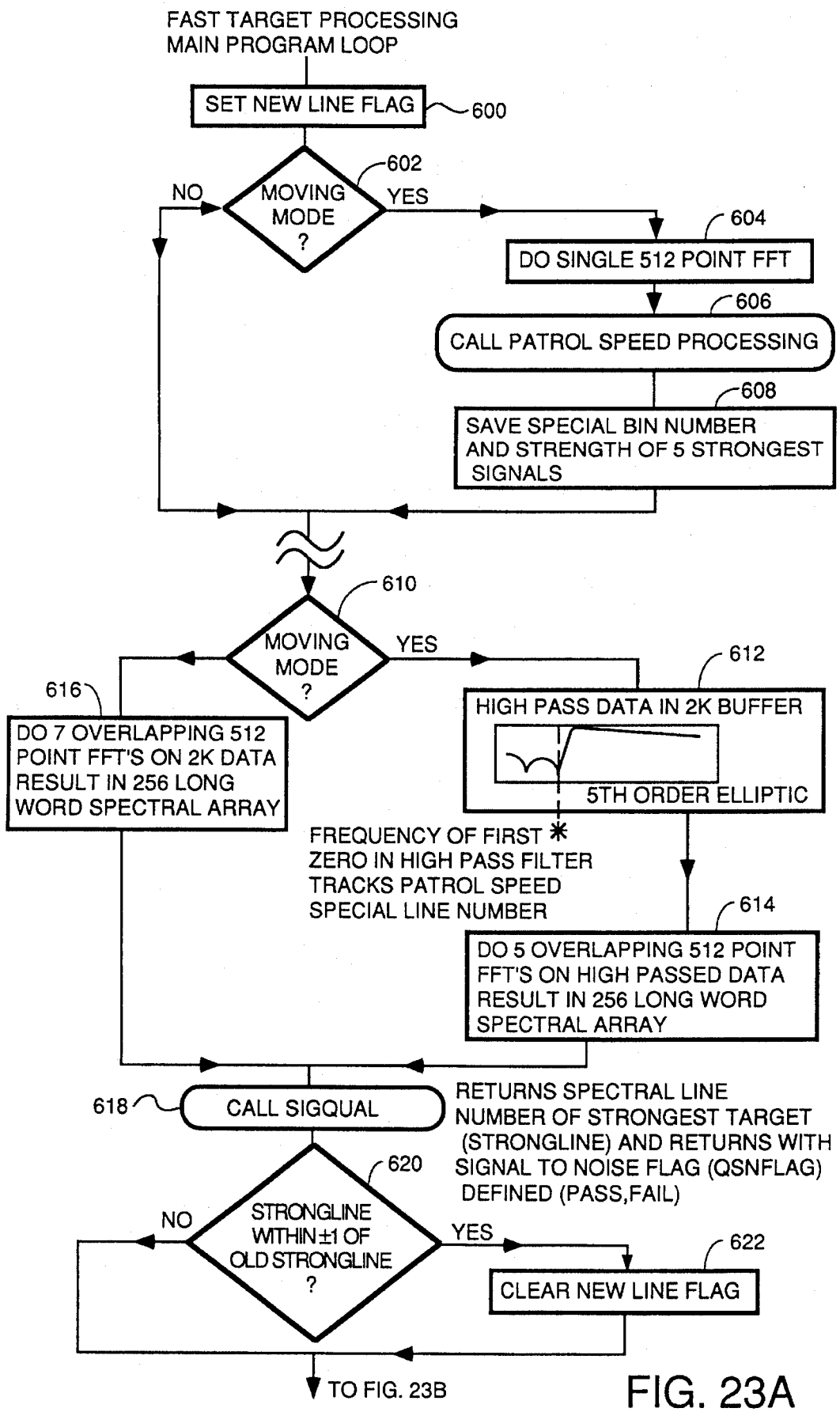
FIGS. 23A–23E are a flow chart of the fastest target processing portion of the main program loop.

The details of this fastest signal processing will now be discussed in greater detail. In FIG. 23A, block 600 represents the process of setting the newline flag. This is done to setup the flag so that it can be cleared under certain circumstances later in the process. Test 602 determines whether the unit is operating in moving mode. The patrolman tells the unit which mode to operate in, but the mode can be changed from moving to stationary or vice versa at any time. If the unit is in moving mode, steps 604, 606 and 608 are performed to find the 5 strongest signal returns and save them in a buffer so that they are available after the high pass filtering is done later in the process. This is done because the patrol speed return and possibly intermodulation products and harmonic multiples of the patrol speed may be in this group of the 5 strongest returns and it is necessary to retain knowledge of these 5 signals because their harmonics may still be present in the spectrum after the high pass elliptical filtering process is performed. Step 604 represents the process of performing a single 512 point FFT on the first 512 samples in the sample buffer. The sample data is stored in a circular buffer which is large enough to store two 2048 blocks of samples. The two blocks are processed in a pseudo-ping-pong fashion in the sense that when the first 2048 block is filled, the FFT processing starts, while an interrupt routine is busy filling the next 2048 block. Whenever a frame is received from the antenna, the interrupt service routine interrupts main loop processing and stores the freshly received frame in the second 2048 block.

Step 606 is a subroutine call to the patrol speed processing routine which functions to find the best patrol speed candidate and tracks it after locking. The patrol speed processing routine was performed in the Stalker prior art and will not be described further herein. The structure and processing of the Stalker prior art is hereby incorporated by reference. Step 604 generates 256 spectral lines or bins. The first 88 of these spectral lines represent speeds up to about 70 mph which usually contains the patrol speed.

Figure 26:
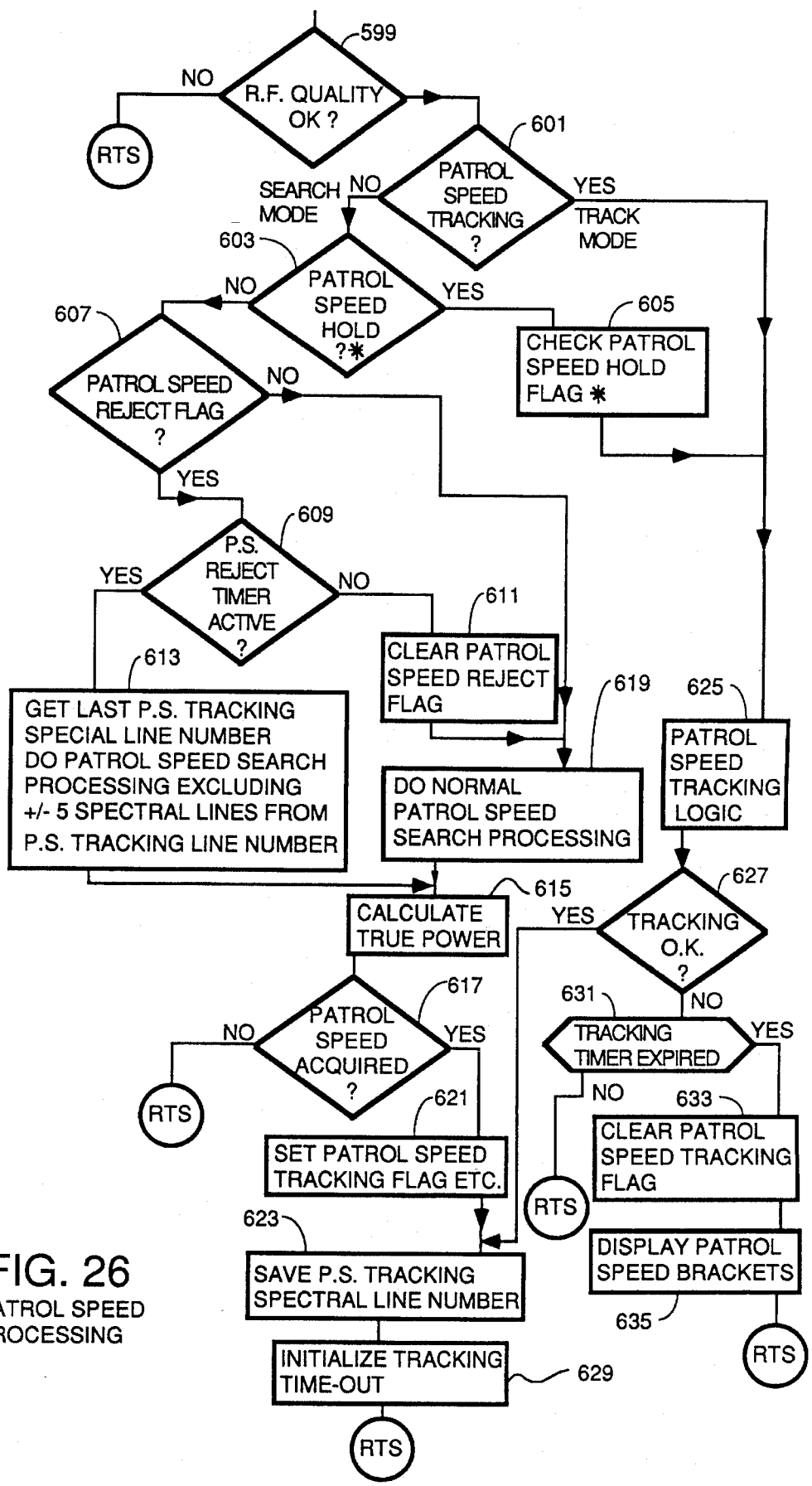
FIG. 26 is a flow chart of the patrol speed acquisition and tracking processing.

Referring to FIG. 26, there is shown a high level flow chart of the patrol speed processing. The process shown in FIG. 26 is called and performed about every 40 milliseconds. The first thing that is done is the test represented by block 599 to determine if the RF quality is acceptable. If insufficient time has elapsed from the time the transmitter is turned on to allow the RF returns to stabilize before the routine of FIG. 26 is called, the test of block 599 will return processing to the main loop without performing the patrol speed processing. Next, a determination of whether the radar is in track mode or search mode as represented by block 601 is performed. If the unit is in search mode, the test of block 603 is performed to determine if the unit is in hold mode. Hold mode is a mode that turns off the transmitter for evasion of radar detectors. When in hold mode, patrol speed cannot be tracked. If the unit is in hold mode, and the patrolman enters a command to exit hold mode, step 605 is performed to clear the hold mode and attempt to begin tracking the patrol speed again. The radar unit assumes initially that the patrol speed is the same as it was when hold mode was entered. This is attempted once, and a tracking window is setup around the spectral line which was the last tracked patrol speed, and the lower tracking signal strength criteria is used (discussed further below). If no spectral line of the current spectrum within the window matches this patrol speed, the unit will not go into track mode and search mode will be continued to find the new patrol speed.

If the unit was not in hold mode when step 603 was performed, test 607 was made to determine if the patrolman has pushed the "reject displayed patrol speed" button (which sets a patrol speed reject flag and records the spectral line number of the spectral line which represents the rejected patrol speed). If the answer is yes, the processing of block 609 is performed to determine if a 5 second timer that was started when the patrolman pushed the reject button has elapsed. If 5 seconds has elapsed, the patrol speed reject flag is cleared as represented by block 611. If 5 seconds has not elapsed, then a special patrol speed processing process is performed represented by block 613 to find a new patrol speed candidate. The process represented by block 613 excludes spectral lines within±5 spectral lines from the previously tracked patrol speed spectral line number recorded when the patrolman pushed the reject button. Then, a standard search for a new patrol speed candidate is made excluding the 11 rejected spectral lines. The process of block 613 returns a pointer to a spectral line for a new patrol speed candidate. If the branch from 609 to block 611 is taken, the search processing of block 619 is performed to find a new patrol speed candidate. This processing is similar to processing of block 613 except that there is no rejection of the previous patrol speed spectral line and its 5 nearest neighbors on each side. After the new patrol speed candidate spectral line is selected by either the process of block 613 or 619, the processing of block 615 is performed to calculate the true power of the signal return represented by the new patrol speed candidate spectral line using the gain adjustment number that was sent to the preamplifier in the antenna when the samples were generated from which the new patrol speed candidate was selected. After this process is completed, the test of block 617 is performed to determine if a patrol speed has been successfully acquired, i.e., meeting minimum acquisition signal strength criteria. This is done by testing the spectral line pointed to by the routine of either block 613 or 619 to determine if the patrol speed candidate signal has the minimum required signal strength. This minimum required signal strength may be determined experimentally and depends upon the type and polarization of the antenna (because stationary objects react differently in terms of radar cross-section to circular, horizontal or vertical polarization of the transmitted signal) and the power of the transmitter and the conversion efficiency of the receiver section. Since many different options exist for these components that fall within the scope of the claims, no attempt will be made here to recite a minimum acceptable signal power since it can be different for each different embodiment.

If the processing of test 617 indicates a new patrol speed has been successfully acquired, then the processing of block 621 is performed to set the patrol speed tracking flag for purposes of controlling branching by test 601. The processing of block 621 also sets a digital Chebychev bandpass filter with a center frequency centered at the spectral line declared as the new patrol speed and with a 3 db bandwidth wide enough to encompass about±1.2 spectral lines, then all 2048 real time digital samples are passed through the digital bandpass filter and stores the resulting set of digital samples in a temporary buffer. The resulting set of digital samples defines an approximate sine wave having the frequency of the new patrol speed candidate. The processing of block 621 then calls another routine to measure the frequency of the signal defined by the filter output samples by finding the zero crossings and measuring the time interval between the zero crossings by counting samples and calculating the frequency from this data. Then the patrol speed is calculated from this frequency using the relationship that Doppler shift results in a frequency shift of about 103 Hertz per mile per hour. Then the processing of block 621 updates the patrol speed display with the appropriate speed measure (mph or km/hr).

Next, the processing of block 623 is performed to save the spectral line representing the new patrol speed in case the patrolman rejects the new patrol speed and as an input to the tracking process.

Returning to blocks 605, if the hold mode has been ceased by the patrolman and the transmitter has been turned back on and the processing of block 605 clears the hold flag for a single attempt to track at the previously recorded patrol speed. Likewise, if the test of block 601 indicates that the unit is in track mode, processing vectors to the processing of block 625. The processing of block 625 is patrol speed tracking logic where a tracking window is set up around the spectral line last tracked as the patrol speed and examines the current spectrum resulting from the FFT of samples generated since the transmitter was turned back on and looks for the strongest signal in the tracking window. A true patrol speed signal will be smeared in energy on the low side because of cosine error resulting from an apparent slow down of the object because of the changing geometry of the relationship between the antenna and the stationary object as the patrol car passes it. However, the energy of a true patrol speed signal will fall rapidly to the noise on the high side. Therefore, to help determine if the strongest signal in the tracking window is really a patrol speed return, a signal-to-noise ratio will be calculated for the new candidate for the signal strength at its peak compared to the signal strength of third and fourth higher frequency spectral lines after skipping the first and second higher frequency spectral lines. The third higher spectal line must be at least 6 db down and the fourth spectral line must be at least 9 db down for the signal to accepted as the new patrol speed.

If the selected signal meets these requirements, then the test 627 is performed to determine if the signal true power of the selected signal is high enough to qualify as a patrol speed. The minimum acceptable signal power is lower than the criteria applied for original acquisition in search mode, but must be experimentally determined for the particular embodiment. If the signal power is adequate, then the processing of block 623 is performed as previously discussed and a tracking timer is initialized to begin counting up from a negative number to zero as symbolized by block 629.

If test 627 indicates signal strength is not adequate, then test 631 is performed to determine whether the tracking timer has expired. It will have already expired if the test of 631 is reached from an exit from hold mode. If the test of 631 is reached from the track mode branch out of test 601, the tracking timer may not have expired, and the test 631 will branch appropriately. If it is expired, the process of block 633 is performed to clear the patrol speed tracking flag, and the process of block 635 is performed to blank the patrol speed display (in the preferred embodiment, brackets with nothing between them are displayed by the process of block 635).

Figure 27:
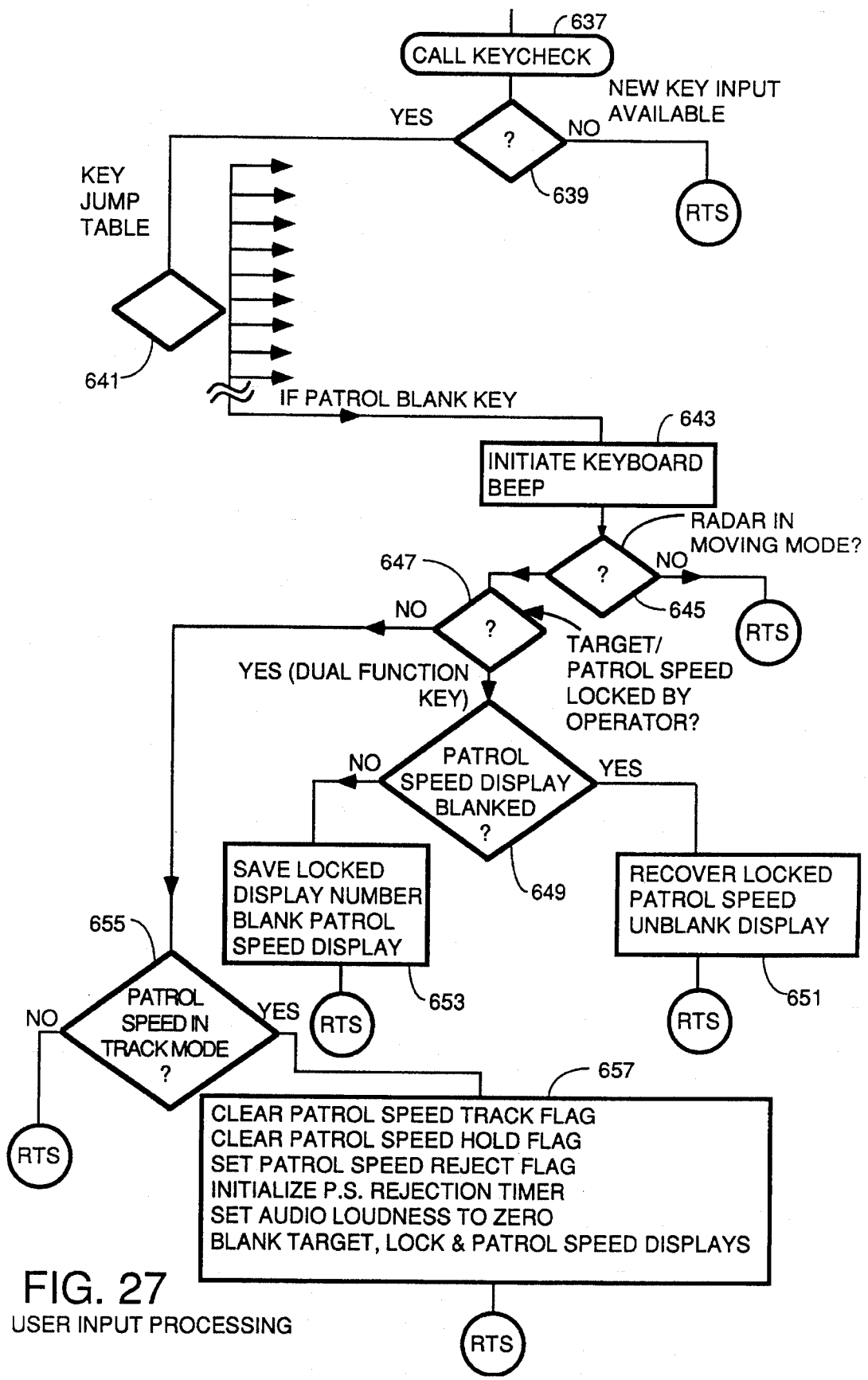
FIG. 27 is a flow chart of the processing to receive user input to reject an incorrect patrol speed display.

To further explain the processing that occurs in carrying out user inputs such as the request to reject an incorrect displayed patrol speed, please refer to FIG. 27. FIG. 27 is a portion of a subroutine that is periodically called from the main loop to process operator key inputs. In the preferred embodiment, the user can enter inputs to the unit from either an infrared remote control or from buttons on the front panel. The buttons on the front panel are hardwired to an infrared controller chip and only bypass the infrared radiation path. The infrared controller chip issues a serial stream of characters that corresponds uniquely to the command received either from the front panel or the infrared controller in RC-5 bi-phase code with a bit interval of 1.68 msec. The interrupt service routine carried out every 100 microseconds by the DSP to sample the state of the HEN input on FIG. 20A compresses the bi-phase bit stream by counting the number of sample times between each change of states of the HEN input to build a buffer of data. The KEYCHECK subroutine examines this buffer of data to analyze the pattern of transitions between logic 1 and logic 0 to determine if the intervals between transitions are acceptable and when a valid start of command pattern is received and if a command of some kind has been received. KEYCHECK returns a flag that a key has been pressed. All of that processing is represented by block 637.

Next, test 639 is performed to determine if a new key has been pressed so as to distinguish between commands that are continually issued by the infrared controllers until the key pressed is released by the patrolman. If not, processing returns to the main loop. If so, processing, jumps to the key jump table represented by block 641. The purpose of this table is to determine what action to take for the key that has been pressed. For purposes of this disclosure, the only relevant key command is the patrol blank command which represents the message from the patrolman that the currently displayed patrol speed is an incorrect patrol speed and instructing the unit to not display this speed again and to search for a new candidate for patrol speed. If, after 5 seconds, no new candidate for patrol speed can be found, the unit will re-display the rejected patrol speed.

If the patrol blank command is received, the processing of block 643 to initiate a keyboard beep, then test 645 is performed to determine if the radar is in moving mode. If in moving mode, test 647 is performed to determine if the patrolman has locked the target and patrol speed on the display. The blanking key has a dual function. One function is to reject an incorrect patrol speed, but the other function is to blank the patrol speed if it has been locked so that perpetrator cannot see the patrol speed during the ticketing process. If the target and patrol speed have been locked by the operator, then test 649 determines whether the patrol speed has been blanked. If so, the process of 651 recovers the locked patrol speed and unblanks the display to display it. If the patrol speed has not been blanked, process 653 saves the locked patrol speed number and blanks the patrol speed display.

If test 647 determines that the target and patrol speed have not been locked, test 655 is performed to determine if the unit is in patrol speed tracking mode. If not, processing returns to the main loop. If so, the process of block 657 is performed to clear the patrol speed tracking flag, clear the patrol speed hold flag, set the patrol speed reject flag, initialize the patrol speed rejection timer, set audio loudness to zero and blank the target, lock and patrol speed displays. In the preferred embodiment, three display windows exist on the front panel. The leftmost window displays the target speed. The middle window displays any target speed that the patrolman indicates he or she wants to lock or freeze at some value. The right window displays the current patrol speed or the patrol speed at the time of the lock. When the unit is placed in fastest mode, the lock window is used to display the fastest target speed as long as a target speed has not been locked therein.

Returning to the consideration of FIG. 23A, step 608 saves the spectral bin number and true power of the 5 strongest signals (a signal is defined as a strongest spectral line and its immediately adjacent neighboring spectral lines on either side thereof) found in the first 88 spectral lines from the first FFT results.

Some code that is not relevant to the claimed invention is executed next, and then the test 610 is reached. Test 610 determines if the radar is in moving mode. In moving mode, there will be a patrol speed return that interferes with target speed processing. Therefore, if in moving mode, the processing of block 612 is performed to filter out the patrol speed return by setting up a digital high pass 5th order elliptical filter with a zero set at the frequency of the patrol speed. Then all 2048 samples from the current block being processed are passed through the filter to generate a new block of 2048 filtered samples which are stored in a temporary buffer. Then the processing of block 614 is performed to do 5 overlapping 512 point FFT's on the filtered samples. At the end of each of these 5 overlapping FFTs, the starting address pointer for the next FFT is advanced 384 samples. Each FFT results in 256 spectral powers (sum of the squares of the real and imaginary vectors in each bin). The spectral powers of all 5 FFT's are added together to yield a 256 longword spectral array (48 bits per longword).

If the unit is in stationary mode, the processing of block 616 is performed to calculate 7 overlapping FFT's, each of which overlaps by 256 samples. No high pass filtering is needed, because in stationary mode, no patrol speed return is present to interfere with target processing.

After the processing of blocks 616 or 614 are completed, block 618 calls the subroutine SIGQUAL which functions to perform a prior art routine to locate the strongest signal which meets an acceptance criteria and suppresses target signals which are close to an integer multiple of the patrol speed by processing them at a lower sensitivity. The routine returns a spectral line number and a signal-to-noise flag. The strongest signal is picked on the basis of strongest relative apparent power. The signal-to-noise ratio is calculated by adding the apparent powers of 30 neighboring spectral lines excluding the candidate line and its two immediately adjacent spectral lines. The apparent powers of the 61 neighbors (roughly 32 spectral lines on either side of the candidate line) are added up and then a right shift of 5 places is performed to divide by a factor of 32 to derive a noise value. The noise value result is then compared to the apparent power of the candidate line to calculate the signal-to-ratio and the signal-to-noise ratio is then compared to a criteria to determine if the candidate spectral line can be used as a legitimate target speed. The minimum acceptable signal-to-noise ratio, in the preferred embodiment, is subject to operator input (in the preferred embodiment, the operator can select between 4 sensitivity values). There is a factory setting for maximum sensitivity. The patrolman can reduce this maximum sensitivity in four steps. There is also a local noise maximum criteria which must be satisfied. If there is another strong signal in the vicinity of the candidate strongest signal, no target speed will be displayed if the local noise maximum apparent power exceeds the local maximum noise power criteria. The neighborhood in which this local noise maximum must appear is restricted to a frequency range within ±5 spectral lines on both the high and low frequency sides of the candidate spectral line excluding the candidate spectral line and its two immediately adjacent neighbors. Because there can be ambiguity in the target speed display where there is another strong signal of almost the same signal strength as the candidate signal in the immediate vicinity of the candidate signal, no target speed is displayed in this circumstance to avoid an error in citing the wrong driver.

The sensitivity value selected by the patrolman is used as an index into tables of signal-to-noise ratios and local-noise-maximum-to-signal-maximum power. The apparent power of the target and the sensitivity value are used to pick two entries out of these tables, and the selected entries are compared to the signal-to-noise value and the local-noise-maximum-to-signal-maximum value calculated from the neighborhood of the candidate signal. If the calculated exceed the selected table entries, then the QSNFLAG is cleared indicating the spectral line returned (STRONG LINE) is a valid strongest signal.

The SIGQUAL routine also performs a process of examining apparent targets which have speeds of an integer multiple of the patrol speed to determine if they are real targets. Certain stationary objects like signs that a patrol car passes may cause multiple bounce radar returns that look like targets travelling at an integer multiple of the patrol car speed. Because these returns tend to be momentary, once the candidate strongest target signal has been selected, a special section of code is executed to make sure the strongest target signal is not a "ghost" signal caused by a double bounce from a highly reflective object by determining how long the signal has been present and looking at the patrol speed true power and determining if the patrol speed true power is great enough to cause a double bounce detection. In a moving radar system, a common problem that occurs with high radar sensitivity is called "ghosting" which results in a false target reading the same as patrol speed or in some oases, twice patrol speed. These readings are caused both by intermodulation effects and by actual radar multiple bounces between the patrol vehicle and some highly reflective stationary target. Prior art radars such as the Stalker dealt with this problem by de-sensitizing the radar for target speeds that are multiples of patrol speeds. This has the effect of greatly shortening the range on targets in these speed ranges, sometimes unnecessarily. If the patrol speed signal strength is moderate to weak, distortion harmonics will not be detectable and in the case of multiple bounce signals, the path length on a patrol speed double bounce signal will be twice that of the patrol speed signal, causing the double bounce signal strength to usually be below the normal detection threshold. The target processing for both strongest and fastest target signals in the preferred embodiment has special sections for dealing with targets that may be multiples of patrol speed. A table-driven variable threshold based on patrol speed absolute signal strength (true power) is used to set the detection threshold on targets that are possible multiples, thereby allowing increased range on such targets when the patrol speed signal is not strong.

Next, test 620 determines if the STRONGLINE spectral line number is within ±1 spectral line of the STRONGLINE spectral line returned the last time through this portion of the main loop. If so, then the STRONGLINE spectral line is deemed to designate a valid strongest target signal, and the process of block 622 clears a NEWLINE flag which was set in block 600 indicating that is not a new signal and has been seen at least once before. If STRONGLINE spectral line is not within ±1 spectral line of the STRONGLINE spectral line returned the last time through this portion of the main loop, then the NEWLINE flag is not cleared. Next, the processing of block 624 is performed to save the STRONGLINE spectral line as the OLD STRONGLINE and then the process of block 626 is performed to save the STRONGLINE spectral line number, the NEWLINE flag and the QSNFLAG in a circular history queue and will advance the queue pointer by one. The circular history queue is used to determine if the strongest target speed is decelerating. The reason it is desirable to determine if the strongest target speed is decelerating is because a phenomenon exits which can generate false fastest targets when the strongest target speed is apparently rapidly decreasing and the amplitude of the signal is rapidly decreasing also so as to form a chirp. This happens most frequently when the strongest target passes the patrol car in the opposite lane. Because this car is falling off the beam, just as the car passes the radar, its apparent speed decreases because of cosine effect and the amplitude rapidly falls off because the car is passing out of the radar beam. The FFT spectrum of a chirp signal like this is a peak signal with scallops that looks similar to a sin x/x function. The highest frequency scallop can be mistaken as a false fastest target and must be suppressed. In such a case, no fastest target speed is displayed. The processing to perform this analysis will be discussed below.

Next, an OPLFAST subroutine is called, as symbolized by block 628, to look for faster but weaker target than the strongest target signal for purposes of implementing the "fastest" mode of operation where the fastest target speed is displayed in the lock window. A flow chart for the OPLFAST subroutine is disclosed in FIGS. 24A–24D. Generally, the OPLFAST routine does a top down search for up to 7 potential fastest targets that are stronger than 24 db down from the strongest target signal and then does some special processing on these candidates.

Figure 24A:
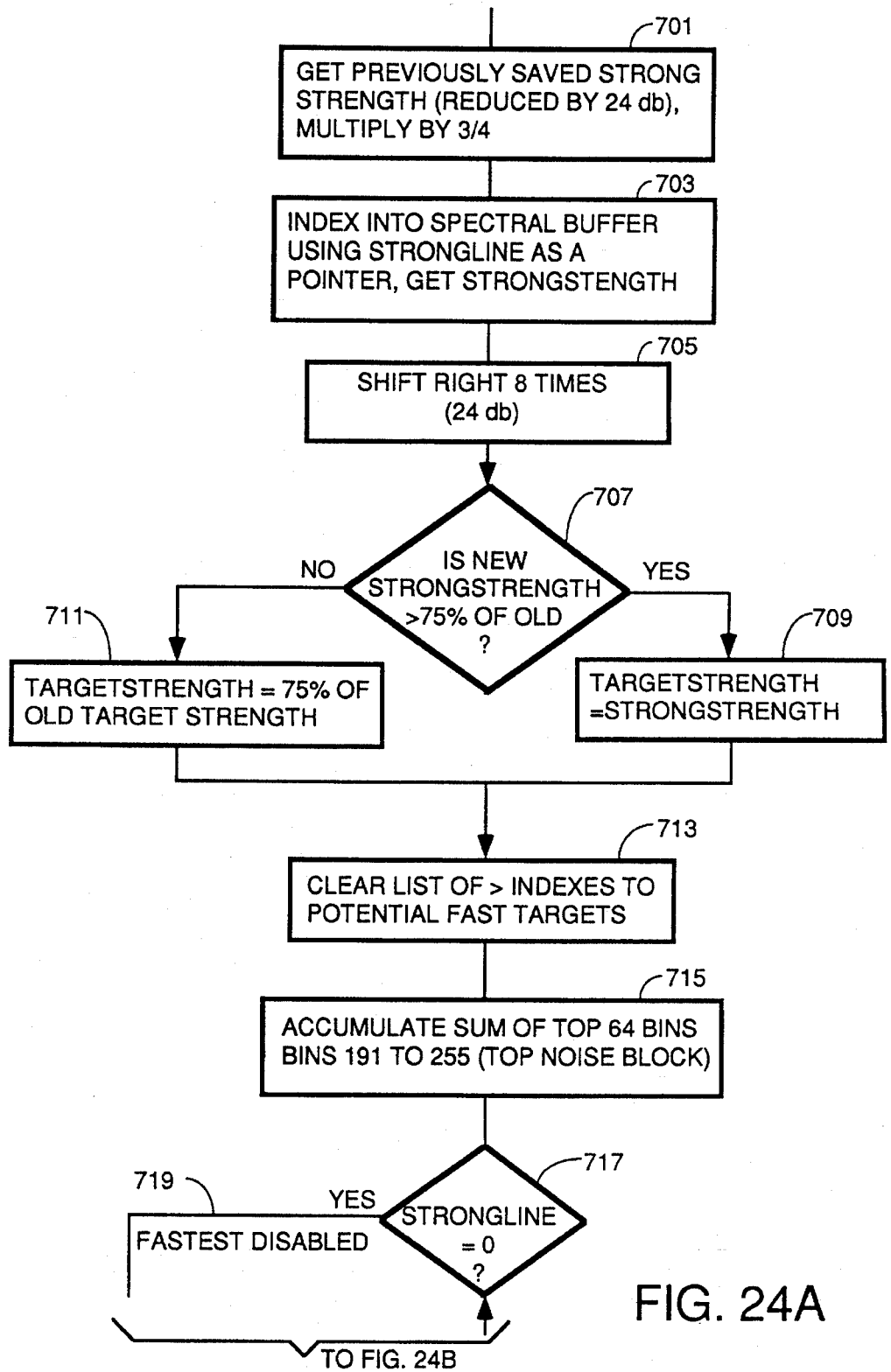
FIGS. 24A–24E are a flow chart of the OPLFAST subroutine which finds the 7 fastest target returns, calculates the target signals strength, local noise power and local signal maximum quantities for each of these signals and stores them in a table.

Referring to FIG. 24A, block 701 retrieves the previously saved true power of the strongest target signal (STRONGLINE), which has been previously reduced in true power by 24 db in the preceding pass through OPLFAST and then multiplies it by 0.75. The reason this is done is to act as an amplitude filter to prevent the amplitude of the saved strongest target signal from dropping more than 75% on each pass because this modified signal strength is used as a qualification criteria for the candidates for fastest target and it is undesirable to allow this signal to momentarily drop out thereby causing false fastest targets to appear. Next, block 703 is performed to retrieve the variable STRONG STRENGTH which is the true power of the current strongest target signal. This is done by using STRONGLINE as an index pointer into a spectral buffer that stores the 48 bit longwords. The retrieved variable STRONGSTRENGTH is reduced by 24 db by a right shift of 8 bit positions in block 705. Then test 707 is performed to determine if the new signal strength (of STRONGSTRENGTH ) is greater than 75% of STRONGSTRENGTH. If it is, then a variable TARGETSTRENGTH is set equal to STRONGSTRENGTH in block 709. If it is not, then TARGETSTRENGTH is reduced by 75% of old TARGETSTRENGTH in block 711.

Next a list of 7 indices in a table of four variables (see FIG. 24E) to make room for 7 new potential fastest targets in block 713. To start the top down search, the apparent powers of the spectral lines in the highest frequency 64 bins in the longword buffer (each longword represents one spectral line or bin) are summed by block 715. The test 717 determines whether a STRONGLINE spectal line has been qualified, because fastest processing will not be carried out without a valid STRONGLINE spectal line identified. If STRONGLINE is equal to zero, the fastest processing of the OPLFAST routine is disable by bypassing it by taking path 719.

Next, test 721 determines if the value of STRONGLINE is greater than 240 which represents a closure speed for the strongest target of about 200 MPH which renders fastest processing academic since somebody faster is unlikely. Next, test 723 is performed to determine if STRONGLINE is less than 190. If so, path 725 is taken to the process of block 727 where a variable BLOCKNOISESUM is set equal to the sum of the apparent powers in the 64 top bins in the longword buffer. Next, block 729 is performed to calculate the number of bins to test for the fastest signal, that number of bins being defined as bin 254 minus the bin of STRONGLINE plus 2. This number will be used as a limit for a do loop. Block 731 then sets a pointer into the spectral buffer of longwords at bin 254 as the fastest possible candidate. Block 733 then set the fastest target count to zero. At this point, a DO loop is entered with the first step being block 735 which retrieves the bin amplitude at the location of the pointer into the spectral buffer initialized in block 731.

Test 737 determines whether the amplitude retrieved by block 735 is greater than the TARGETSTRENGTH amplitude calculated in block 71 t or 709. If not, path 739 is taken to a process for decrementing the pointer. If so, path 741 is taken to test 743 which determines if the next bin lower than the pointer has more amplitude than the amplitude of the bin of the pointer. If it does have more power, it is not a valid fastest signal, and path 739 is taken. If it does not have more power, test 745 is performed to determine if the next bin higher has more power than the TARGETSTRENGTH amplitude calculated in block 711 or 709. If it does, then the pointer does not point to a valid fastest signal, and path 739 is taken. If it does have less power, the processes of block 747 are performed to add the spectral line pointed to by the pointer to the list of valid possible fastest target speeds. The energy of the bin at the pointer is summed with the energies of the bin-1 and the bin+1 and that sum is store in the list or table as the fastest target candidate #1 signal strength. Then the spectral line number is also stored in the table as the target index value. Next, the value of variable BLOCKNOISESUM is stored in the table and the target count is incremented.

Next test 751 is performed to determine if the target count is equal to 7. If it is, then path 753 is taken to terminate the do loop. If the target count is not equal to 7, then path 755 is taken to block 757 to decrement the pointer into the spectral buffer. Then test 759 determines if the pointer is less than 190 which is equal to the start of the initial noise block buffer, i.e., the block of bins from which the BLOCKNOISESUM value was computed. If the pointer is below 190, the noise block buffer is slid down by one spectral line. This is done by subtracting the apparent power from the highest numbered bin from the sum of the apparent powers of the 64 bins in the noise block buffer and adding the apparent power of the bin one below the lowest numbered bin in the noise block buffer. That process is symbolized by block 761. If the pointer is equal to or greater than 190, then path 763 is taken to test 765 which determines if all bins have been tested and the do loop is complete. If not, path 767 is taken back to block 735 to continue the do loop at the bin pointed by the decremented pointer.

Figure 24B:
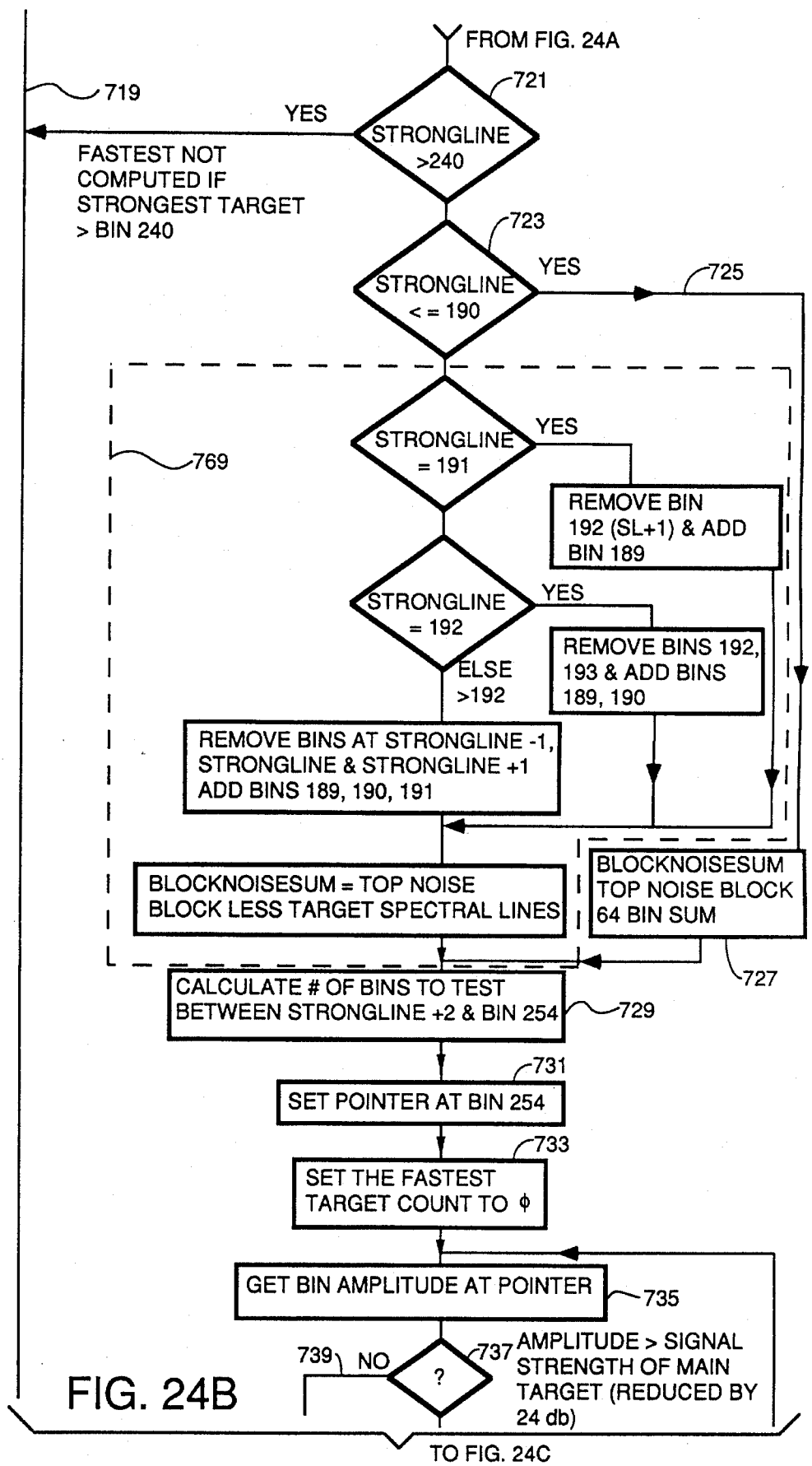
Figure 24C:
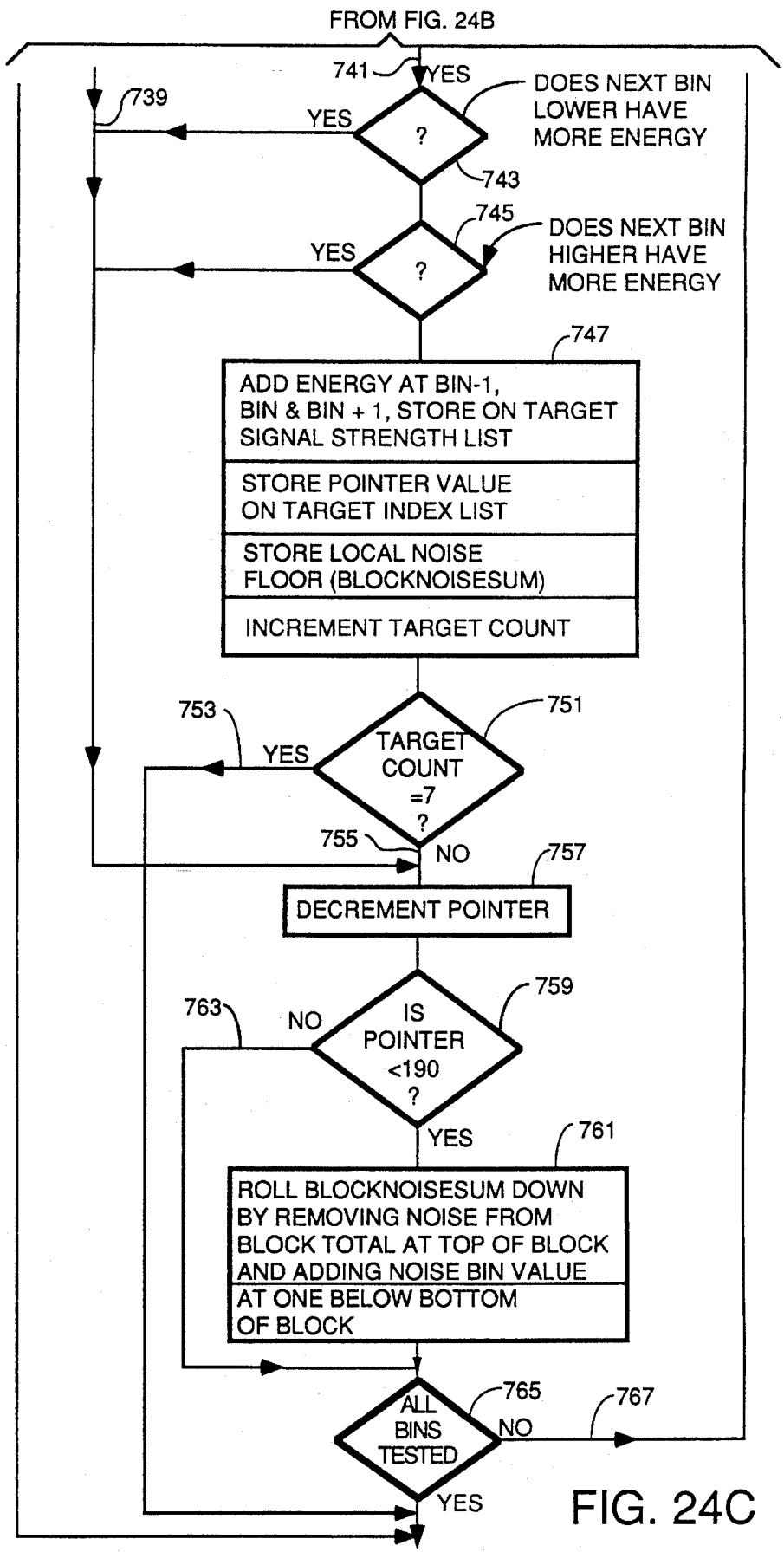
Figure 24D:
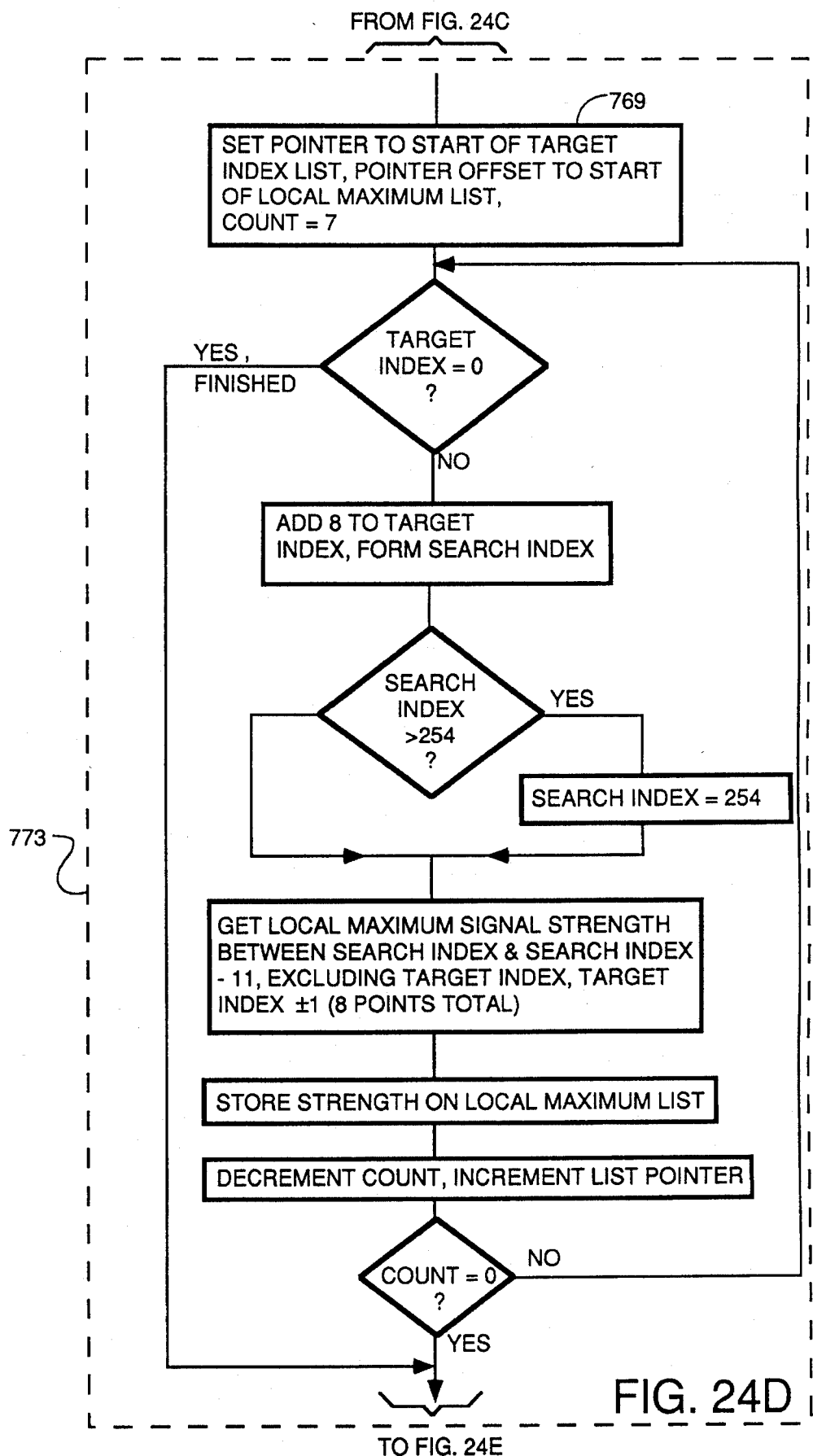

The processing within dashed box 769 on FIG. 24B serves to remove from the sum of variable BLOCKNOISESUM the apparent power of any and all of the three spectral lines of STRONGLINE, and STRONGLINE±1 spectral line which happen to fall within the 64 bin block noise buffer from which the noise power of BLOCKNOISESUM was calculated.

Figure 24E:

If all the bins have been tested, or if the target count has reached 7 in test 751, then the processing of block 769 is performed to start the process of filling in the table entries on table 771 on FIG. 24E for the local signal maximum entry for each fastest target candidate indexed in that table. At this point, table 771 has entries for TARGET INDEX, TARGET SIGNAL STRENGTH and BLOCKNOISESUM for each of 7 or more possible fastest target candidates. However, it is desirable to locate any weaker target signals in the immediate vicinity of each fastest target signal candidate on the higher frequency side for the purpose of possibly eliminating the adjacent fastest target speed candidate so as to eliminate any ambiguity as to which target is the target which returned the signal which gave rise to the fastest target candidate under scrutiny. The processing within dashed box 773 does this processing for each of the 7 fastest target speed candidates in table 771. Basically, this process gets the strongest signal strength from the 11 bins surrounding but excluding the target index spectral line +1 with 7 bins on the high frequency side of the three excluded spectral lines of the fastest speed candidate and one bin on the low frequency side thereof. This strongest signal strength is stored as the LOCAL SIGNAL MAXIMUM for that target index in table 771.

Next, the processing of block 775 is performed to modify the entries in table 771. The process involves, for each target index not equal to zero, BLOCKNOISESUM is scaled by dividing by 32 and the result is divided by the associated TARGET SIGNAL STRENGTH. Then the BLOCKNOISESUM variable for each target index is replaced with the ratio (BLOCKNOISESUM/32)/TARGET SIGNAL STRENGTH. Then each LOCAL SIGNAL MAXIMUM for each target index that is not zero is divided by the TARGET SIGNAL STRENGTH, and the resulting ratio is written over the LOCAL SIGNAL MAXIMUM. The OPLFAST routine then returns table 771 to the main loop for further processing. In the preferred embodiment, both these ratios are calculated using the apparent power of the noise signals and the fastest speed candidate signal, but in alternative embodiments, the true power of the noise signals and the true power of the fastest speed candidate signal could be used to calculate these ratios.

Figure 23B:
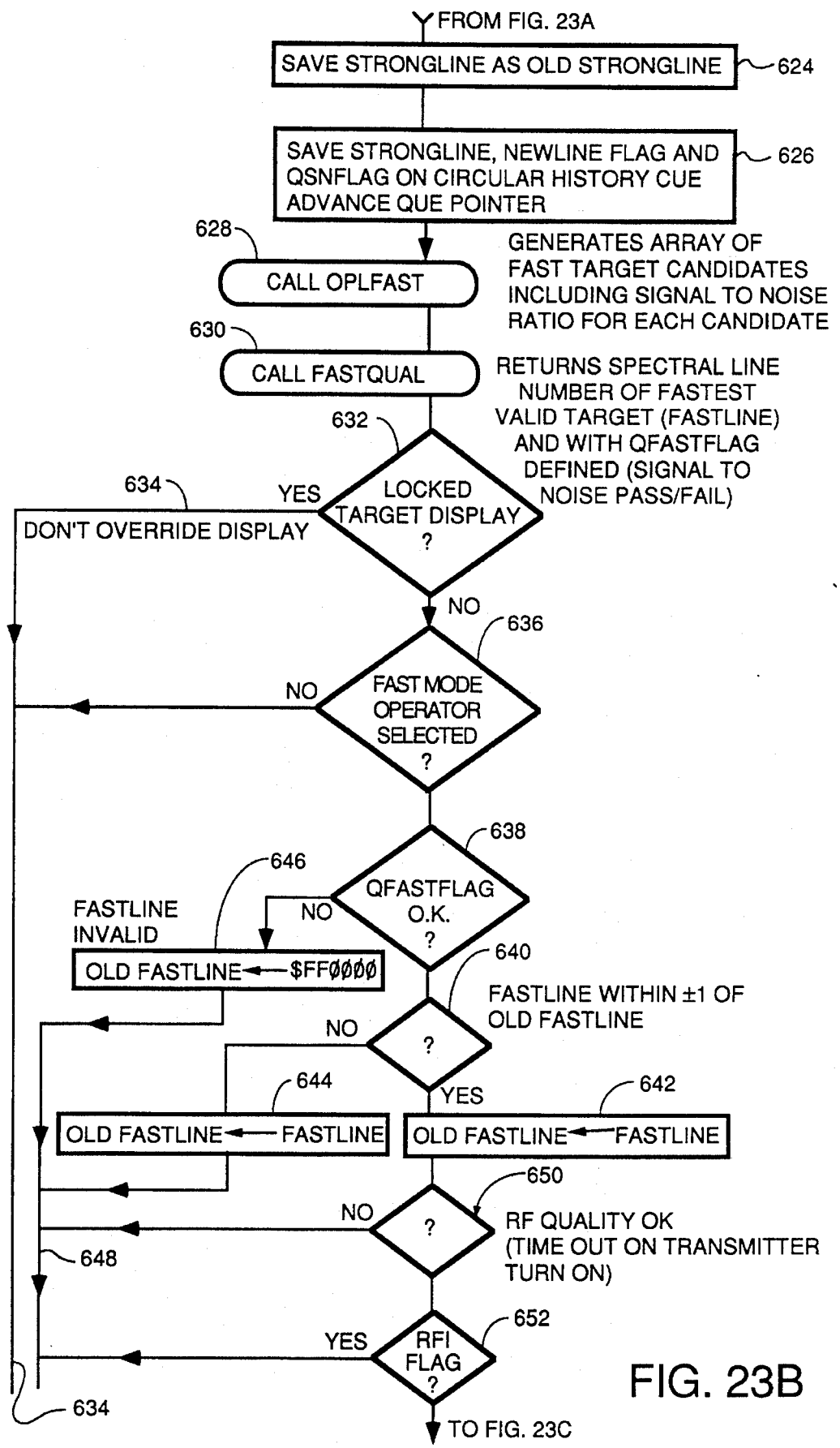
Figure 23C:
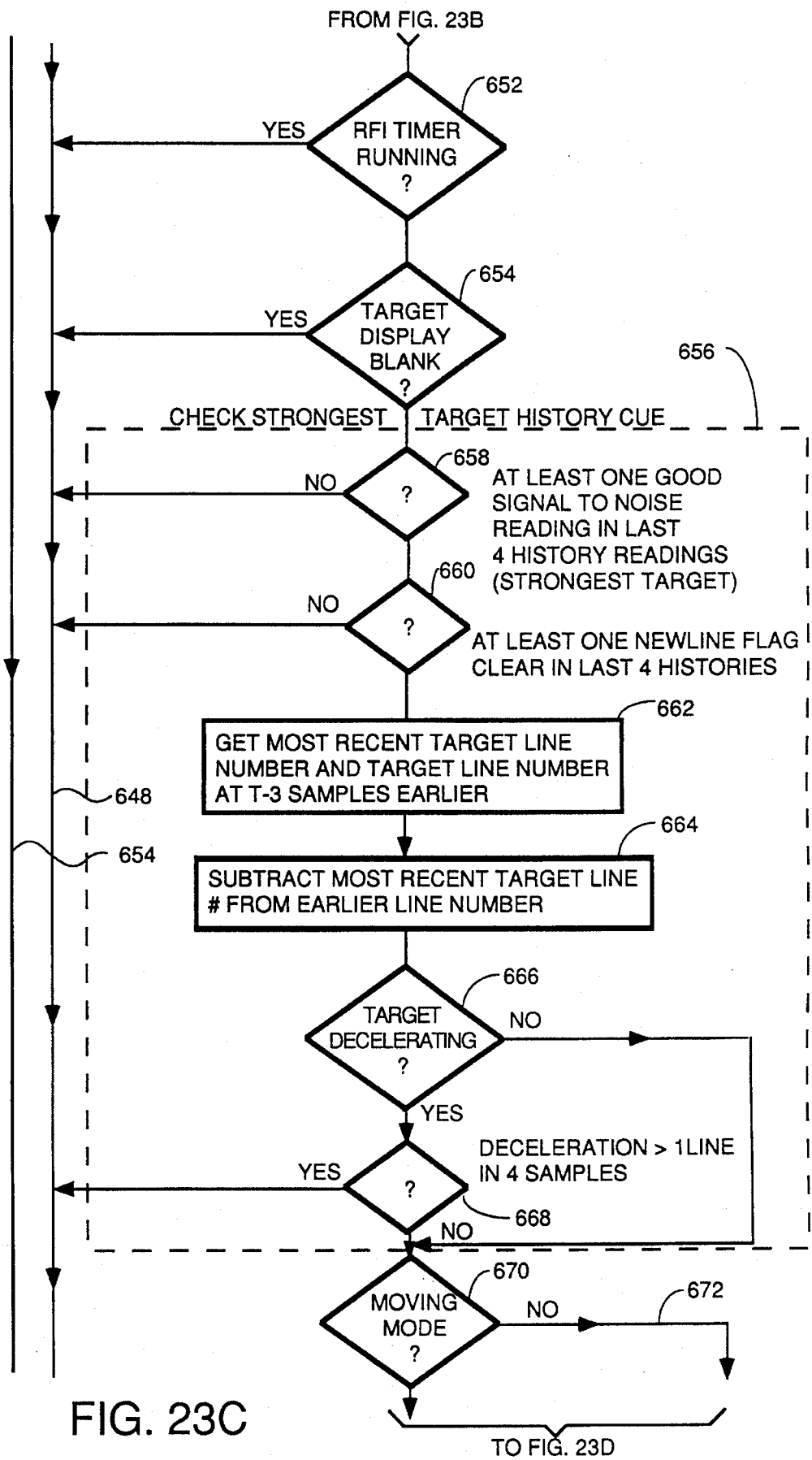
Figure 23D:
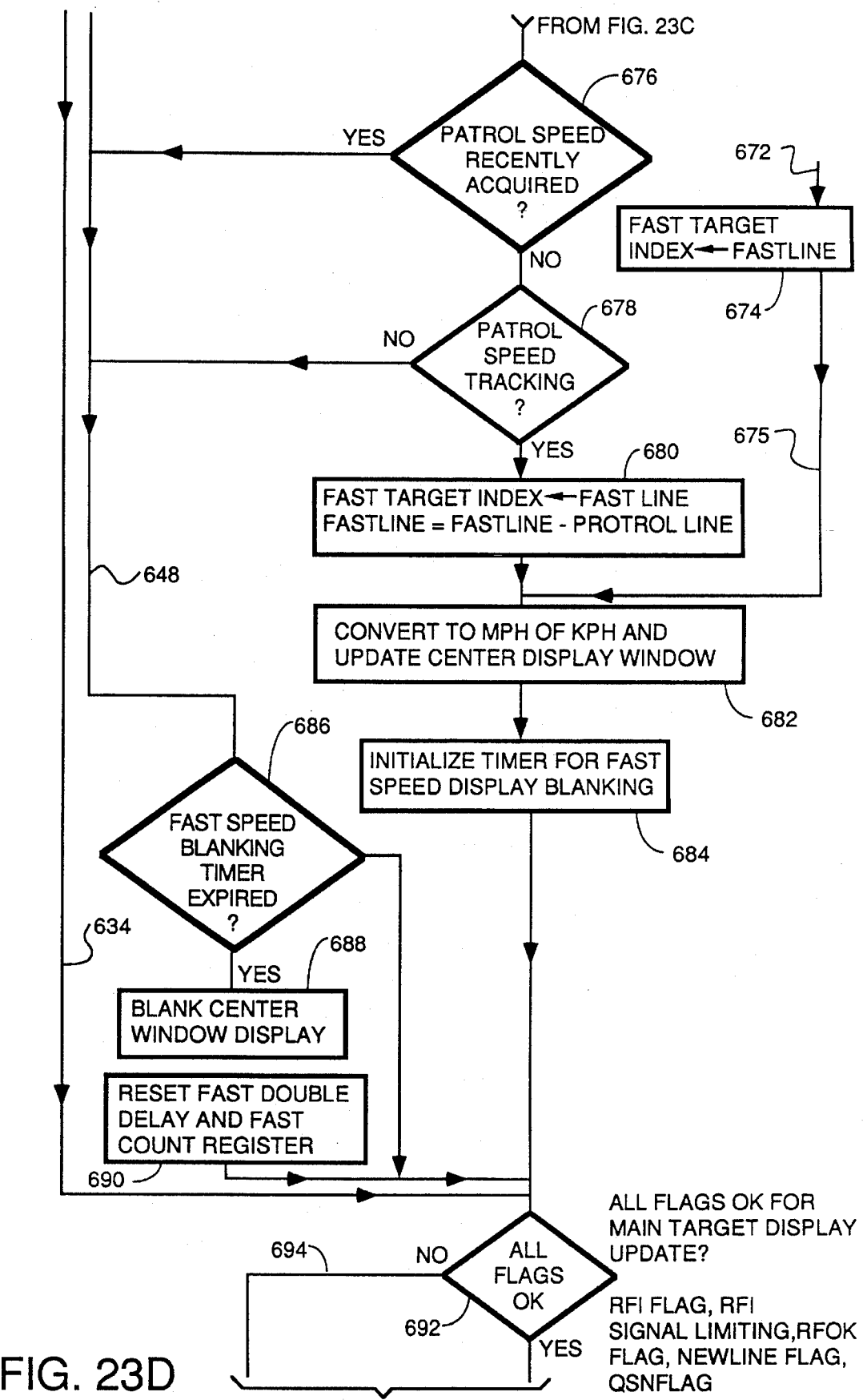
Figure 23E:
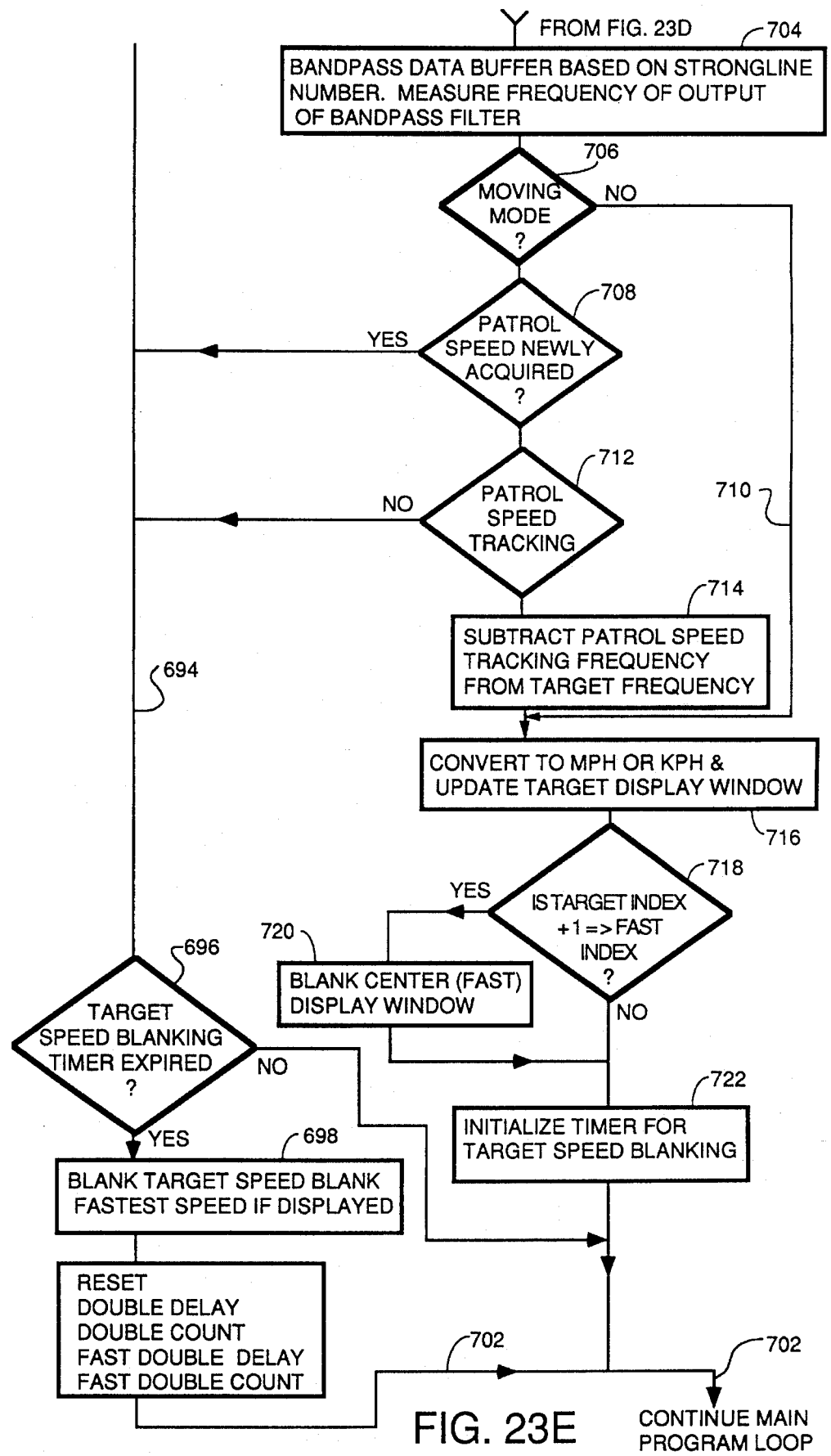

Returning to the consideration of FIG. 23B, the main loop process then calls the subroutine FASTQUAL which serves to screen the up to 7 fastest target candidates in table 771 for anomalies generated by intermodulation products or harmonics of the 5 strongest targets identified by the process of block 608 on FIG. 23A as symbolized by block 630. The subroutine also determines whether the signal-to-noise ratio and local noise maximum of each fastest speed candidate qualify the candidate given the factory setting for maximum sensitivity as modified by user choice for lesser sensitivity, if any. The FASTQUAL subroutine will return FASTLINE and QFASTFLAG variables identifying the first fastest target speed in table 771 that meets all the selection criteria.

Referring to FIG. 29A–29G, there is shown a flowchart of the FASTQUAL subroutine. The first step is symbolized by block 801 where the operator selected sensitivity number is retrieved. The operator selected sensitivity is a number from 0–3 and this is multiplied by a factor of 4. Block 803 adds the factory sensitivity number is added to the result from block 801 to generate a sensitivity index number from 0–12. Then, block 805 determines if the radar is in moving mode. If not, path 807 is taken. If so, test 809 determines if patrol speed is higher than a moving mode desensitization speed. It is undesirable to have a radar that is too sensitive when the patrol car is going slow because of 1/f noise floor characteristics. If the patrol speed is higher than the moving mode desensitization speed, path 811 is taken to block 813 which uses the high speed moving mode signal tables. Those tables contain moving mode noise/signal ratios. If patrol speed is not higher than desensitization speed, block 815 is performed to decrement the sensitivity index to reduce the sensitivity of the radar by one click. Then path 817 is taken joining path 807 to block 819 where the stationary noise/signal ratio tables are used. Out of block 813 and 819, paths are taken to block 821 where a pointer is set to the fastest index target entry generated by the OPLFAST routine and stored in table 771 in FIG. 24E.

Next, the processing of block 823 retrieves two numbers from two different tables. One of these numbers is a noise/ signal maximum ratio retrieved from whatever table was selected by blocks 81 3 and 819. The number is retrieved from this table using the sensitivity index number created by the processing steps 801–815 as an offset to the desired table entry. The second number retrieved is a local-noise-maximum/signal strength ratio retrieved from a table stored in RAM from a fixed table stored in ROM. The number retrieved from this table is retrieved using the sensitivity index calculated by blocks 801–815 as an offset into the table.

Next, using the two ratios retrieved by block 823, the fastest speed target entry in table 771 is tested against these ratios in a do loop. The do loop checks all fastest speed candidates until one passes the two tests or all valid candidates in table 771 are exhausted. Test 825 compares the noise/signal ratio of the current fastest candidate (the first pass through the do loop examines the fastest speed candidate in table 771) to the maximum noise/signal ratio retrieved from the currently selected table established by blocks 813 and 819. If the current fastest candidate's noise/signal ratio is higher than the maximum indicating a bad signal-to-noise ratio, path 827 is taken to block 829 where the pointer is advanced to the next fastest speed candidate. If the current fastest candidate's noise/signal ratio is lower than the maximum indicating a good signal-to-noise ratio, test 831 compares the local-noise-maximum/signal ratio to the ratio retrieved from the local-noise-maximum/signal ratio table stored in RAM. If the fastest candidate's ratio is greater than the retrieved table entry indicating a bad local noise condition, block 829 is executed to advance the pointer to the next candidate. If less than the retrieved table entry, the current fastest candidates passes both threshold acceptance tests and is selected as the only fastest candidate speed which has a chance of passing further processing to be described below. After the processing of block 829 is done, test 833 determines if all fastest candidates in table 771 have been tested against the two currently retrieved threshold criteria ratios by tests 825 and 831. If not, processing returns to test 825 to test the next fastest candidate. If all fastest candidates have been processed, the subroutine returns to the main processing loop without clearing the QFASTFLAG indicating that no valid fastest candidate exists.

Assuming a fastest candidate has passed the two threshold tests 825 and 831, path 835 is taken to test 837 with the fastest candidate selected by tests 825 and 831 designated as a preliminary fastest candidate. There, a test is performed to determine if a mobile data terminal (MDT) suppression flag has been set. This flag is set by the manufacturer of the radar unit for certain installations where the radar unit is to be mounted in a patrol car in close proximity to a cathode ray tube display used in some police car to show data from the dispatcher. The 15 KHz magnetic field from the sweep coils in the CRT can cause a false target at about 150 MPH closing speed. If this flag has been set, test 837 vectors processing to test 839 where the spectral line number of the preliminary fastest candidate is tested to determine if it falls between upper and lower MDT suppression limits. If so, the preliminary fastest candidate is rejected by returning from the subroutine without clearing the QFASTFLAG. If MDT suppression is not active or the spectral line of the preliminary fastest candidate is not between the MDT limits, test 841 is performed. This test determines whether the spectral line of the preliminary fastest candidate is a double ±1 of the spectral line of the STRONGLINE signal currently being displayed as the strongest target speed. If it is, then the subroutine returns to the main loop without clearing the QFASTFLAG indicating the preliminary fastest candidate has been rejected.

Assuming that the preliminary fastest candidate is not a double, the test 843 determines whether moving mode is active. If not in moving mode, path 847 is taken to test 849 where the spectral line number of the preliminary fastest candidate is compared to 14 to see if the fastest target is moving very slowly (spectral line number less than 14). If so, then the subroutine returns without clearing the QFASTFLAG thereby rejecting the preliminary fastest candidate. If the spectral line of the preliminary fastest candidate is higher than 14, path 851 is taken to block 853 to clear the QFASTFLAG.

If test 843 indicates moving mode is active, then test 845 is performed to determine if the spectral line number of the preliminary fastest candidate is a double of the patrol speed spectral line. The precise mathematical test performed is to determine if the spectral line number of the preliminary fastest candidate is less than the quantity 2 times the patrol speed line number plus 2 and greater than the quantity 2 times the patrol speed line number minus a variable SPREAD. SPREAD is a variable calculated each pass through the patrol speed tracking routine and is a number of spectral lines from 2 to 7 which reflects the spectrum width over time of the returns from stationary objects some of which have cosine errors while the patrol car moves past these objects. If the spectral line number of the preliminary fastest candidate is within the limits tested, then there is a possibility that the preliminary fastest candidate is a double and path 855 is taken to further processing to be described below to determine whether to display it or not. If the spectral line number of the preliminary fastest candidate is not within the limits tested in test 845, then the preliminary fastest candidate is not a patrol speed double, and block 857 is performed. This block clears a fast target double delay timer and clears a fast target double counter. The significance of this step will be explained below.

Next, test 859 is performed to determine if the preliminary fastest candidate is a triple of the patrol speed. This test determines if the spectral line number of the preliminary fastest candidate is greater than the quantity 3 times the spectral line number of the patrol speed less SPREAD and less than the quantity 3 times the spectral line number of the patrol speed plus 3. If the answer is no, then the preliminary fastest candidate is neither a double or a triple of the patrol speed, and path 861 is taken to test 863. This test determines if the patrol speed line number is greater than 15 because the radar is preferably desensitized if the patrol speed is very slow because low patrol speeds usually mean the patrol car is close behind other cars which leads to higher probability of multiple bounce signals creating false fastest targets. Therefore, if a low patrol speed exists, then block 865 is performed which points to the start of the low speed suppression table and sets the pointer offset to zero. The low speed suppression table is really two tables. One table stores noise/signal power ratios for low speeds, and the other table stores patrol speed signal strengths. A noise/signal ratio entry from the low speed suppression table will be used as an additional criteria to test the preliminary fastest candidate in low patrol speed situations. This entry is selected by the processing within dashed box 867 in FIG. 29D. Basically this process is a do loop that retrieves the actual patrol speed true power and then retrieves the lowest power entry from the patrol speed signal strength table and compares these two numbers. If the actual patrol speed true power exceeds the table entry, the table offset is incremented, and the next higher power table entry is retrieved and compared to the actual patrol speed true power. If the actual patrol speed true power is still higher than the table entry, then the do loop continues the process of incrementing the offset and retrieving a new higher power table entry until a table entry is found which exceeds the actual patrol speed true power. This particular do loop processing is used at several places within the subroutine to generate a number that is a function of the actual patrol speed true power.

When this entry is found by the process of block 867, the processing of block 869 is performed to use the table offset that was used to find the table entry of signal power that exceeds the actual patrol speed true power as an offset into the table of noise/signal ratios for low speeds. The entry at that offset value is used by the processing of test 869 to determine if the noise/signal power ratio of the preliminary fastest speed candidate is less than the entry retrieved from the table of noise/signal ratios for low speeds. If it is less, then the preliminary fastest speed candidate passes this test, and path 871 is taken to processing that imposes additional tests. Path 871 is also taken out of test 863 if the patrol speed spectral line number is greater than 15 indicating low patrol speed qualification of the preliminary fastest speed candidate is not necessary. If the noise/signal power ratio of the preliminary fastest speed candidate is greater than the entry retrieved from the table of noise/signal ratios for low speeds, then it is not a valid fastest speed and the subroutine returns without clearing the QFASTFLAG.

At this point, if processing is on path 871, it has been established that the preliminary fastest speed candidate is not a double or a triple of the patrol speed and, if the patrol speed spectral line is less than 15, the preliminary fastest speed candidate has passed an additional signal-to-noise requirement. Path 871 vectors processing to block 873 which is the start of a screening process to filter out the preliminary fastest speed candidate if it is likely to be an intermodulation product or a harmonic of one of the five strongest signals detected and recorded in strong signal table back at step 608 in the fast target processing section of the main loop the start of which is depicted on FIG. 23A. The five strong signals determined in step 608 were recorded in a strong signal table in decreasing order of power. Basically, if a strong signal recorded in the strong signal table does not have a true power which exceeds a first threshold, it will not have generated any detectable harmonic distortion. Likewise, if the signal does not have a true power which exceeds a second lower threshold, then it will not have generated any detectable intermodulation products. Intermodulation products are the sum and difference frequencies of strong received signals or a strong received signal and the transmit signal.

Figure 29A:
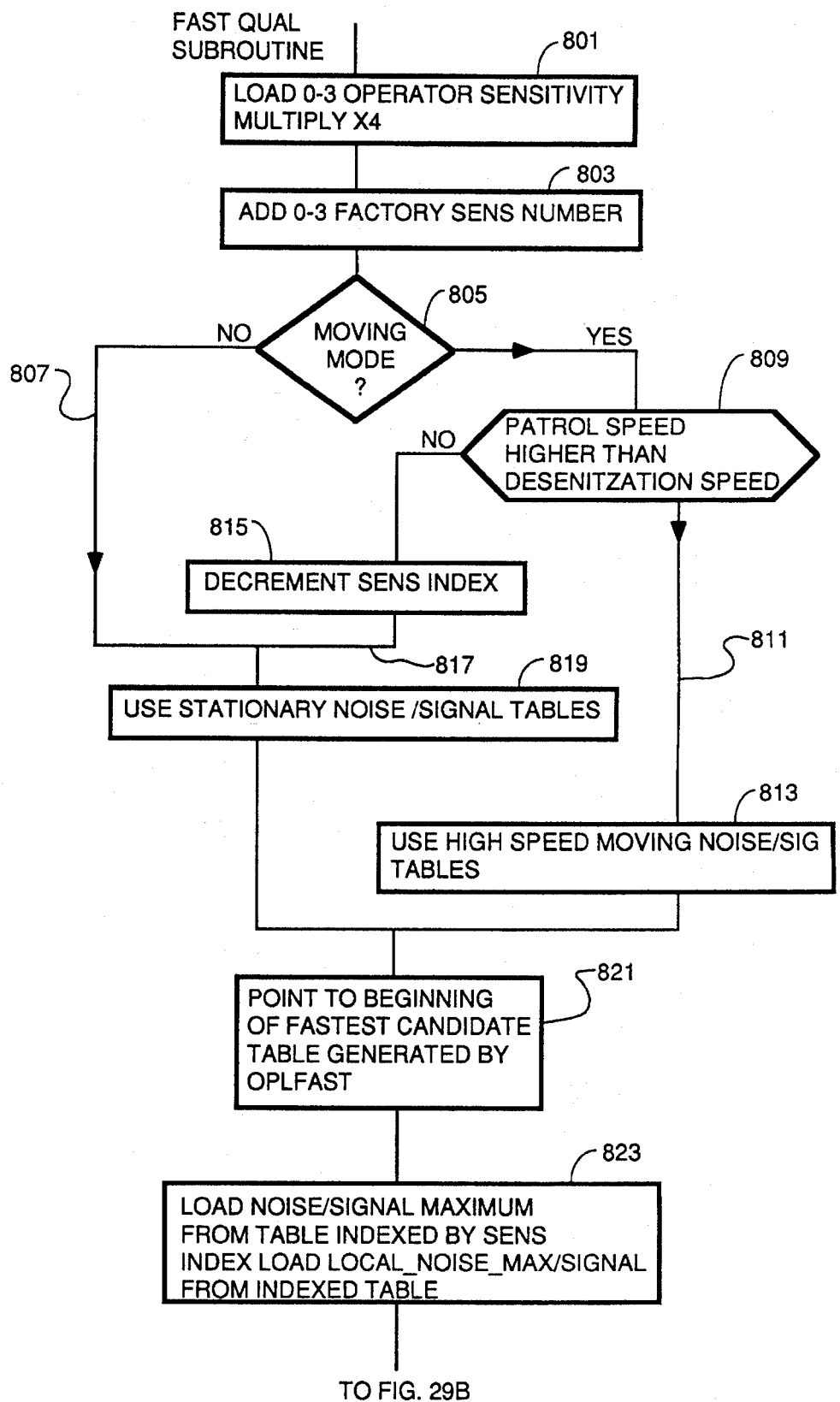
FIGS. 29A–29G illustrate the processing to qualify the fastest target signal for possible display.
Figure 29B:
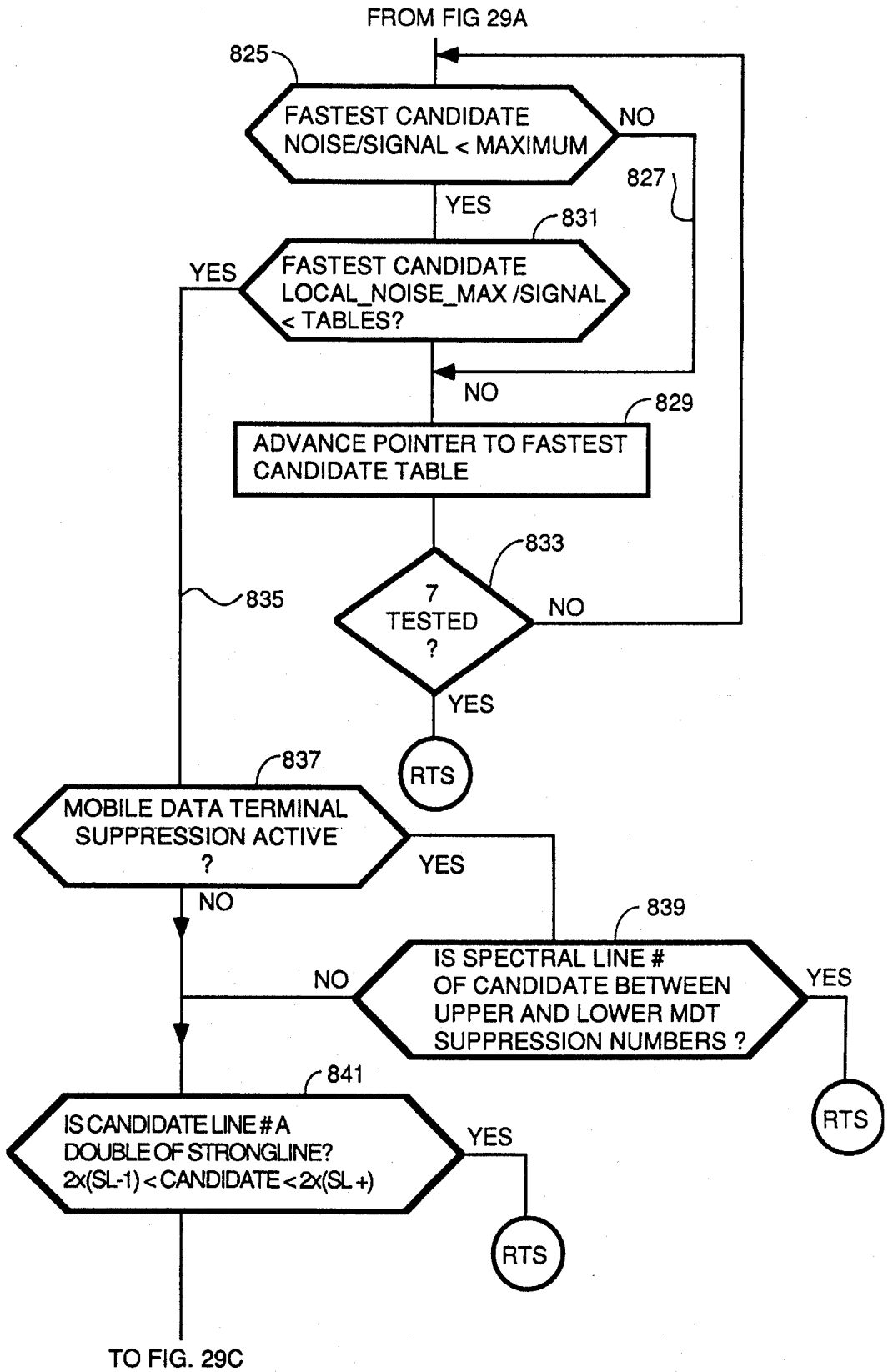
Figure 29C:
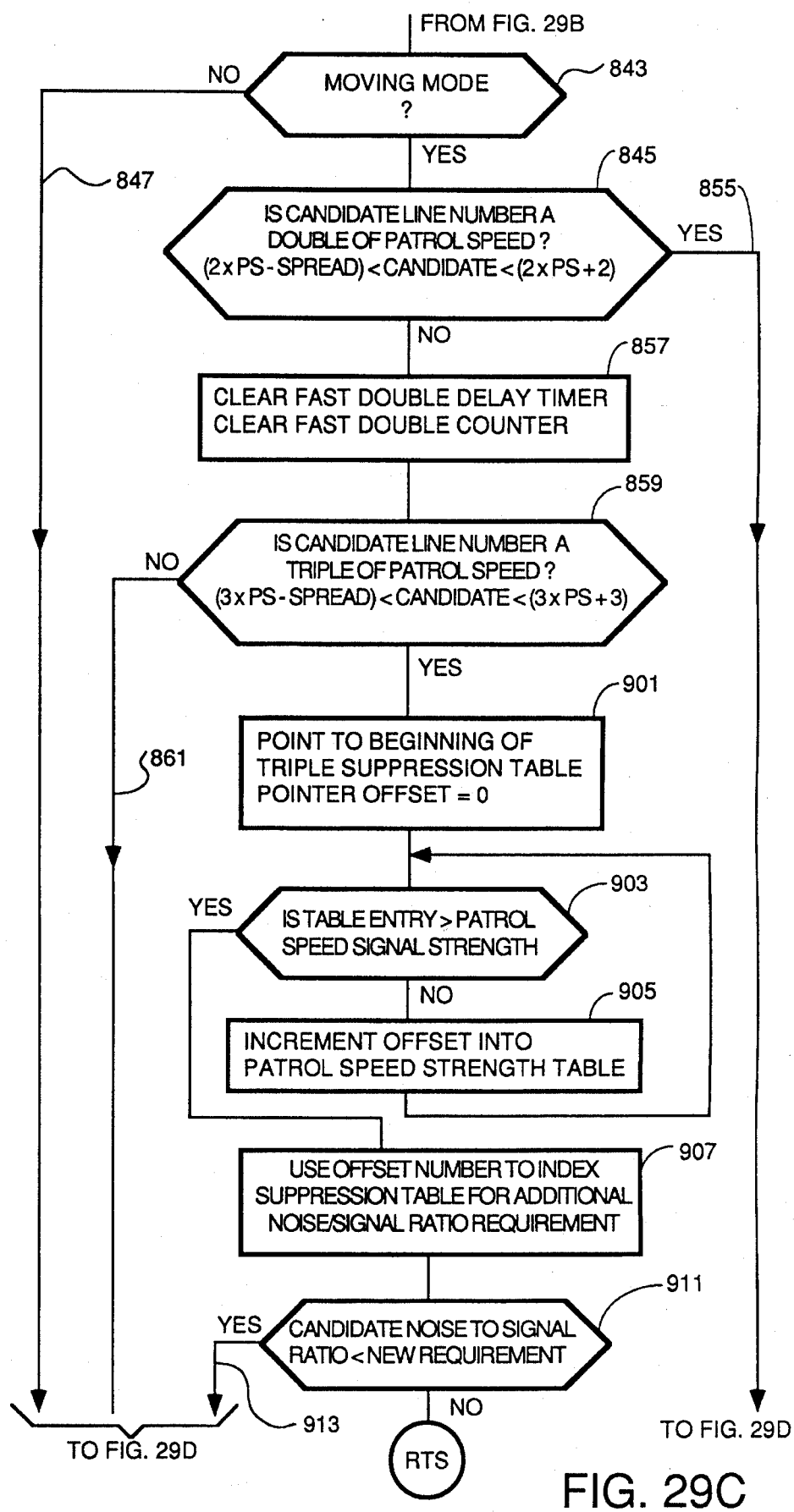
Figure 29D:
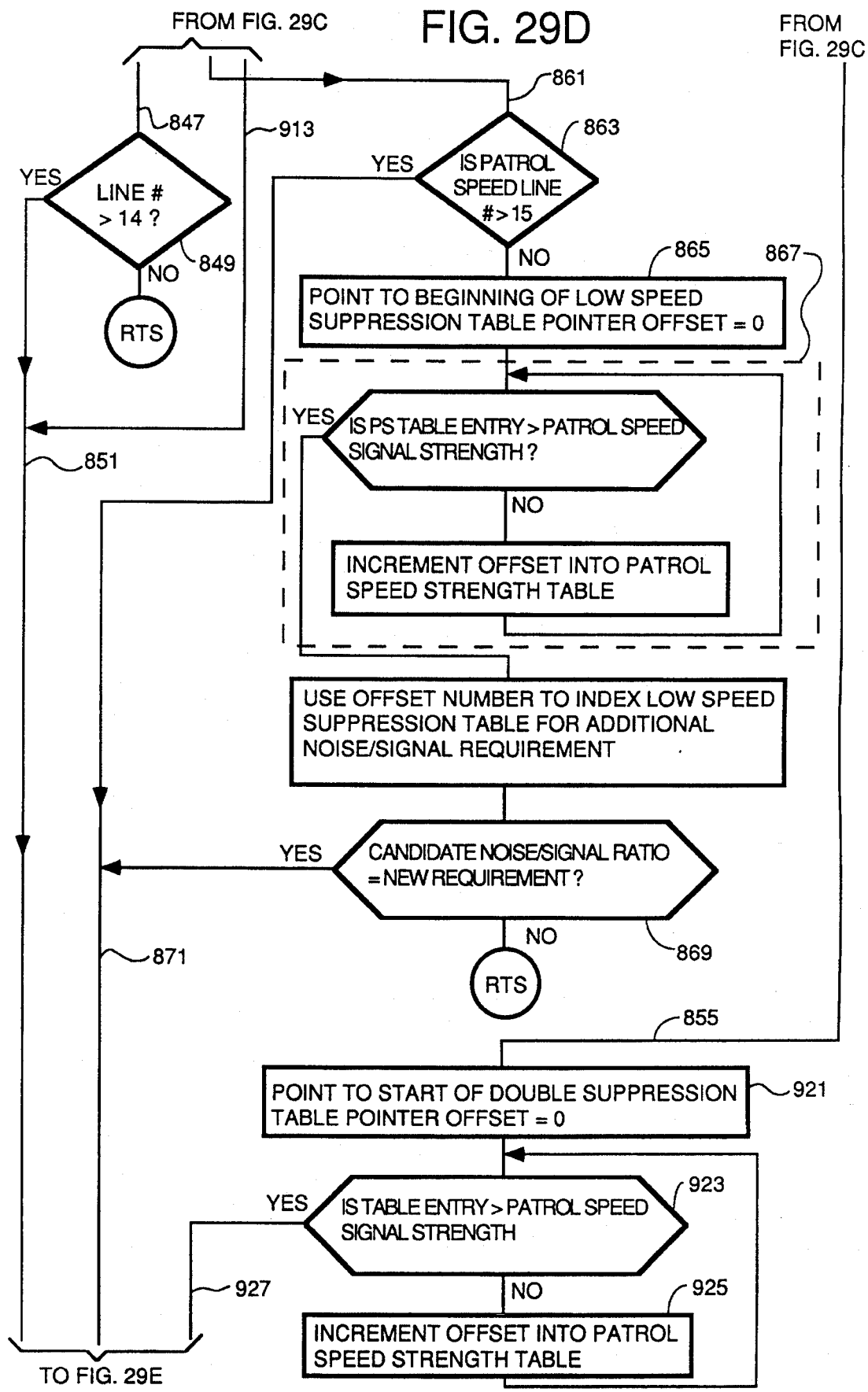
Figure 29E:
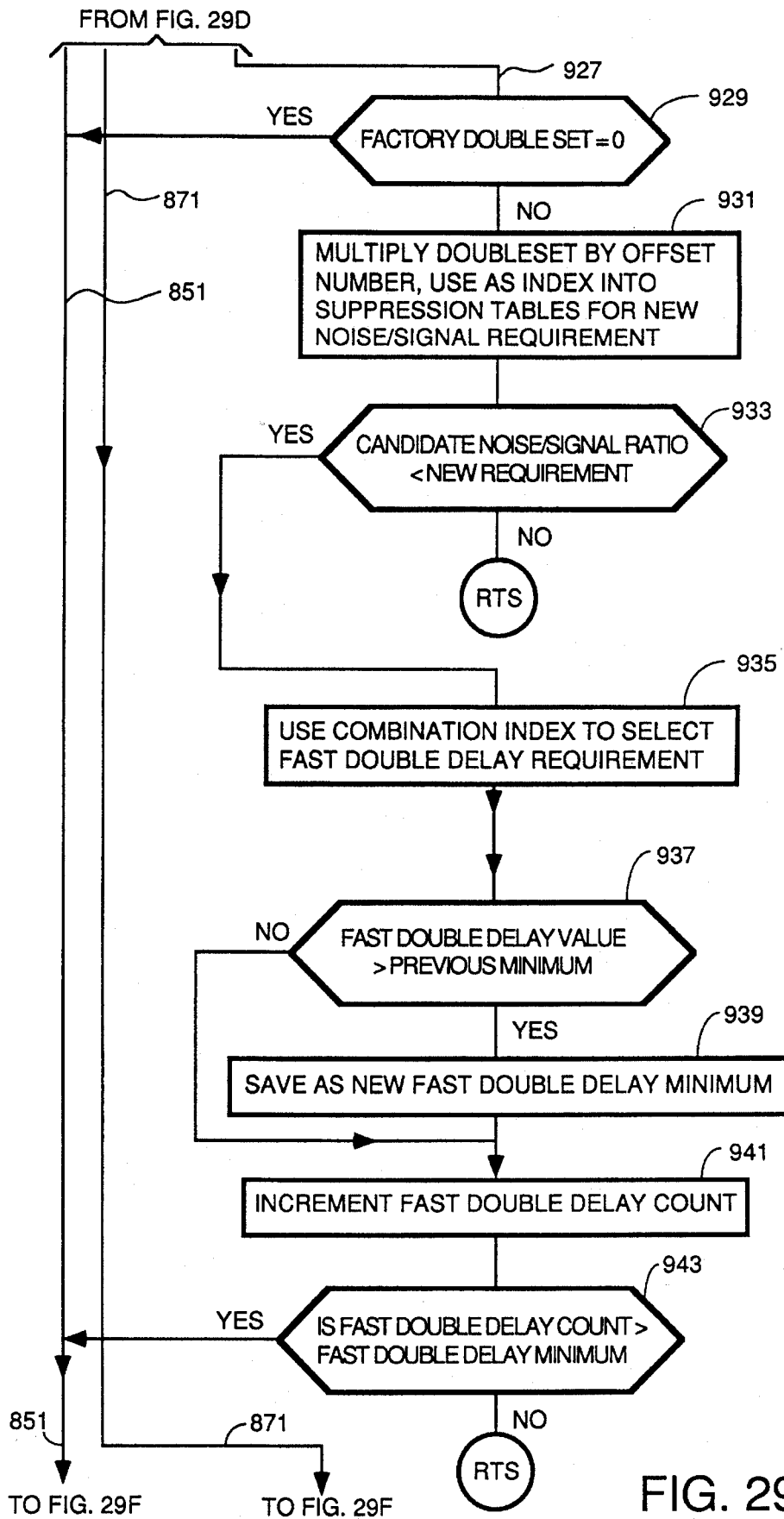
Figure 29F:
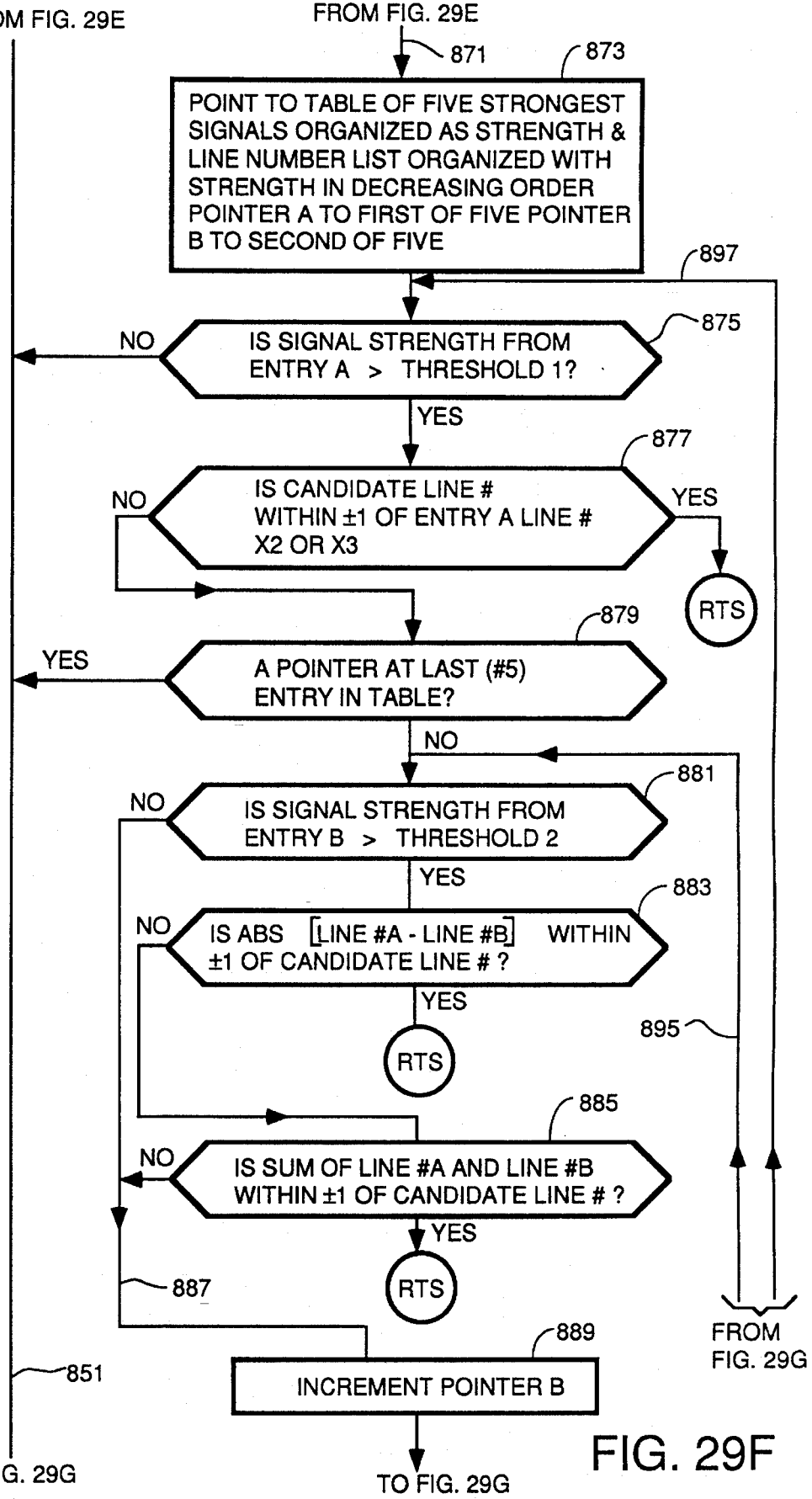
Figure 29G:
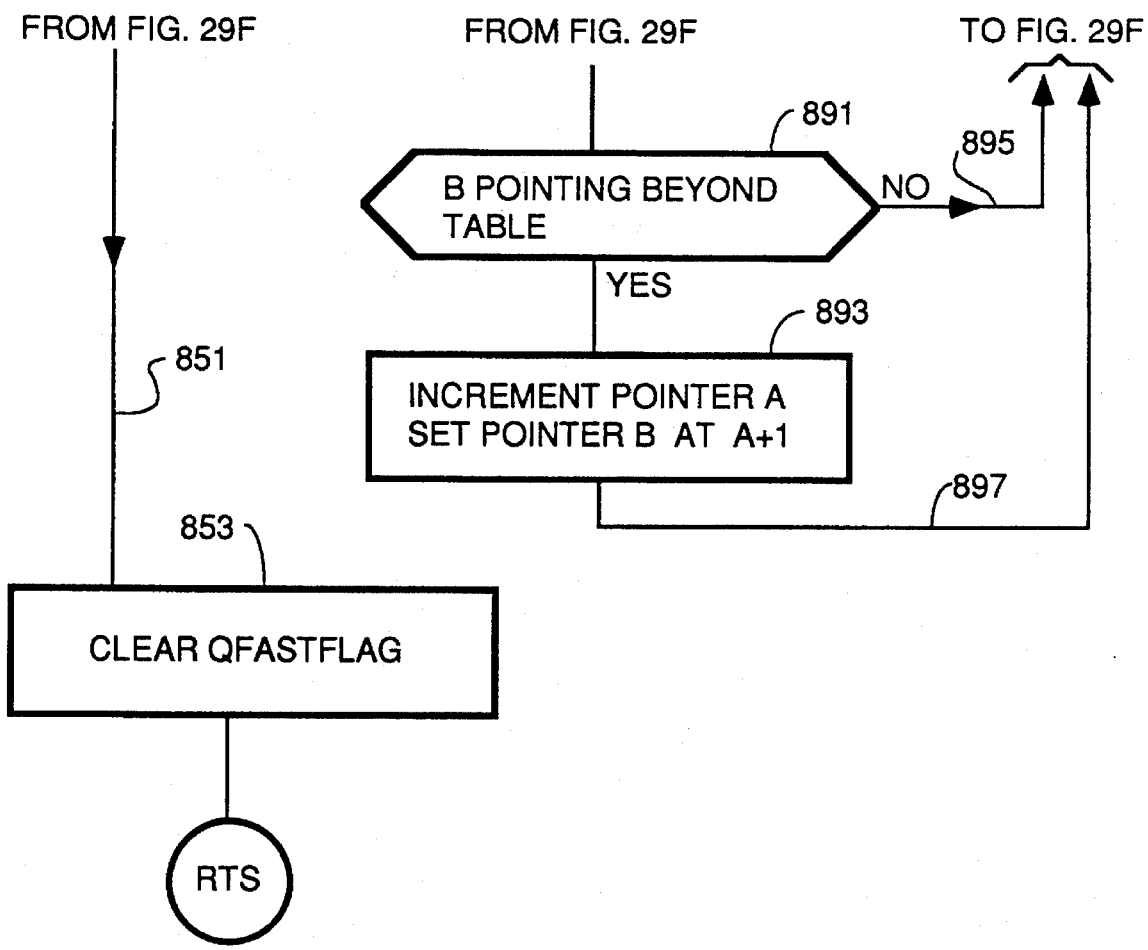

Block 873 on FIG. 29F starts this processing by setting up two pointers in the strong signal table. Pointer A points to the strongest signal and pointer B points to the second strongest signal of the 5 strong signals recorded. Next, test 875 is performed to determine if the true power of the signal pointed to by pointer A is greater than threshold 1, the harmonic threshold. If not, then path 851 is taken to block 853 which clears the QFASTFLAG indicating that the preliminary fastest target speed has passed all criteria and is cleared for display. No further processing is necessary because all other strong signals are weaker than the strong signal pointed to by pointer A and will not have had the power to generate harmonics or intermodulation products (because threshold 2, the intermodulation threshold is lower and for intermodulation to have existed, both thresholds have to have been exceeded).

Returning to test 875, if the signal power of the strong signal pointed to by pointer A is greater than threshold 1, then test 877 is performed to determine if the spectral line number of the preliminary fastest target signal is within ±1 of either two times or three times the spectral line number of the strong signal pointed to by pointer A. If so, then the preliminary fastest target signal is not valid, and the subroutine returns to the main loop without clearing the QFASTFLAG. If not, then test 879 determines if the strong signal pointed to by pointer A is the last entry in the strong signal table. If so, the subroutine takes path 851 to block 853 to clear the QFASTFLAG indicating a valid fastest signal has been found. If not, then test 881 determines if the signal strength of the strong signal pointed to pointer B is greater than threshold 2. If yes, then potential intermodulation is present, and test 883 is made. This test determines if the absolute value of the difference in spectral line numbers between the signals pointed to by pointers A and B is within ±1 spectral line of the spectral line number of the preliminary fastest candidate. If that is the case, the preliminary fastest speed signal is deemed to be an intermodulation product and is rejected by returning to the main loop without clearing the QFASTFLAG. If that is not the case, then test 885 is performed to determine if the sum of the spectral line numbers of the strong signals pointed to by pointers A and B is within ±1 spectral line of the spectral line number of the preliminary fastest candidate. If that is the case, the preliminary fastest speed signal is deemed to be an intermodulation product and is rejected by returning to the main loop without clearing the QFASTFLAG. If not the case, then path 887 is taken to block 889 to increment pointer B. Path 887 is also taken out of test 881 if the signal strength of the signal pointed by the then current pointer B is not greater than threshold 2 indicating that there is not likely to be an intermodulation problem.

After block 889 is performed, test 891 determines if pointer B points beyond the end of the 5 entry strong signal table. If it is, pointer A is incremented in block 893 and pointer B is set at pointer A+1 and path 897 is taken to test 875 to determine if the signal strength of the new strong signal pointed to by pointer A is greater than threshold 1 as previously discussed. If B is not pointing beyond the end of the table, path 895 is taken to re-enter block 881 to start the intermodulation product screen process on a new set of combinations. The intermodulation product screening process essentially tests the spectral line number of the preliminary fastest speed candidate to determine if it is either the sum or difference of all combinations of the spectral line numbers of strong signals in the strong signal table which have signal powers for the signal pointed to by pointer A that exceed threshold 1 and signal powers for the signal pointed to by pointer B which exceed threshold 2. Therefore, the do loop to move the pointers A and B will set the pointer A at a signal and, if the signal pointed by the new position for pointer A has a signal power which exceeds threshold 1, then moves the pointer B to all signals that have signal powers that exceed threshold 2 and continues until the preliminary fastest candidate spectral line number has been checked for an intermodulation relationship against the combination of all signals in the table with powers that exceed threshold 2 against the signal pointed to by pointer A.

Referring again to test 859 on FIG. 29C, if the preliminary fastest candidate's spectral line number is a triple of the patrol speed line number, some suppression is necessary based upon strong patrol speed signal strength. If patrol speed true signal power is weak, very little suppression is needed as the preliminary fastest candidate signal may be a real target. To that end, a process similar to the process within dashed box 867 is performed by steps 901 through 905 to return a noise/signal ratio. This process uses the same patrol speed true signal power table as the process 867 used, but uses a different table filled with suppression factors for triples (hereafter called the triple suppression table). These suppression factors are noise/signal power ratios. When an entry in the patrol speed true signal power table is found which exceeds, the true power of the patrol speed signal, the offset of this entry is used as an offset into the triple suppression table to retrieve a triple suppression factor. The process of using the offset to retrieve the triple suppression factor from the triple suppression table is carried out by block 907. This triple suppression factor is used by test 911 to screen the preliminary fastest candidate by determining if the true noise/signal power ratio of the preliminary fastest candidate is less than the retrieved triple suppression factor. If so, then the preliminary fastest candidate is good, and path 913 joining path 851 to block 853 is taken where the QFASTFLAG is cleared and the subroutine returns to the main loop. If not, then the preliminary fastest candidate is no good, and the subroutine returns to the main loop without clearing the QFASTFLAG.

The preliminary fastest candidate must also be tested to determine if it is a double of the patrol speed. Real targets often travel at about the same speed as the patrol car so the closing speed in moving mode would appear to be a false double signal when it is in reality a valid target. About 20 db suppression of false doubles is achieved by the double balanced mixer, but further suppression in the software is desirable since the second harmonic of the patrol speed is often quite a strong signal if the patrol speed itself is a strong signal. To avoid suppression of preliminary fastest targets which are travelling at about the same speed as the patrol car in the opposite lane and represent valid targets while suppressing false doubles, the software goes through some screening of the preliminary fastest candidate which is based upon both the true signal power of the patrol speed signal and the fact that false target doubles are usually transitory in nature and will disappear after 1–3 seconds. Therefore, double suppression factors are selected based upon the true signal power of the patrol speed and, in addition, upon a setting recorded by the manufacturer in final road testing of each unit that points to one of a plurality of double noise/signal power ratio suppression factors and double delay factors that are selected based upon the actual test performance of a particular unit in the road test. Generally, if the patrol speed true signal power is not high, a not severe double suppression factor will be selected and a short double delay factor will allow the candidate to be displayed almost immediately. If, on the other hand, the true patrol speed signal power is high, a more severe double noise/signal power ratio suppression factor and a longer double delay factor will be selected to prevent display of fastest candidate until it persists for an interval longer than the double delay factor. The details of this processing follow.

Returning to the consideration of test 845, if the preliminary fastest candidate is a double of patrol speed, path 855 is taken to block 921 on FIG. 29D which starts a process similar to the process of block 867 to generate an offset into a double suppression factor table based upon the true signal power of the patrol speed signal. This offset generation process is done by steps 921–925. Once the offset into the double suppression table is generated, path 927 is taken out of test 923 to test 929. Test 929 determines if the manufacturer set variable DOUBLESET is zero. DOUBLESET is the variable set permanently by the manufacturer during the final road test to take into account the peculiarities of the particular radar unit's performance and is not normally set to zero. If DOUBLESET is zero, path 851 is taken to block 853 where the QFASTFLAG is cleared and processing returns to the main loop. DOUBLESET is set to zero to test whether the radar unit under test measures up to a good radar unit that will not generate a false double under known test conditions thereby giving the manufacturer a way to make an initial evaluation of the quality of the particular unit. DOUBLESET is normally a number from 0–5. If DOUBLESET is not zero, then block 931 is performed multiply DOUBLESET by the offset number selected earlier by steps 921 through 925 based upon the true signal power of the patrol speed signal. This generates a new index number which indexes into one of 5 different stacked double suppression factor tables, each of which contains a different set of double suppression noise/signal power ratios of increasing severity. The offset is selected based upon the true signal power of the patrol speed, but the DOUBLESET variable will determine which of the 5 tables is entered by the index. The 5 stacked tables each have multiple suppression factors of increasing severity, but the beginning factor of the second table up in the stack is less severe than the last suppression factor of the first table and so on for each of the 5 tables. If the offset is, for example, 5, and the DOUBLESET variable is 1, then the first table in the stack will be entered at the 5th entry. If DOUBLESET is 2, and the offset is 5, the 2nd table will be entered at the 5th entry thereof. The same sort of scheme is used to select a double delay factor. The double delay factors are also stored in 5 stacked tables with entries therein which range from delays of from 80 milliseconds up to 20 seconds. A delay of 20 seconds means that at any normal speed, the target is past the patrol car before the fastest target speed is allowed to be displayed. This type delay would be imposed only for very strong patrol speed signals.

Then test 933 is performed to determine if the noise/signal power ratio of the preliminary fastest candidate is less than the double suppression noise/signal power ratio retrieved from the stacked double suppression table accessed by the current values of the offset and the DOUBLESET variable. If not, the subroutine returns without clearing the QFASTFLAG. If so, block 935 selects a double delay interval from the stacked double delay tables using the same combination offset derived from the DOUBLESET variable. Then test 937 determines whether the retrieved delay value is greater than the previously retrieved delay value. If it is, then the newly retrieved greater delay interval is used and saved in block 939. If not, then the previously retrieved delay value continues to be used and the processing of block 941 is performed to increment the fast target double delay counter. This processing takes into account the fact that stationary objects in the distance that are causing double bounce signals may cause stronger double bounce signals as the patrol car approaches them. The stronger signals require greater delays until the geometry of the situation causes the strength of the double bounce signal strength to fall off. After the processing of block 939 is performed, block 941 is performed to increment a fast target double delay counter. Then test 943 is made to determine if the incremented count is greater than the current double delay interval. If it is, the preliminary fastest candidate is valid and can be displayed, and path 851 to block 853 is performed where the QFASTFLAG is cleared and the subroutine returns. If not, the routine returns without clearing QFASTFLAG and the preliminary fastest candidate is not yet ready for display but may be displayed on subsequent subroutine calls when the double delay count exceeds the double delay interval.

When the FASTQUAL subroutine returns to the main loop, it returns to test 632 on FIG. 23B. At that point, there is always a spectral line identified as the fastest signal stored in a variable FASTLINE and there will be a flag QFAST-FLAG, which, if cleared, means that FASTLINE is a valid fastest signal that is eligible for display, and, if not cleared, means that FASTLINE is not valid. Test 632 determines if the middle display window has a locked target speed displayed therein. If so, the fastest target speed will not be displayed as symbolized by path 634. If not, then test 636 will be performed in the preferred embodiment to determine if the operator has selected fastest mode and desires to see the fastest target displayed in the middle window. In some embodiments, the fastest speed, if available, will always be displayed if there is no locked speed value being displayed in the middle window. In the preferred embodiment, if fastest mode is not selected, path 634 is taken that bypasses all processing related to the fastest target speed display mode.

If fastest mode is selected, test 638 determines if the QFASTFLAG has been cleared. If so, then test 640 determines if FASTLINE is within ±1 spectral line of the old FASTLINE on the last pass through this section of the main loop. This is done as a quality guarantee in that the fastest speed is not deemed to be ready for display until nearly the same value for FASTLINE has appeared on two consecutive passes. This is done because radar targets are more likely to be real if they have appeared twice in a row. The reason for the ±1 spectral line tolerance is to allow the target to be accelerating or decelerating and still qualify. Regardless of the results of test 640, blocks 642 and 644 replace the value of old FASTLINE with the current FASTLINE value.

If test 638 indicates that QFASTFLAG has not been cleared, block 646 stores a constant in old FASTLINE that is out of the range of a valid spectral line number. This is done so that an invalid FASTLINE will not be used in the comparison step of 640 and pass a valid new FASTLINE through test 640 on the first pass.

After block 646 is performed or block 644 is performed, path 648 is taken to a process to be described below which blanks the center display.

After block 642 is performed, test 650 determines if sufficient time has elapsed since the transmitter was turned on for the RF quality to be acceptable. If not, path 648 is taken to blank the middle window. If sufficient time has elapsed, test 652 is performed to determine if the RFI flag was set. The RFI flag is set by a process not shown which goes through a completed buffer full of sample words and ORs all the sample words in the buffer to see if any word has set the RFI bit. That is, the 2048 24-bit words in the data block stored in the buffer are logically "ORED" into a test word. If an RFI (Radio Frequency Interference) condition existed during any of the received words in the block, it will appear at the corresponding bit position in the test word and an RFI flag will be set. Also, each received data word from an antenna unit has certain bit positions that are always zero. If these positions are not zero in the test word, a loss of receive synchronization is indicated and the main program will act to re-initialize the SSI. If test 652 indicates the RFI bit has been set at any time during the data block acquisition period, then path 648 is taken to blank the middle window.

If the RFI flag has not been set, test 652 determines if the RFI timer is still running. If so, path 648 is taken to blank the middle window. The RFI timer is started whenever the RFI flag has been set, and this timer continues to run for about 0.5 seconds after the RFI flag has been cleared. This is done because if the RFI flag has been set, it is undesirable to allow fastest target speed display immediately after the RFI flag has been cleared to allow transients to clear the system and to allow the sensitivity of the system to be re-established in case the system was saturated with a very strong RFI signal. There is also an RFI LED on the front panel of the unit, and the RFI timer will keep this indicator lit for a reasonable time so that it can be noticed by the patrolman. If test 652 indicates the RFI timer is not still running, test 654 determines if there is currently displayed a strongest target speed in the left display window. If not, then it is preferred to not display any fastest target speed, although in alternative embodiments, this qualification may be omitted. If the strongest target display is blank, path 648 is taken to blank the middle window.

The processing of the steps within dashed box 656 (steps 658, 660, 662, 664, 666, 668) determine if the strongest target signal is rapidly decreasing in frequency indicating either a rapid deceleration of the target or a cosine effect apparent decrease in speed as the target passes the patrol car in the opposite direction. This rapid decrease in frequency can cause a chirp which causes scalloping in the FFT spectral results which can cause a false fastest target speed to be detected. The processing in dashed box 656 determines whether this rapid decrease in frequency is occurring by checking the spectral line values recorded in the circular history buffer created by the process of block 626 on FIG. 23B. This is done by checking the quality of the strong signal queue by determining if at least one good signal-to-noise reading exists in the last 4 entries in the history queue to prevent fastest display if the strongest target signal has disappeared and the strongest target display is only timing out. Another quality check is to determine if at least one NEWLINE flag has been cleared in the last 4 history entries which means the strong target signal is not a new spectral line and has occurred at least twice consecutively. Then the history entries are checked for rapidly decreasing frequency of greater than one line difference across 4 samples (greater than 0.8 MPH deceleration in 0.16 seconds). If the quality check fails or rapid frequency decrease is occurring, then path 648 is taken to blank the middle window.

Otherwise, test 670 determines if the unit is in moving mode. If not, then path 672 is taken to block 674 which loads the spectral line number of FASTLINE into a variable called FASTTARGET INDEX. FAST TARGET INDEX is a variable that saves the FASTLINE spectral line number in RAM since in subsequent processing FASTLINE's value in a DSP register (a closing speed) is going to be altered by subtracting the patrol speed to derive the fastest target speed. If the system is in moving mode, test 676 is performed to determine whether a timer is running indicating patrol speed was recently acquired. This timer is started whenever a new patrol speed is acquired. This timer and the test of 676 impose a 0.2 second delay to clear out the history queue to prevent erroneous readings from being displayed momentarily when the unit initially acquires patrol speed. If the timer is running, path 648 is taken. Otherwise, test 678 determines whether the unit is in patrol speed tracking mode. If not, path 648 is taken to blank the middle window. If patrol tracking mode is active, then block 680 determines the fastest target speed by subtracting the patrol speed (PATROLLINE) from the fastest speed candidate (FASTLINE) returned by the FASTQUAL subroutine.

Then block 682 is performed from either block 680 or path 675. Block 682 converts the spectral line number derived by block 680 to miles per hour in BCD format and updates the center display to display the fastest target speed and turns on the fastest icon. In some embodiments, the fastest icon can be eliminated as not critical to the invention.

Then block 684 initializes a timer to initialize a time to blank the middle display if the fastest speed is not updated within a predetermined interval (preferably 1.5 seconds).

The processing which blanks the middle display is symbolized by test 686, block 688, and block 690 all of which is led to by path 648. Test 686 is reached whenever any condition occurs which requires that the fastest signal speed not be displayed. This test determines whether the fast speed blanking timer has expired. This timer is started when block 684 is executed indicating a new fastest target speed has just been displayed and runs for a predetermined interval of 1.5 seconds in the preferred embodiment. If the fast speed timer has expired, block 688 blanks the center window and any fast icon or LED, if present. Then block 690 is performed to reset the fast double delay minimum value and fast double delay count counter (see steps 937, 939 and 941 on FIG. 29E).

After blocks 690 or 684 are performed or if test 686 indicates that the fast speed timer has not expired or if path 634 (fastest mode is not enabled or there is a locked strongest target speed in the middle window) has been taken from any previous step, test 692 is performed to determine if all flags are OK indicating the strongest target signal is acceptable for display update. The flags that are tested are: RFI, RFI timer, Signal Limiting (indicating whether there had been a momentary signal overload in which case the buffer of sample data is not processed), RF OK, NEWLINE, QSN FLAG (signal-to-noise ratio acceptable). Test 692 starts a process of decision for displaying strongest target speed. If any of those flags indicate the strongest target signal is not acceptable for display, path 694 is taken to test 696 which starts a process of blanking the strongest target display window on the left and the fastest target display in the middle window. Test 696 determines if the target speed blanking timer has expired. If it has, block 698 blanks the strongest target speed display and the fastest target speed, if displayed and resets the following variables: double delay; double count; fast double delay minimum and fast double delay count. These variables are reset because they are related to screening out false targets which are patrol speed doubles appearing in either the strongest target display or the fastest target display.

After the processing of block 698, path 702 is taken to some prior art processing found in the Stalker radar unit.

If test 692 indicates that all flags are OK, then block 704 bandpasses the data buffer to set a digital bandpass filter centered around the spectral line of the strongest target signal (STRONGLINE). The filtered output samples from the filtering process are stored in a temporary buffer. Block 704 calls another routine to measure the frequency of the STRONGLINE signal defined by the filter output in the temporary buffer by finding the zero crossings and measuring the time interval between the zero crossings by counting samples and calculating the frequency from this data.

Next, test 706 determines whether the unit is in moving mode. If not in moving mode, path 710 is taken to bypass the processing which determines whether patrol speed has been newly acquired etc. If the unit is in moving mode, test 708 determines whether the patrol speed has been newly acquired. If so, path 694 is taken to the process of test 696 to test for blanking of strongest target display. If patrol speed has not been newly acquired, test 712 determines whether patrol speed is been tracked. If not, path 694 is taken to the process of test 696 to test for blanking of strongest target display. If yes, block 714 subtracts patrol speed frequency from strongest target frequency and passes the frequency difference to block 716 where the frequency difference is converted to miles per hour using the relationship that Doppler shift results in a frequency shift of about 103 Hertz per mile per hour. If test 706 determines the unit is not in moving mode, the frequency determined in the process of block 704 is passed to block 716 for conversion to miles per hour. Thereafter, test 718 determines if the newly acquired strongest target speed is as fast or faster than the current fastest target display. If this situation exists, block 720 is performed to blank the fastest display window. In either case, block 722 subsequently initializes a timer for target speed blanking for a 1.5 second timeout.

After block 722 is performed, or if test 696 indicates the strongest target blanking timer is not expired, or after the processing of block 698, path 702 is taken to the balance of the main loop processing, most of which is in the prior art and none of which is critical to the claimed inventions.

Figure 30A:
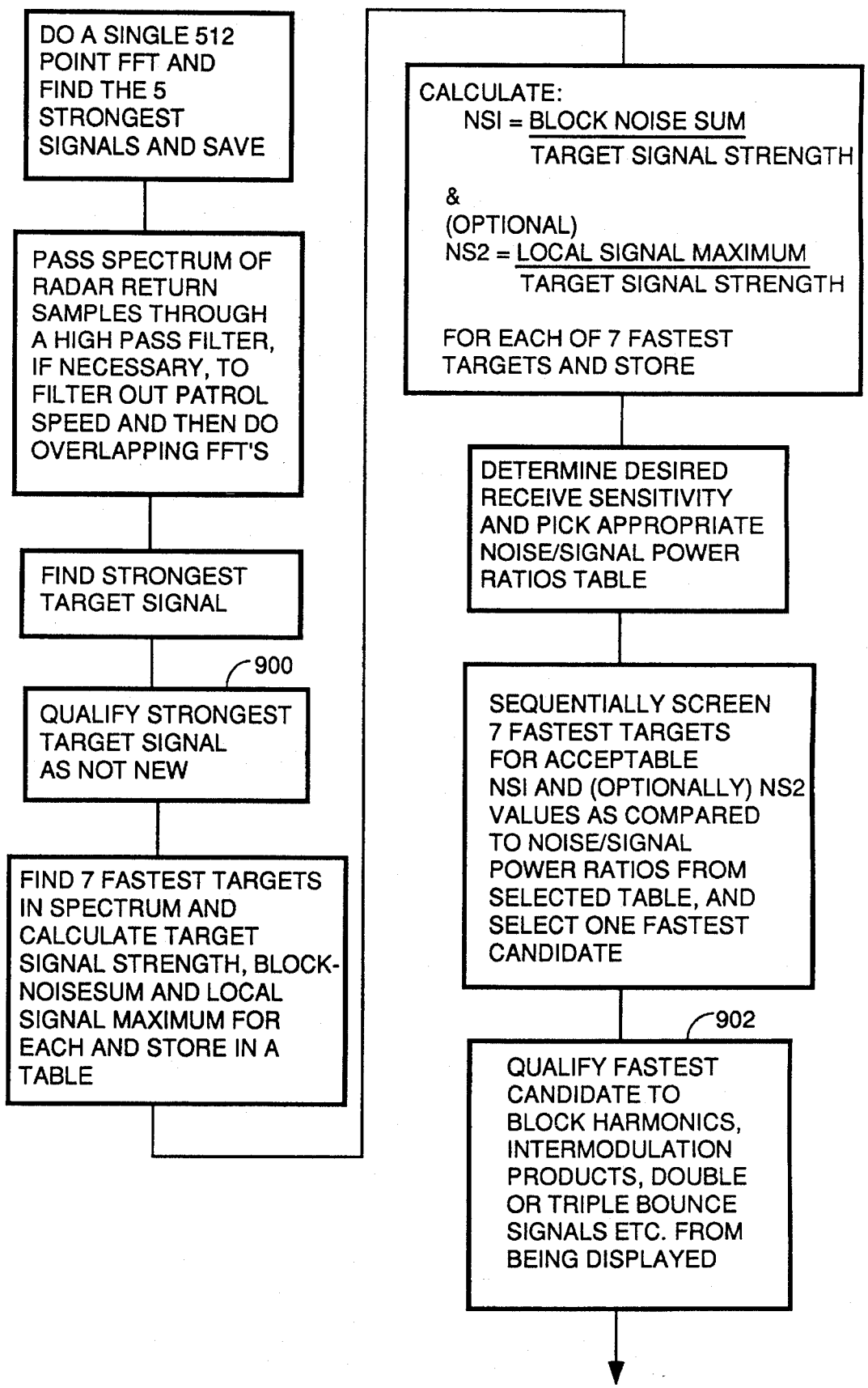
FIGS. 30A and 30B are a flow chart of a simpler embodiment for displaying fastest and strongest target signals simultaneously.
Figure 30B:
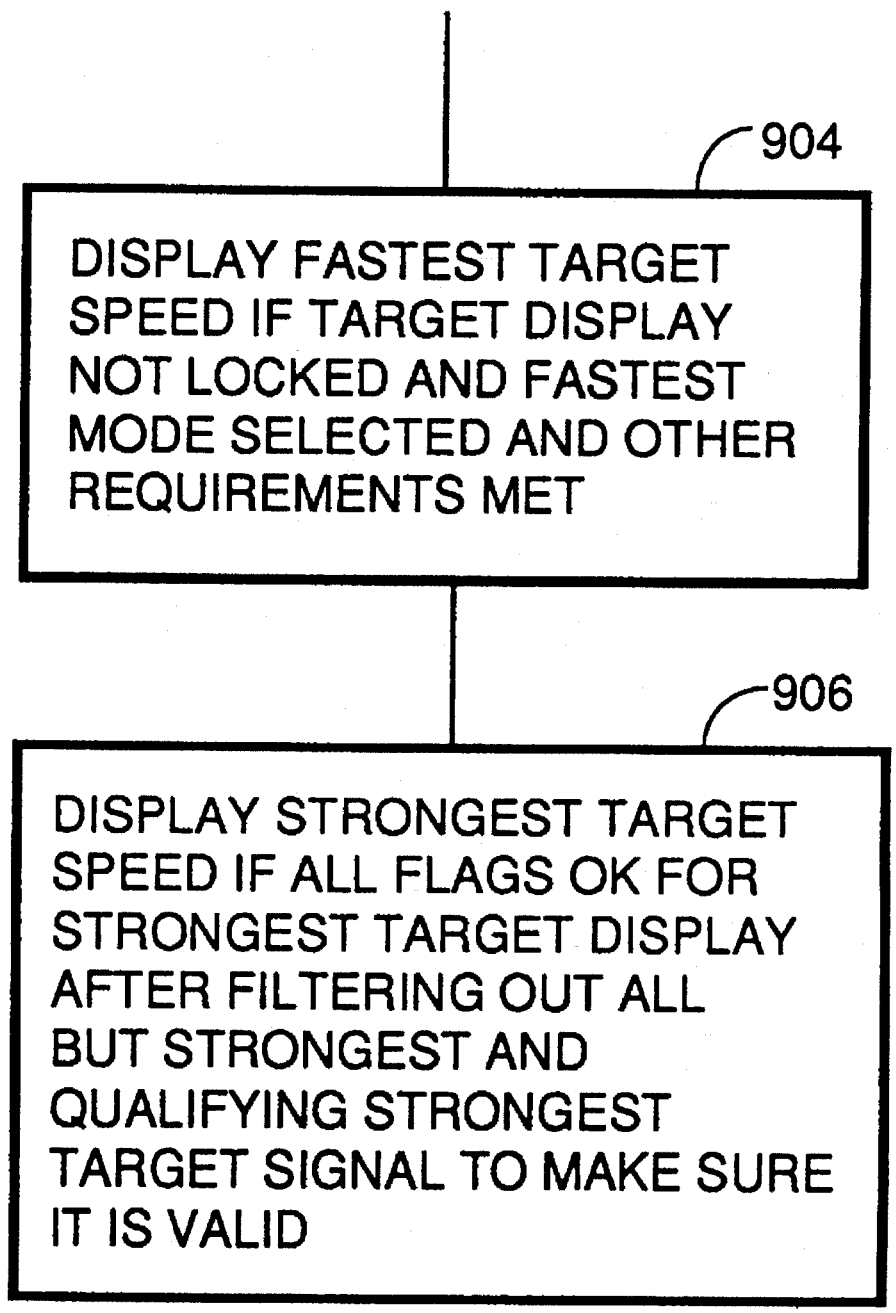

Referring to FIGS. 30A through 30B, there is shown a simplified flow chart of the processing of another embodiment that is similar to the processing flow of FIGS. 23A–E, 24A–E and 29A–G but simpler. The flow chart is self explanatory in light of FIGS. 23A–E, 24A–E and 29A–G and will not be discussed further herein except briefly. Those skilled in the art will appreciate that the virtual gauntlet of qualification and disqualification tests that the fastest speed candidate, the patrol speed candidate and the strongest target signal candidate go through in the processing of FIGS. 23A–E, 24A–E and 29A–G before display is allowed is very comprehensive, and simpler embodiments can easily be envisioned where one or more of these tests is eliminated or modified. The flow chart of FIGS. 30A and 30B is intended to symbolize these simpler embodiments where subsets and supersets, different permutations or combinations or modifications of the gauntlet of tests of FIGS. 23A–E, 24A–E and 29A–G are used. Therefore, blocks 900, 902, 904 and 906 on FIGS. 30A and 30B are intended to cover any different combination or permutation, subset or superset or other modification of the qualification and disqualification tests for the strongest target signal, fastest target signal and the patrol speed signal. Therefore, blocks 900, 902, 904 and 906 on FIGS. 30A and 30B are intended to cover any different combination or permutation, subset or superset or other modification of the qualification and disqualification tests for the strongest target signal, fastest target signal and the patrol speed signal. These different permutations, subset, supersets or other modifications of the gauntlet of tests of FIGS. 23A–E, 24A–E and 29A–G are referred to in the appended claims as "predetermined criteria" or "predetermined selection criteria" or "predetermined signal strength criteria".

Figure 31:
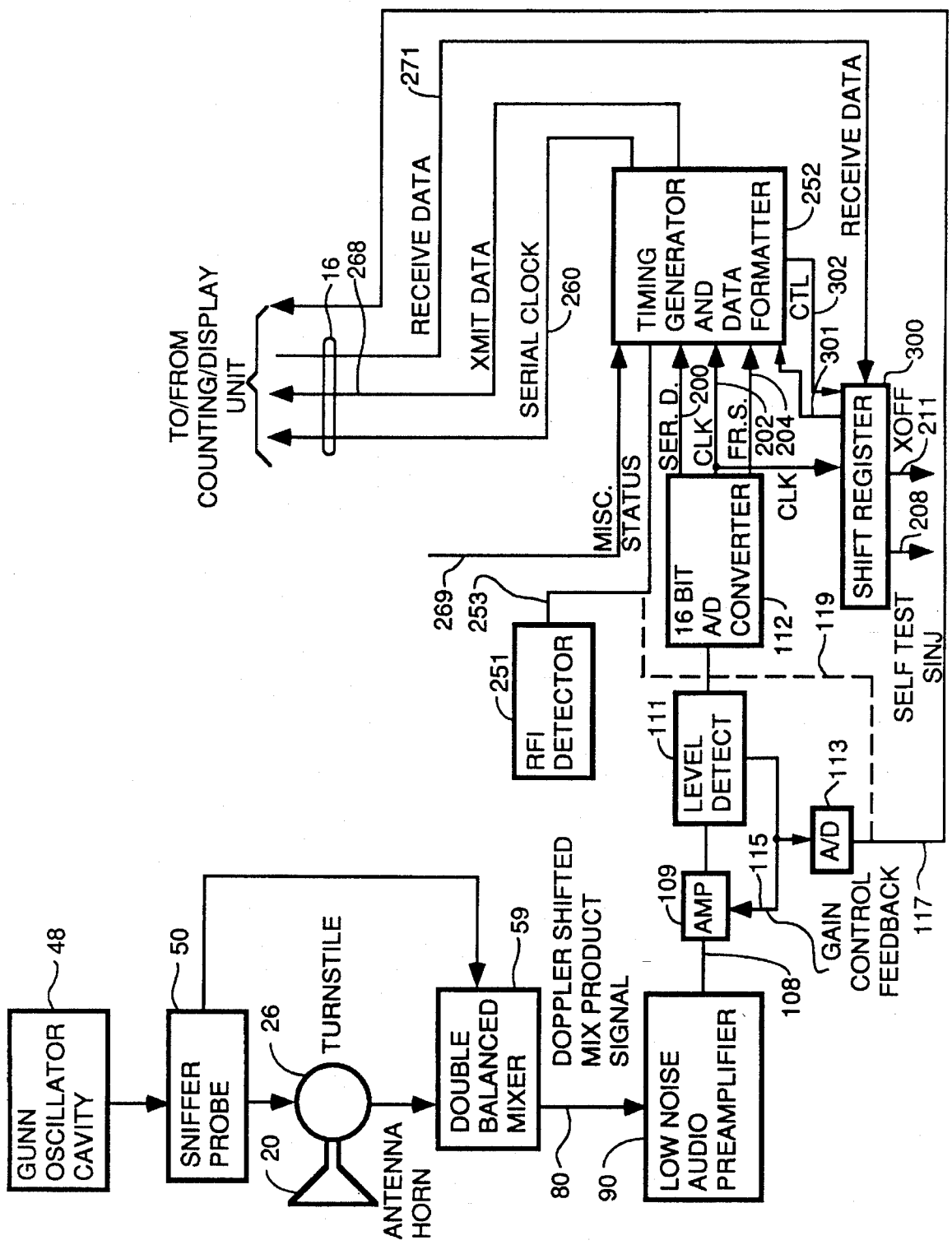
FIG. 31 is a block diagram of an alternative antenna structure which transmits the level of amplification to the counting unit.

Referring to FIG. 31, there is shown an alternative embodiment for a gain control system for the antenna. Functional blocks that have the same reference numbers as blocks in FIG. 6 do the same things except for the shift register 300. In this embodiment, the shift register 300 receives serial format data only for the self test signal and the transmitter on/off control signals and converts them to parallel format under control of signals from the timing generator and data formatter 252. No digital gain control data is received. Gain control is implemented by an analog gain control system comprised of amplifier 109, level detector 111 and analog-to-digital (hereafter A/D) converter 113. The amplifier 109 is a variable gain amplifier which has its gain set by an analog signal on line 115. The output of the amplifier 109 is input to a level detector 111 which compares the signal to upper and lower limits. In some embodiments, these limits are fixed, and in other embodiments, the limits may be adjustable by the user either through analog circuitry such as two potentiometers coupled to upper and lower limit inputs or by way of digital data generated by the processor in the counting unit under user control and sent to the antenna unit for conversion to analog upper and lower limit reference signals. The level detector passes the analog output from the amplifier 109 to the analog input of the A/D converter 112, and simultaneously generate a gain control feedback signal on line 115 based upon the results of the comparison of the level of the output signal from the amplifier to the upper and lower limits. The gain control feedback signal on line 115 is also coupled to the analog input of A/D converter 113 which converts it to either parallel or, preferably, serial format digital data which is transmitted to the counter/display unit for use by the DSP in determining true power of received radar signals. In one embodiment, the digital data output by A/D converter 113 on line 117 is sent as a separate serial or parallel data link to the counter/display unit. In the preferred embodiment, the output data is serial format and is merged into the frames of serial data sent to the counter unit on line 268 time cant of the feedback loop to be much long timg, takes to fill a buffer with data in the counter/display unit so that the gain does not change appreciably during the time the samples filling the buffer were accumulated. In the preferred embodiment, the time constant is set at 0.5 seconds which represents an interval 10 times as long as it takes to fill a 2048 sample buffer at a clock rate of 44 KHz. The components of the automatic analog gain control system and A/D converter 113 are conventional.

Although the invention has been described in terms of the preferred and alternative embodiments described herein, those skilled in the art may possibly appreciate other alternatives which do not depart from the spirit and scope of the claimed invention. All such embodiments which combine the same concepts disclosed herein to achieve substantially the same results are intended to be covered by the claims appended hereto.

What is claimed is:

1. A method of measuring the speed of moving targets in police traffic surveillance radar unit having at least two display windows, comprising the steps of:

(1) transmitting a radar signal toward one or more moving targets;

(2) receiving a spectrum of radar return signals from moving and stationary objects, said stationary objects being defined as those objects which have no relative velocity with respect to said police traffic surveillance radar unit if said radar unit is not moving;

(3) calculating the speed of a moving target which has the strongest radar return signal which is not the radar return signal indicative of the speed that the police traffic surveillance radar unit itself is moving, said strongest radar return signal being found in said spectrum of radar return signals;

(4) calculating the speed of at least one of the fastest moving targets having a radar return signal in said spectrum of radar return signals; and (5) displaying in a first of said at least two display windows the speed of the moving target having said strongest radar return signal which is not the radar return signal indicative of the speed that the police traffic surveillance radar unit itself is moving, and simultaneously displaying in a second of said at least two display windows the speed of one of the fastest moving targets determined in step (4) above.

2. The method of claim 1, wherein step (4) further comprises the steps of:

selecting for calculation of the speed of said at least one of the fastest moving targets by screening a plurality of the fastest moving targets having radar return signals in said spectrum in descending order of speed and eliminating a candidate if the ratio of average noise power of signals in said spectrum in a predetermined range of frequencies on either side of the frequency of the radar return signal corresponding to a particular fastest moving target candidate signal being evaluated to the signal strength of the particular fastest moving target candidate signal being evaluated is worse that a predetermined value, and selecting as the fastest speed candidate the first of said fastest speed candidates which has an acceptable value for said noise to signal power ratio, and calculating the speed of said selected fastest speed candidate for display simultaneously with the display of the speed calculated in step (3).

3. The method of claim 2, further comprising the step of calculating and tracking the patrol speed at which said radar unit itself is moving and displaying said patrol speed on a display window of said radar unit using the strongest radar return signal that qualifies as a valid radar signal indicative of patrol speed, and wherein step (4) further comprises the steps of:

selecting for calculation of the speed of said at least one of the fastest moving targets by screening said fastest speed candidate to eliminate said fastest candidate for display of the speed thereof if the speed thereof is an integer multiple of the speed of the strongest signal in said spectrum, and the noise to signal power ratio of said fastest speed candidate does not meet predetermined additional noise to signal power criteria, said additional noise to signal power criteria based upon the signal power of said strongest radar return signal that qualifies as a valid radar signal indicative of patrol speed.

4. The method of claim 2, wherein step (4) further comprises the steps of:

selecting for calculation of the speed of said at least one of the fastest moving targets by screening said fastest speed candidate to eliminate said fastest candidate for display of the speed thereof if the speed thereof is below a predetermined speed.

5. The method of claim 2, further comprising the step of calculating and tracking the patrol speed at which said radar unit itself is moving and displaying said patrol speed on a display window of said radar unit using the strongest radar return signal that qualifies as a valid radar signal indicative of patrol speed, and further comprising the step of calculating the true power of said patrol speed, and wherein step (4) further comprises the steps of:

selecting for calculation of the speed of said at least one of the fastest moving targets by screening said fastest speed candidate to eliminate said fastest candidate for display of the speed thereof if the calculated patrol speed is below a predetermined limit, and the noise to signal power ratio of said fastest speed candidate is not better than an additional noise to signal power ratio selected based upon the true power of said patrol speed.

6. The method of claim 2, wherein steps (1)–(5) are repeated continuously, and wherein step (4) further comprises the steps of:

selecting for calculation of the speed of said at least one of the fastest moving targets by screening said fastest speed candidate to eliminate said fastest candidate for display of the speed thereof if the same fastest speed candidate has not been selected on previous repetitions of steps (1)–(5) so as to have persisted for a predetermined time.

7. The method of claim 2, wherein step (2) further comprises the steps of locating a predetermined number of the strongest radar return signals in said spectrum and calculating the true power of each of said predetermined number of the strongest radar return signals and saving the frequencies and true power of each of said predetermined number of strongest radar return signals, and wherein step (4) further comprises the steps of:

selecting for calculation of the speed of said at least one of the fastest moving targets by also screening said fastest speed candidate to eliminate said fastest candidate for display of the speed thereof if the true power of any of said plurality of strongest radar return signals is above a predetermined harmonic generation threshold, and the frequency of the fastest candidate being screened is an integer multiple of any of said strongest radar return signals which have true power above a predetermined harmonic generation threshold.

8. The method of claim 2, wherein step (2) further comprises the steps of locating a predetermined number of the strongest radar return signals in said spectrum and calculating the true power of each of said predetermined number of the strongest radar return signals and saving the frequencies and true power of each of said predetermined number of strongest radar return signals, and wherein step (4) further comprises the steps of:

selecting for calculation of the speed of said at least one of the fastest moving targets by also screening said fastest speed candidate to eliminate said fastest candidate for display of the speed thereof if the true power of any of said plurality of strongest radar return signals is above a first predetermined harmonic generation threshold, and if the true power of any other of said plurality of said strongest radar return signals is above a second intermodulation product threshold, and if the frequency of the fastest candidate being screened is equal to either the sum or difference of the frequencies of any pair of said strongest radar return signals one of which has true power above said first predetermined harmonic generation threshold and the other of which has a true power above said second intermodulation product threshold.

9. The method of claim 2, wherein step (4) further comprises the steps of:

selecting for calculation of the speed of said at least one of the fastest moving targets by screening said fastest speed candidate to eliminate said fastest candidate for display of the speed thereof if radio frequency interference was detected during the interval during which said spectrum of radar return signals was being received.

10. The method of claim 2, wherein step (4) further comprises the steps of:

selecting for calculation of the speed of said at least one of the fastest moving targets by screening said fastest speed candidate so as to eliminate any potential fastest candidate for display of the speed thereof if the ratio of the signal power of another signal having a frequency within a predetermined range of frequencies surrounding the frequency of the potential fastest candidate under evaluation to the signal strength of the potential fastest candidate under evaluation is worse than a predetermined ratio.

11. The method of claim 2, further comprising the step of calculating and tracking the patrol speed at which said radar unit itself is moving and displaying said patrol speed on a display window of said radar unit using the strongest radar return signal that qualifies as a valid radar signal indicative of patrol speed, and wherein step (4) further comprises the steps of:

selecting for calculation of the speed of said at least one of the fastest moving targets by screening said fastest speed candidate to eliminate said fastest candidate for display of the speed thereof if the signal power of said patrol speed has decreased by more than a predetermined amount in a predetermined amount of time.

12. The method of claim 2, further comprising the step of calculating and tracking the patrol speed at which said radar unit itself is moving and displaying said patrol speed on a display window of said radar unit using the strongest radar return signal that qualifies as a valid radar signal indicative of patrol speed, and wherein said radar unit has at least three display windows, and wherein said patrol speed is displayed in a first of said display windows, and wherein the speed calculated in step (3) is displayed in a second of said display windows, and further comprising the step of receiving a user signal indicating the user desires to lock the currently displayed speed calculated in step 3 into said third display window and for transferring the currently displayed speed calculated in step (3) into said third display window and holding said displayed speed constant, and wherein step (4) further comprises the steps of displaying the fastest target speed calculated in step (4) and displaying said fastest target speed in said third display window if said speed calculated in step (3) is not currently locked into said third display window.

13. The method of claim 2, further comprising the step of calculating and tracking the patrol speed at which said radar unit itself is moving and displaying said patrol speed on a display window of said radar unit using the strongest radar return signal that qualifies as a valid radar signal indicative of patrol speed, wherein step (4) further comprises the steps of:

selecting for calculation of the speed of said at least one of the fastest moving targets by screening said fastest speed candidate to eliminate said fastest candidate for display of the speed thereof if said patrol speed has only been recently acquired within a predetermined prior interval, or if said patrol speed is not being continuously tracked.

14. An police traffic radar apparatus, comprising:

first means for transmitting radar energy using an antenna and receiving radar energy reflected as a result of said transmission using the same antenna and for converting said received radar energy into a lower frequency composite signal resulting from all reflected radar energy from stationary and moving targets which reflected said radar energy, said conversion accomplished while substantially eliminating even order harmonics in said composite signal, said composite signal being amplified by an amplifier in said first means having adjustable gain;

counting and display means for calculating and displaying at least the speed at which said police traffic radar apparatus is moving and for calculating and displaying the speed of the moving target which has the strongest reflected radar signal that meets predetermined qualifications;

second means coupled to said first means for adjusting the gain of said amplifier in accordance with data received from said counting and display means to keep the amplitude of said composite signal within predetermined limits;

third means for digitizing said sample data and transmitting said digitized data as a serial data stream to said counting and display means; and fourth means in said counting and display means for calculating and simultaneously displaying with the speed of the moving target which has the strongest reflected radar signal that meets predetermined qualifications the speed of the fastest moving target which is reflecting radar energy so as to create a signal processed by said counting and display means that meets predetermined noise to signal power requirements and passes other predetermined qualification and disqualification tests.

15. The apparatus of claim 14 wherein said fourth means includes means for displaying only the fastest target speed of a target reflecting radar energy which meets predetermined target signal strength criteria and for displaying the fastest target speed all the time.

16. The apparatus of claim 14 wherein said fourth means includes means for suppressing the display of false fastest target speeds caused by harmonic distortion, intermodulation products of strong reflected radar signals, or double and triple bounce reflected radar signals.

17. The apparatus of claim 14 wherein said fourth means includes means for displaying only the fastest target speed of a target reflecting radar energy which meets predetermined target signal strength criteria and for displaying the fastest target speed only when a fastest mode is selected.

18. The apparatus of claim 14 wherein said fourth means includes means for comparing the fastest target speed of a target reflecting radar energy which meets predetermined target signal strength criteria to the speed of the target signal reflected by a moving target which has the strongest valid reflected radar signal, and for displaying said fastest target speed only if it is different from and faster than said speed of the target signal reflected by a moving target which has the strongest valid reflected radar signal.

* * * * *